US010927029B2

(12) United States Patent
Fisher, Jr. et al.

(10) Patent No.: US 10,927,029 B2
(45) Date of Patent: Feb. 23, 2021

(54) APPARATUSES AND METHODS FOR CONTINUOUS PRODUCTION OF GLASS TUBING

(71) Applicant: CORNING INCORPORATED, Corning, NY (US)

(72) Inventors: Dale Madard Fisher, Jr., Painted Post, NY (US); David Posada-Pineda, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 206 days.

(21) Appl. No.: 16/201,472

(22) Filed: Nov. 27, 2018

(65) Prior Publication Data

US 2019/0161379 A1    May 30, 2019

Related U.S. Application Data

(60) Provisional application No. 62/592,736, filed on Nov. 30, 2017.

(51) Int. Cl.
*C03B 17/04* (2006.01)
*C03B 17/02* (2006.01)

(52) U.S. Cl.
CPC ............ *C03B 17/025* (2013.01); *C03B 17/04* (2013.01)

(58) Field of Classification Search
CPC ............ C03B 17/01274; C03B 17/022; C03B 17/023; C03B 17/025; C03B 17/04
See application file for complete search history.

(56) References Cited

U.S. PATENT DOCUMENTS 3,582,306 A    6/1971  Giffen
3,923,486 A *  12/1975  Kitano ............... G02B 6/02
                                            65/400

(Continued)

FOREIGN PATENT DOCUMENTS

DE    10019874 A1    10/2001
DE    10019875 A1    10/2001

(Continued)

OTHER PUBLICATIONS

International Search Report and Written Opinion dated Jan. 31, 2019, for PCT/US2018/063075 filed Nov. 29, 2018. pp. 1-12.

(Continued)

*Primary Examiner* — Cynthia Szewczyk
(74) *Attorney, Agent, or Firm* — Dinsmore & Shohl LLP

(57) ABSTRACT

An apparatus for producing composite glass tube with a plurality of glass layers includes a plurality of cylindrical containers of increasing inner dimensions concentrically arranged and stationary. Each cylindrical container includes a side wall, bottom wall, and a delivery ring. Adjacent cylindrical containers define an annular chamber, a flow control region, and an annular flow channel therebetween. The apparatus includes at least one flow control valve positioned in the flow control region and translatable relative to the adjacent cylindrical containers. Translation of the flow control valves relative to the cylindrical containers is operable to change an impedance to flow of molten glass through the flow control region, thereby modifying an overall flow rate or circumferential distribution of molten glass from the cylindrical containers. Systems and methods for producing composite glass tube using the apparatus are also disclosed.

19 Claims, 23 Drawing Sheets

(56) References Cited

U.S. PATENT DOCUMENTS

| | | | |
|---|---|---|---|
| 4,023,953 A | 5/1977 | Megles, Jr. et al. | |
| 4,923,497 A | 5/1990 | Leber et al. | |
| 5,098,274 A | 3/1992 | Krishnakumar et al. | |
| 5,364,432 A | 11/1994 | Leber | |
| 2005/0227027 A1* | 10/2005 | Maenner | C03B 17/04 |
| | | | 428/34.4 |
| 2007/0271963 A1 | 11/2007 | Lange et al. | |
| 2012/0011889 A1* | 1/2012 | Bogdahn | C03B 17/04 |
| | | | 65/29.1 |

FOREIGN PATENT DOCUMENTS

| | | |
|---|---|---|
| DE | 102008037688 A1 | 2/2010 |
| FR | 1223064 A | 6/1960 |
| FR | 2228728 A1 | 12/1974 |
| GB | 363267 A | 12/1931 |
| GB | 855393 A | 11/1960 |
| GB | 1448080 A | 9/1976 |

OTHER PUBLICATIONS

Non-Final Office Action dated Sep. 9, 2020 for U.S. Appl. No. 16/201,465. pp. 1-18.

* cited by examiner

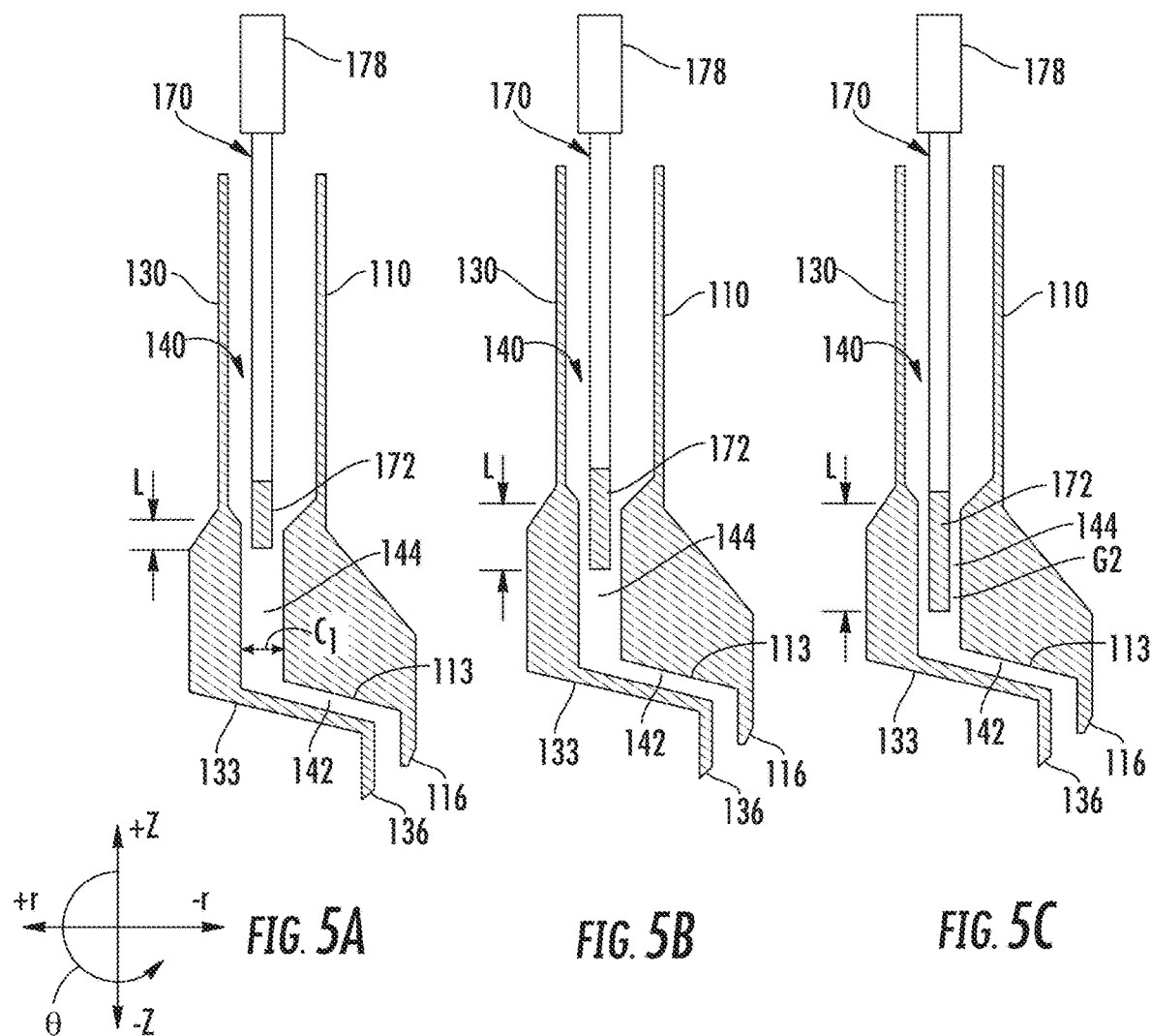

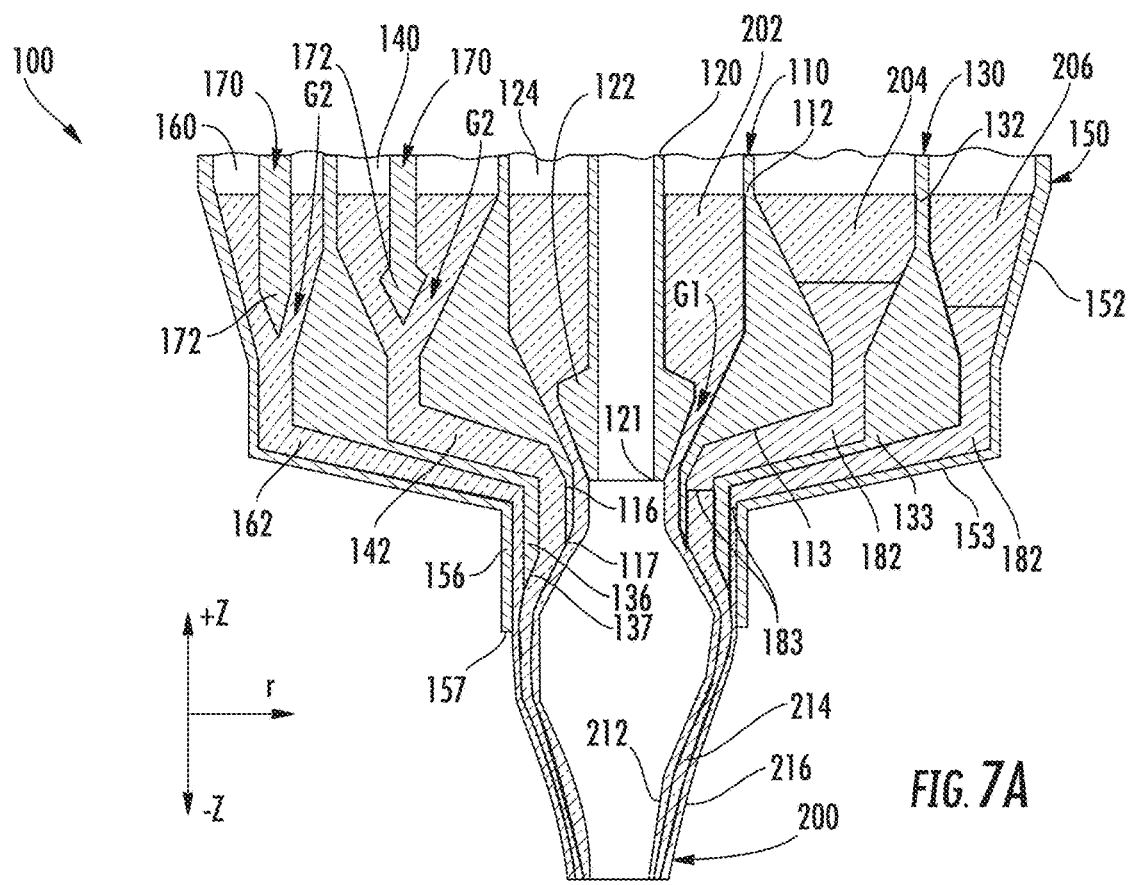
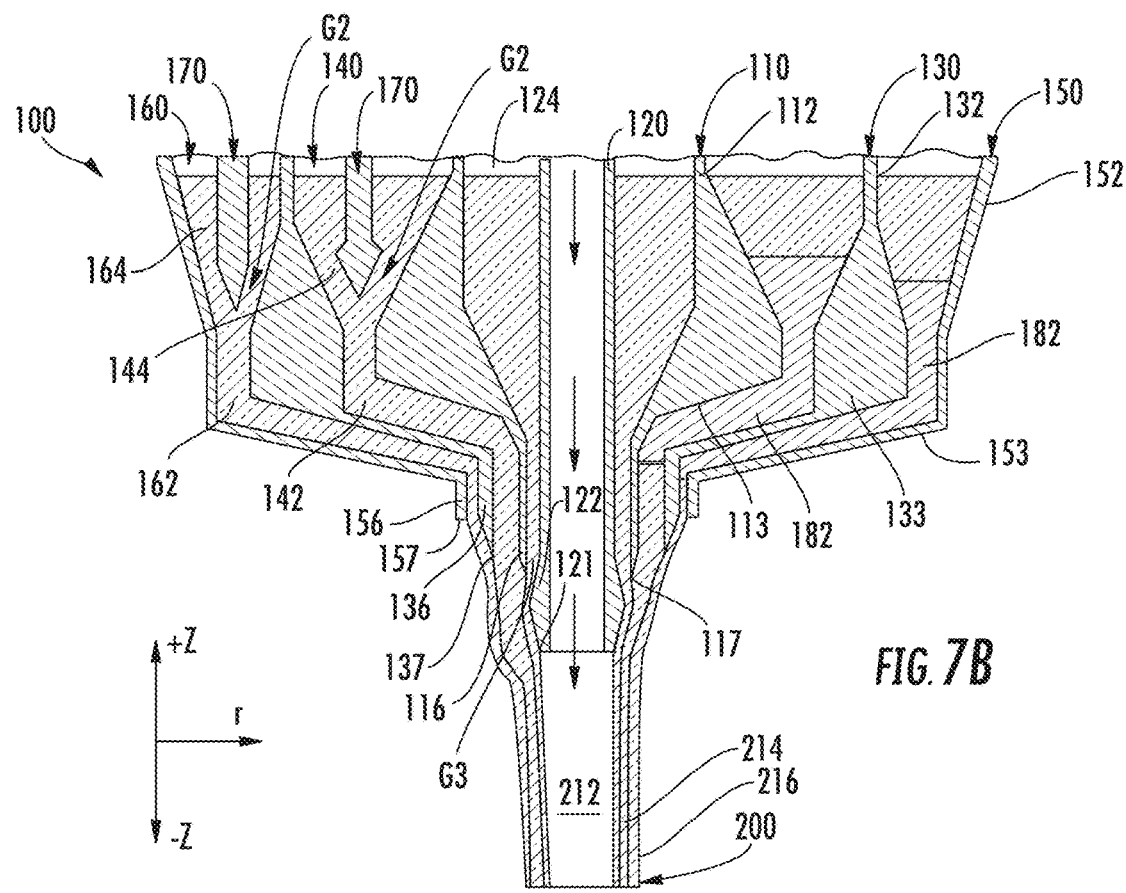

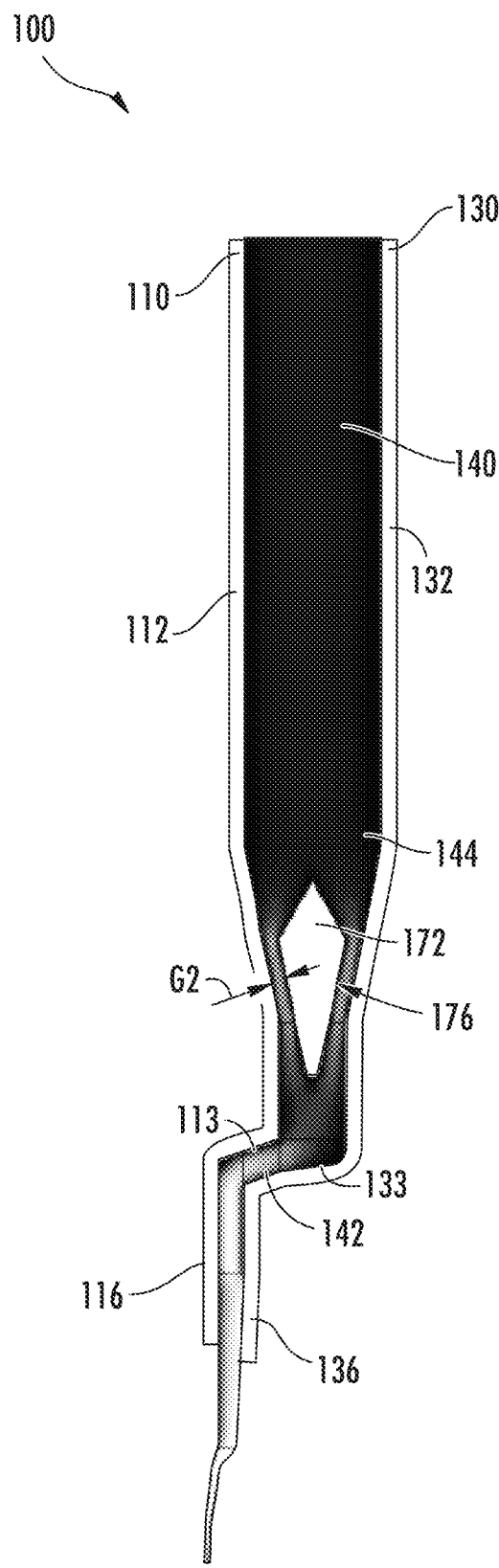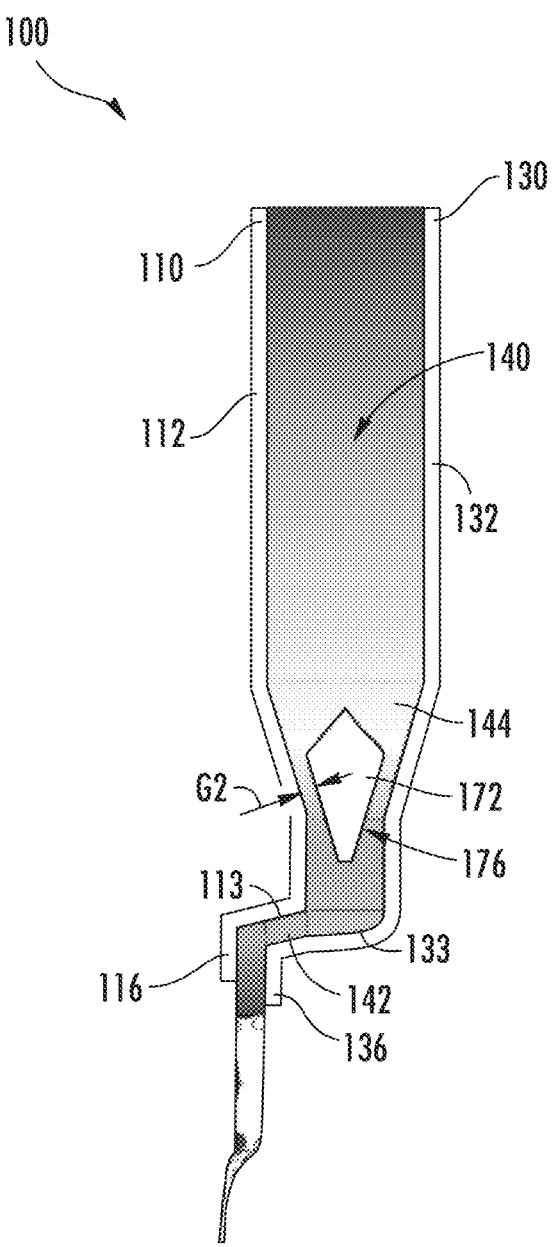
FIG. 9A
FIG. 9B

APPARATUSES AND METHODS FOR CONTINUOUS PRODUCTION OF GLASS TUBING

CROSS-REFERENCE TO RELATED APPLICATIONS

This application claims the benefit of priority under 35 U.S.C. § 120 of U.S. Provisional Application No. 62/592,736 filed Nov. 30, 2017, entitled "Apparatuses and Methods for Continuous Production of Glass Tubing," the entire contents of which are hereby incorporated by reference.

BACKGROUND

Field

The present specification generally relates to apparatuses, systems, and methods for continuously producing glass tubing, in particular glass tubing comprising a plurality of laminated glass layers.

Technical Background

Historically, glass has been used to produce a variety of articles. For example, because of its hermeticity, optical clarity, and excellent chemical durability relative to other materials, glass has been a preferred material for pharmaceutical applications, including, without limitation, vials, syringes, ampoules, cartridges, and other glass articles. Production of these articles from glass starts with providing glass tubing that may subsequently be formed and separated into a plurality of glass articles. Specifically, the glass used in pharmaceutical packaging must have adequate mechanical and chemical durability so as to not affect the stability of the pharmaceutical formulations contained therein. Glasses having suitable chemical durability include those glass compositions within the ASTM standard 'Type IA' and 'Type IB' glass compositions which have a proven history of chemical durability.

Some conventional processes for producing glass tubes are limited to the production of glass tubes comprising a single glass composition. Depending on the application, a single composition glass tube may be limited in mechanical strength and/or chemical durability. Mechanical strength and durability of glass tubes can be increased through conventional glass tempering (i.e., strengthening) processes such as ion-exchange or thermal tempering. Subsequent strengthening processes, such as but not limited to ion exchange processes, may increase the mechanical strength of the single composition glass tubing. However, certain glass compositions are not well suited to ion exchange strengthening, and strengthening processes like ion exchange may not improve the chemical durability of the glass tubing. Furthermore, ion exchange strengthening, as well as other tempering processes to strengthen the glass tubing, may require additional process steps that increases the capital, material, and operating costs of producing the glass tubing.

SUMMARY

Accordingly, a need exists for apparatuses, systems, and methods for continuously producing glass tube.

According to a first aspect of the present disclosure, an apparatus for producing glass tubing may include an inner cylindrical container including an inner delivery ring extending from a bottom of the inner cylindrical container, the inner delivery ring defining a central opening in the bottom of the inner cylindrical container. The apparatus may further include an outer cylindrical container concentrically arranged to surround the inner cylindrical container. The outer cylindrical container may include a side wall and a bottom wall extending radially inward from the side wall to an outer delivery ring extending downward from the bottom wall, the outer delivery ring defining a central opening in the bottom wall of the outer cylindrical container. The outer cylindrical container may be spaced apart from the inner cylindrical container to define an annular chamber, a flow control region downstream of the annular chamber, and an annular flow channel extending from the flow control region to the outer delivery ring. The apparatus may further include at least one flow control valve disposed within the annular chamber and translatable relative to the outer cylindrical container. Translation of the at least one flow control valve may be operable to change an impedance to flow of a molten glass composition through the flow control region. The apparatus may also include a blow tube disposed within the inner cylindrical container and operable to deliver a gas flow proximate the inner delivery ring.

A second aspect of the present disclosure may include the first aspect, wherein the at least one flow control valve may comprise a control element positioned proximate to the flow control region and a shaft coupled to the control element and extending upward through the annular chamber.

A third aspect of the present disclosure may include the second aspect, wherein the control element may comprise an outer surface having a shape complimentary to a shape of one or both of the side walls or the bottom walls of the inner cylindrical container or the outer cylindrical container in the flow control region.

A fourth aspect of the present disclosure may include any of the first through third aspects, wherein the at least one flow control valve may be manually translatable relative to the plurality of cylindrical containers.

A fifth aspect of the present disclosure may include any of the first through third aspects, further comprising an actuator coupled to a shaft of the flow control valve, wherein the actuator may be operable to translate the at least one flow control valve relative to the outer cylindrical container or the inner cylindrical container.

A sixth aspect of the present disclosure may include any of the first through fifth aspects, further comprising a plurality of flow gussets disposed within the annular flow channel, each of the plurality of flow gussets extending between the inner cylindrical container and the outer cylindrical container and from the flow control region to the inner delivery ring.

A seventh aspect of the present disclosure may include the sixth aspect, wherein the plurality of flow gussets may separate the flow control region, the annular flow channel, or both into a plurality of sectors, and the apparatus may comprise a plurality of flow control valves, each of the flow control valves positioned in one of the plurality of sectors.

An eighth aspect of the present disclosure may include any of the first through seventh aspects, wherein an axial distance from a bottom of the inner cylindrical container to a distal end of the outer delivery ring may be greater than an axial distance from a bottom of the inner cylindrical container to a distal end of the inner delivery ring.

A ninth aspect of the present disclosure may include any of the first through seventh aspects, wherein an axial distance from a bottom of the inner cylindrical container to a distal end of the outer delivery ring may be less than an axial distance from a bottom of the inner cylindrical container to a distal end of the inner delivery ring.

A tenth aspect of the present disclosure may include any of the first through ninth aspects, wherein the blow tube may include a head disposed within the inner cylindrical container, the blow tube may be translatable relative to the inner cylindrical container, and translation of the blow tube relative to the inner cylindrical container may be operable to modify an impedance to flow of molten glass from the inner cylindrical container to the inner delivery ring.

An eleventh aspect of the present disclosure may include the tenth aspect, wherein the blow tube may be translatable vertically, horizontally, or both relative to the inner cylindrical container.

A twelfth aspect of the present disclosure may include any of the first through ninth aspects, wherein the blow tube may comprise a head, and the blow tube may extend through the inner delivery ring so that the head of the blow tube is positioned vertically below the inner delivery ring.

A thirteenth aspect of the present disclosure may include the twelfth aspect, wherein the blow tube may be translatable relative to the inner delivery ring, and wherein translation of the blow tube may be operable to modify an impedance to flow of molten glass between the head of the blow tube and a distal end of the inner delivery ring.

A fourteenth aspect of the present disclosure may include any of the first through ninth aspects, wherein the blow tube may extend through the inner delivery ring of the inner cylindrical container, the apparatus may further comprise at least one inner flow control valve disposed within the inner cylindrical container and translatable relative to the inner cylindrical container, and wherein translation of the inner flow control valve relative to the inner cylindrical container may change an impedance to flow of molten glass from the inner cylindrical container to the inner delivery ring.

A fifteenth aspect of the present disclosure may include the fourteenth aspect, wherein the inner flow control valve may be vertically translatable relative to the blow tube.

A sixteenth aspect of the present disclosure may include either of the fourteenth or the fifteenth aspects, wherein the inner flow control valve may be horizontally translatable with the blow tube relative to the inner cylindrical container.

A seventeenth aspect of the present disclosure may include any of the first through sixteenth aspects, comprising a plurality of outer cylindrical containers of increasing inner dimensions concentrically arranged in fixed positions about the inner cylindrical container, each outer cylindrical container having a side wall, a bottom wall extending radially inward from the side wall, and an outer delivery ring extending downward from the bottom wall, wherein each adjacent pair of outer cylindrical containers defines an annular chamber, a flow control region, and an annular flow channel. The seventeenth aspect of the present disclosure may also include a plurality of flow control valves, wherein at least one of the plurality of flow control valves may be positioned in each annular chamber defined between adjacent pairs of outer cylindrical containers.

An eighteenth aspect of the present disclosure may include the seventeenth aspect, wherein an outer dimension of each outer delivery ring may increase for each successive one of the outer cylindrical containers positioned outward from the inner delivery ring.

A nineteenth aspect of the present disclosure may include either of the seventeenth or eighteenth aspects, wherein an axial distance from the bottom of the inner cylindrical container to the distal end of each successive delivery ring may increase for each successive delivery ring from the inner cylindrical container to an outermost cylindrical container.

A twentieth aspect of the present disclosure may include either of the seventeenth or eighteenth aspects, wherein an axial distance from the bottom of the inner cylindrical container to the distal end of each successive delivery ring may decrease for each successive delivery ring from the inner cylindrical container to an outermost cylindrical container.

According to a twenty-first aspect of the present disclosure, an apparatus for producing glass tubing may include at least one cylindrical container having a side wall and a bottom wall extending radially inward from the side wall to a delivery ring extending downward from the bottom wall, the delivery ring defining a central opening in the bottom wall of the cylindrical container. The apparatus may further include a blow tube disposed within the at least one cylindrical container and operable to deliver a gas flow proximate the delivery ring. The apparatus may further include at least one flow control valve positioned in a flow control region defined between the cylindrical container and the blow tube and translatable relative to the cylindrical container. Translation of the at least one flow control valve may be operable to change an impedance to flow of a molten glass composition through the flow control region.

A twenty-second aspect of the present disclosure may include the twenty-first aspect, wherein the at least one flow control valve may be vertically translatable relative to the blow tube.

A twenty-third aspect of the present disclosure may include either of the twenty-first or twenty-second aspects, wherein the at least one flow control valve may be horizontally translatable with the blow tube relative to the inner cylindrical container.

A twenty-fourth aspect of the present disclosure may include any of the twenty-first through twenty-third aspects, further comprising an outer cylindrical container concentrically arranged to surround the at least one cylindrical container and spaced apart from the at least one cylindrical container to define an annular chamber therebetween, the outer cylindrical container comprising a side wall and a bottom wall extending radially inward from the side wall to an outer delivery ring extending downward from the bottom wall, the outer delivery ring defining a central opening in the bottom wall of the outer cylindrical container, wherein the bottom wall, the side wall, or both of the outer cylindrical container are spaced apart from the at least one cylindrical container to define a flow control region and an annular flow channel extending between the outer cylindrical container and the at least one cylindrical container and from the flow control region to the outer delivery ring, and at least one outer flow control valve disposed in the annular chamber and translatable relative to the outer cylindrical container, the at least one cylindrical container, or both, wherein translation of the at least one flow control valve is operable to change an impedance to flow of a molten glass composition through the flow control region.

According to a twenty-fifth aspect of the present disclosure, a system for producing glass tubing may include an apparatus that includes an inner cylindrical container including an inner delivery ring extending from a bottom of the inner cylindrical container, the inner delivery ring defining a central opening in the bottom of the inner cylindrical container. The apparatus may further include an outer cylindrical container concentrically arranged to surround the inner cylindrical container and spaced apart from the inner cylindrical container to define an annular chamber therebetween. The outer cylindrical container may include a side wall and a bottom wall extending radially inward from the side wall to an outer delivery ring extending downward from the bottom wall. The outer delivery ring may define a central opening in the bottom wall of the outer cylindrical container. The bottom wall, the side wall, or both of the outer cylindrical container may be spaced apart from the inner cylindrical container to define a flow control region and an annular flow channel extending between the outer cylindrical container and the inner cylindrical container and from the flow control region to the outer delivery ring. The apparatus may further include at least one flow control valve disposed within the annular chamber and at least one positioner operatively coupled to the at least one flow control valve and operable to translate the at least one flow control valve relative to the outer cylindrical container, the inner cylindrical container, or both. Translation of the at least one flow control valve by the positioner may be operable to change an impedance to flow of a molten glass composition through the flow control region. The apparatus may further include a blow tube disposed within the inner cylindrical container and operable to deliver a gas flow proximate the inner delivery ring. The system may further include a sensor disposed downstream of the apparatus, the sensor operable to measure at least one dimension of the glass tube produced by the apparatus, and a control system communicatively coupled to the at least one positioner and to the sensor. The control system may include a processor and one or more memory modules communicatively coupled to the processor.

A twenty-sixth aspect of the present disclosure may include the twenty-fifth aspect, further comprising machine readable instructions stored in the one or more memory modules that may cause the system to perform at least the following when executed by the processor: measure a dimension of the glass tube, compare the dimension of the glass tube to a target dimension of the glass tube, and send a control signal to the at least one positioner to change a position the at least one flow control valve based on the comparison of the dimension of the glass tube to the target dimension, wherein changing the position of the at least one flow control valve produces a change in the dimension of the glass tube.

A twenty-seventh aspect of the present disclosure may include either of the twenty-fifth or twenty-sixth aspects, wherein the sensor may be operable to measure at least one of the overall average thickness of the glass tube, an average thickness of one or more than one glass layer of the glass tube, a circumferential thickness profile of the glass tube, a circumferential thickness profile of one or more than one glass layer of the glass tube, an outer diameter of the glass tube, an inner diameter of the glass tube, or combinations of these.

A twenty-eighth aspect of the present disclosure may include any of the twenty-fifth through twenty-seventh aspects, wherein the apparatus may include: a plurality of flow control valves disposed in the annular chamber, and a plurality of positioners, each of the plurality of positioners operatively coupled to one of the plurality of flow control valves and operable to independently translate the one of the plurality of flow control valves relative to the outer cylindrical container.

A twenty-ninth aspect may include the twenty-eighth aspect, further comprising machine readable instructions stored in the one or more memory modules that may cause the system to perform at least the following when executed by the processor: measure a siding of the glass tube, compare the siding of the glass tube to a target siding of the glass tube, and position at least one of the plurality of flow control valves relative to the other of the plurality of flow control valves to change the siding of the glass tube based on the comparison.

A thirtieth aspect of the present disclosure may include any of the twenty-fifth through twenty-ninth aspects, further comprising a blow tube positioner operable to position the blow tube relative to the inner cylindrical container, wherein the control system may be communicatively coupled to the blow tube positioner.

A thirty-first aspect of the present disclosure may include the thirtieth aspect, further comprising machine readable instructions stored in the one or more memory modules that may cause the system to perform at least the following when executed by the processor: measure a dimension of the innermost glass layer of the glass tube, compare the dimension of the innermost glass layer of the glass tube to a target dimension of the innermost glass layer, and position the blow tube relative to the innermost cylindrical container to change the dimension of the innermost glass layer of the glass tube based on the comparison.

A thirty-second aspect of the present disclosure may include any of the twenty-fifth through thirty-first aspects, wherein the dimension may be the average thickness of the innermost glass layer and the machine readable instructions stored in the one or more memory modules, when executed by the processor, may cause the system to vertically position the blow tube relative to the inner cylindrical container.

According to a thirty-third aspect of the present disclosure, a method for producing a glass tube may include introducing a first molten glass composition to an annular chamber defined between an inner cylindrical container and an outer cylindrical container. The bottom wall of the outer cylindrical container may be spaced apart from the inner cylindrical container to define an annular flow channel. The method may further include passing the first molten glass composition through the annular flow channel to an outer delivery ring coupled to the bottom wall of the outer cylindrical container and defining a central opening in the bottom wall of the outer cylindrical container. The method may further include translating at least one flow control valve disposed in the annular chamber. Translation of the at least one flow control valve relative to the outer cylindrical container may change an impedance to flow of the molten glass into the annular flow channel, thereby changing a thickness of the glass tube. The method may further include separating the first molten glass composition from a distal end of the outer delivery ring to form a first molten glass layer of the glass tube.

A thirty-fourth aspect of the present disclosure may include the thirty-third aspect, further comprising producing a gas flow proximate to the outer delivery ring.

A thirty-fifth aspect of the present disclosure may include either the thirty-third or thirty-fourth aspect, wherein a plurality of flow control valves may be disposed in the annular chamber defined between the inner cylindrical container and the outer cylindrical container, each of the plurality of flow control valves being independently translatable relative to the outer cylindrical container.

A thirty-sixth aspect of the present disclosure may include the thirty-fifth aspect, further comprising adjusting a siding of the first molten glass layer by translating one or more of the plurality of flow control valves relative to the other of the plurality of flow control valves to change the circumferential distribution of the first molten glass composition flowing through the annular flow channel.

A thirty-seventh aspect of the present disclosure may include any of the thirty-third through thirty-sixth aspects, further comprising: introducing a second molten glass composition to the inner cylindrical container, the inner cylindrical container comprising a blow tube disposed within the inner cylindrical container, passing the second molten glass composition through an inner annular flow channel defined between the blow tube and the inner cylindrical container to an inner delivery ring coupled to the inner cylindrical container and defining a central opening of the inner cylindrical container, and separating the second molten glass composition from the inner delivery ring to produce a second molten glass layer of the glass tube.

A thirty-eighth aspect of the present disclosure may include the thirty-seventh aspect, further comprising contacting the first molten glass layer separated from the outer delivery ring with the second molten glass layer separated from the inner delivery ring.

A thirty-ninth aspect of the present disclosure may include either of the thirty-seventh or thirty-eighth aspects, further comprising adjusting a thickness or a siding of the second molten glass layer by translating the blow tube vertically or horizontally relative to the inner cylindrical container to change an impedance to flow of the second molten glass composition between the blow tube and the inner cylindrical container.

A fortieth aspect of the present disclosure may include any of the thirty-seventh through thirty-ninth aspects, wherein the inner cylindrical container may include an inner flow control valve disposed within the inner cylindrical container and translatable relative to the inner cylindrical container, where the method may further comprise adjusting a thickness or a siding of the second molten glass layer by translating the inner flow control valve vertically or horizontally relative to the inner cylindrical container to change an impedance to flow of the second molten glass composition from the inner cylindrical container to the inner delivery ring.

A forty-first aspect of the present disclosure may include any of the thirty-seventh through fortieth aspects, wherein the first molten glass composition may have a coefficient of thermal expansion (CTE) different than the second molten glass composition.

A forty-second aspect of the present disclosure may include any of the thirty-seventh through forty-first aspects, further comprising: introducing a third molten glass composition to a second annular chamber defined between the outer cylindrical container and a second outer cylindrical container; passing the third molten glass composition from the second annular chamber, through a second annular flow channel defined between a bottom wall of the second outer cylindrical container and the outer cylindrical container, to a second outer delivery ring; and separating the third molten glass composition from the second outer delivery ring to produce a third molten glass layer of the glass tube.

A forty-third aspect of the present disclosure may include any of the thirty-seventh through forty-second aspects, further comprising adjusting an average thickness or a circumferential thickness profile of the third molten glass layer by translating at least one of a plurality of flow control valves disposed in the second annular chamber relative to the second outer cylindrical container.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 5A schematically depicts a side view in cross section of another embodiment of an apparatus for producing glass tubing, the apparatus having a flow control valve positioned relative to the two cylindrical containers of the apparatus to produce a large glass flow rate, according to one or more embodiments shown and described herein;

FIG. 5B schematically depicts a side view in cross section of the apparatus of FIG. 5A in which the flow control valve is positioned relative to the two cylindrical containers of the apparatus to produce a lesser glass flow rate compared to FIG. 5A, according to one or more embodiments shown and described herein;

FIG. 5C schematically depicts a side view in cross section of the apparatus of FIG. 5A in which the flow control valve is positioned relative to the two cylindrical containers of the apparatus to produce a lesser glass flow rate compared to FIG. 5B, according to one or more embodiments shown and described herein;

FIG. 7A schematically depicts a side view in cross-section of a bottom portion of the apparatus of FIG. 1A, according to one or more embodiments shown and described herein;

FIG. 7B schematically depicts a side view in cross-section of another embodiment of an apparatus for producing composite glass tube with a plurality of layers, according to one or more embodiments shown and described herein;

FIG. 9A graphically depicts a velocity profile of molten glass through a portion of the apparatus determined using a flow model based on the geometry of the apparatus of FIG. 1A, according to one or more embodiments shown and described herein;

FIG. 9B graphically depicts a pressure profile of molten glass through a portion of the apparatus determined using a flow model based on the geometry of the apparatus of FIG. 1A, according to one or more embodiments shown and described herein;

DETAILED DESCRIPTION

Figure 1A:
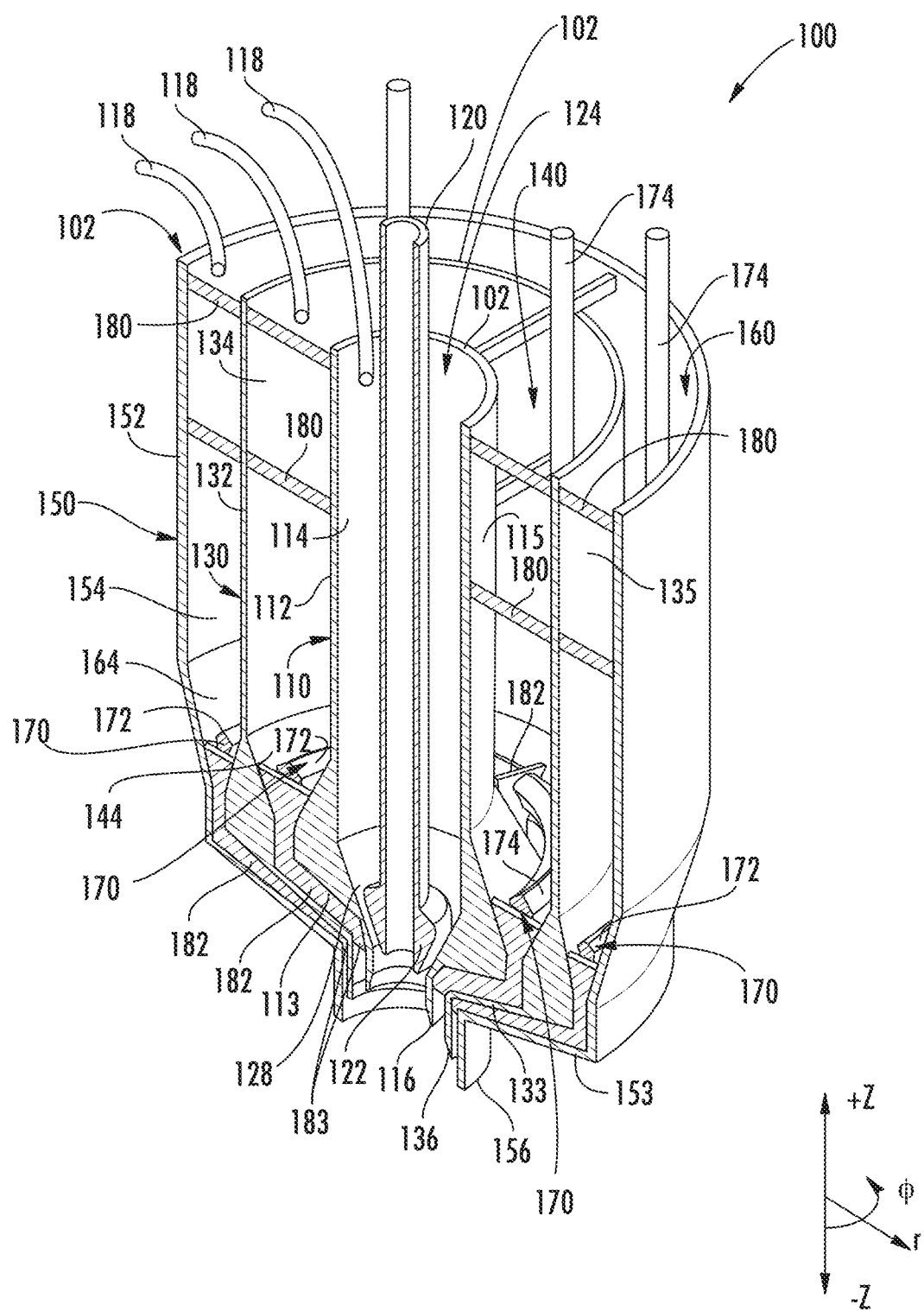
FIG. 1A schematically depicts a cross-sectional perspective view of an apparatus for producing glass tubing with one or a plurality of glass layers, according to one or more embodiments shown and described herein.

Reference will now be made in detail to embodiments of apparatuses, systems, and methods for continuously producing composite glass tube, examples of which are illustrated in the accompanying drawings. Whenever possible, the same reference numerals will be used throughout the drawings to refer to the same or like parts.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

Directional terms as used herein—for example up, down, right, left, front, back, top, bottom—are made only with reference to the figures as drawn and the coordinate axis provided therewith and are not intended to imply absolute orientation.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the term "siding" refers to the difference between the minimum wall thickness and the maximum wall thickness of a glass tube or the difference between the minimum layer thickness and maximum layer thickness of a glass layer of a composite glass tube, where the minimum and maximum wall thicknesses or minimum and maximum glass layer thicknesses are determined from a cross-section of the glass tube.

As used herein, "axial" refers the +/−Z direction of the coordinate axis provided in the figures.

Some glass tube manufacturing processes have been developed to produce laminated glass tubing comprising a plurality of glass layers. In these processes, different glass compositions may be used in each of the glass layers of the composite tubing to provide different properties to the glass tubing. For example, the glass compositions for the outer glass layers may be selected to provide additional strength and/or chemical durability to the glass tubing. However, these composite glass manufacturing processes have been restricted to producing laminated glass tubing with glass layer thicknesses that are generally fixed. Thus, the conventional laminated glass tubing processes are not able to produce varying thicknesses of each of the glass layers. Additionally, these conventional laminated glass tubing processes do not enable control of the circumferential distribution of glass flow. These composite glass manufacturing processes may also be limited to batch processing of the composite glass tube due to variations in thickness around the circumference of the glass tube (i.e., sidings) caused by uneven feeding of the glass compositions to the glass tube forming processes.

Embodiments of an apparatus 100 disclosed herein for producing composite glass tube including a plurality of glass layers are illustrated in FIGS. 1A-1C and FIG. 2. The apparatus 100 may include a plurality of cylindrical containers 102 of increasing inner dimensions concentrically arranged and stationary. As used in this disclosure, the term "stationary" as applied to the cylindrical containers refers to each of the cylindrical containers 102 being in a fixed position relative to each of the other cylindrical containers 102. Each cylindrical container 102 has a cylindrical side wall 104 (FIG. 2) and a bottom wall 106 (FIG. 2) extending radially inward from the side wall 104 to a delivery ring 108 (FIG. 2) extending downward from the bottom wall 106. The side walls 104 of adjacent cylindrical containers 102 define an annular chamber therebetween. The side walls 104, bottom walls 106, or a combination of both of adjacent cylindrical containers 102 may define a flow control region in which a distance between the side walls 104 or between the bottom walls 106 decreases. The bottom walls 106 of the adjacent cylindrical containers 102 define an annular flow channel extending inward from the flow control region to the delivery rings 108 of the adjacent cylindrical containers 102. Molten glass introduced to one of the annular chambers may flow downward through the annular chamber, through the flow control region, through the annular flow channel, and to the delivery ring. The molten glass separates from the delivery ring 108 to form an annular layer of molten glass that may be combined with other annular layers of molten glass from other cylindrical containers 102 to produce the composite glass tube including a plurality of glass layers. A blow tube 120 may be disposed in the innermost cylindrical container 110 and positioned to deliver a flow of gas to maintain the inner dimension of the composite glass tube.

The apparatus 100 may also include at least one flow control valve 170 positioned within the flow control region defined between the adjacent cylindrical containers 102. The flow control valve 170 may be translatable relative to the adjacent cylindrical containers 102. Translation of the flow control valve 170 relative to the adjacent cylindrical containers 102 may change the impedance to flow of the molten glass through the flow control region, thereby changing the flow rate of the molten glass through the flow control region and the annular flow channel. Changing the flow rate of the molten glass may change the thickness of the annular glass layer associated with the annular chamber. Multiple flow control valves 170 may be independently positioned to control the circumferential distribution of glass flow from the cylindrical containers, thereby controlling the circumferential thickness profile of the composite glass tube or a specific glass layer.

The apparatus 100 disclosed herein may enable control of the thickness of one or a plurality of the glass layers of the composite glass tube or the ratios of thicknesses between layers of the composite glass tube. Thus, the apparatus may be easily converted between various configurations to produce different composite glass tube products that include different thicknesses and/or different glass compositions. This may enable the production of different SKUs of composite glass tube using a single apparatus and production line. In addition, the apparatus may enable control of the circumferential glass flow distribution (i.e., siding) of specific glass layers, thereby changing the thickness of one or more portions of the circumference of the composite glass tube relative to the other portions of the composite glass tube. Thus, the apparatus and method may enable tight control of glass tube dimensions, such as outer diameter, inner diameter, thickness, and sidings, to produce glass tube that conforms with the tight dimensional tolerances required in certain applications. The circumferential glass flow distribution may also be adjusted to compensate for circumferential variations in the height of the molten glass in each of the annular chambers. Thus, the apparatus may enable each glass composition to be continuously fed to each annular chamber of the apparatus from a single feed tube.

The apparatus may also enable the production of composite glass tube having improved chemical durability and mechanical strength by enabling the use of different glass compositions with different properties for each of the glass layers of the composite glass tube. Thus, the apparatus may eliminate the need for additional process steps such as ion-exchange strengthening, thermal tempering, or other tempering processes to strengthen the glass tube post-production. Additionally, some glass compositions may not be suited to ion-exchange strengthening or other tempering processes. For example, some glass compositions may lack smaller-sized alkali metal ions that are replaced by larger-sized ions during ion-exchange processes. Thus, the apparatus may enable the production of strengthened composite glass tube from glass compositions that are not suited to ion exchange or thermal tempering.

The embodiment of FIGS. 1A-1C, as well as various other embodiments of the apparatuses, systems, and methods for continuously producing composite glass tube will be described herein with specific reference to the appended drawings. Although the apparatuses and systems are described herein in the context of producing a composite glass tube having a plurality of layers, it is understood that embodiments of the apparatus may also be adapted to produce glass tube having single glass layer.

Figure 1B:
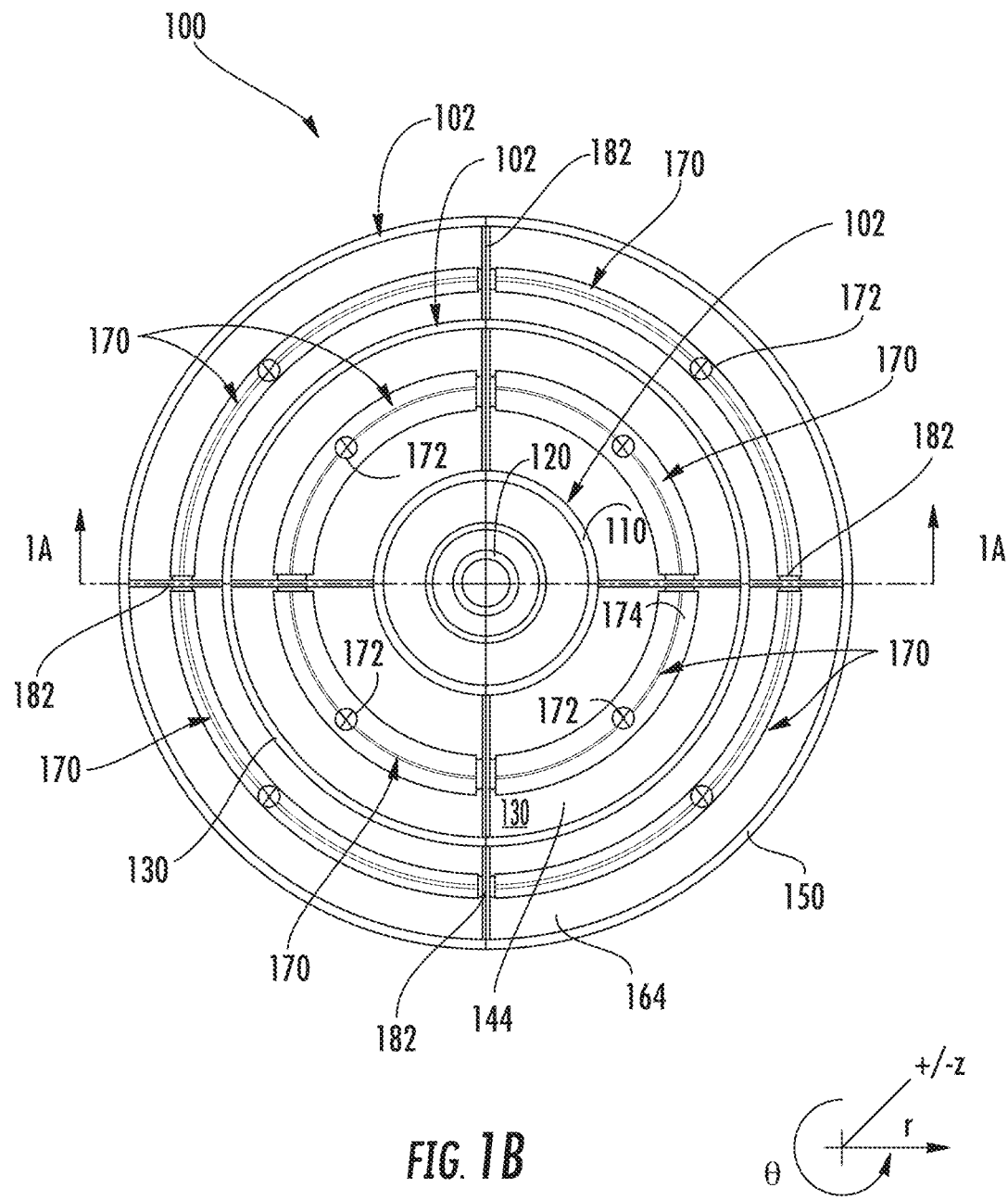
FIG. 1B schematically depicts a top view of the apparatus of FIG. 1A, according to one or more embodiments shown and described herein.
Figure 1C:
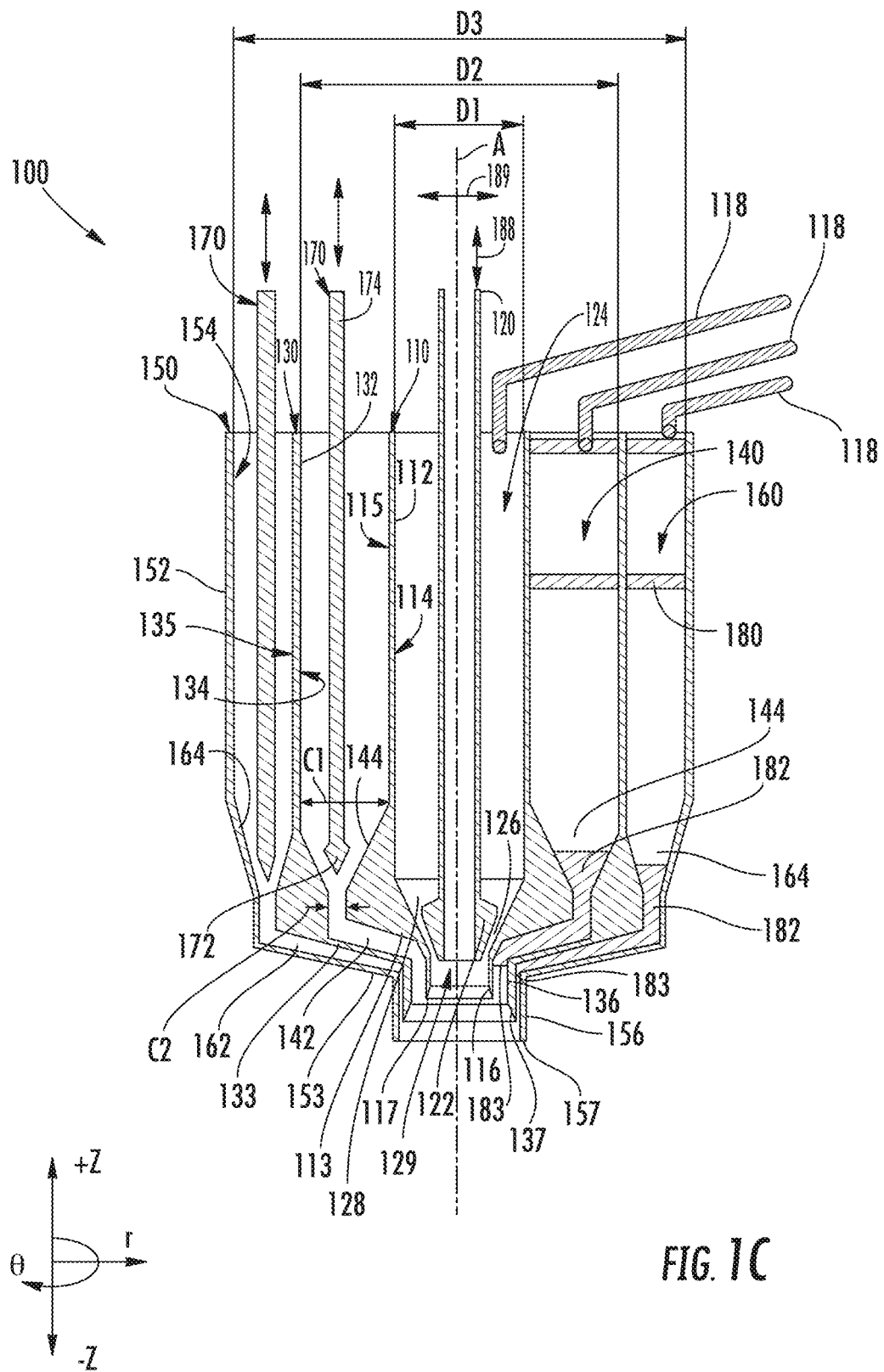
FIG. 1C schematically depicts a side view in cross-section of the apparatus of FIG. 1A, according to one or more embodiments shown and described herein.
Figure 2:
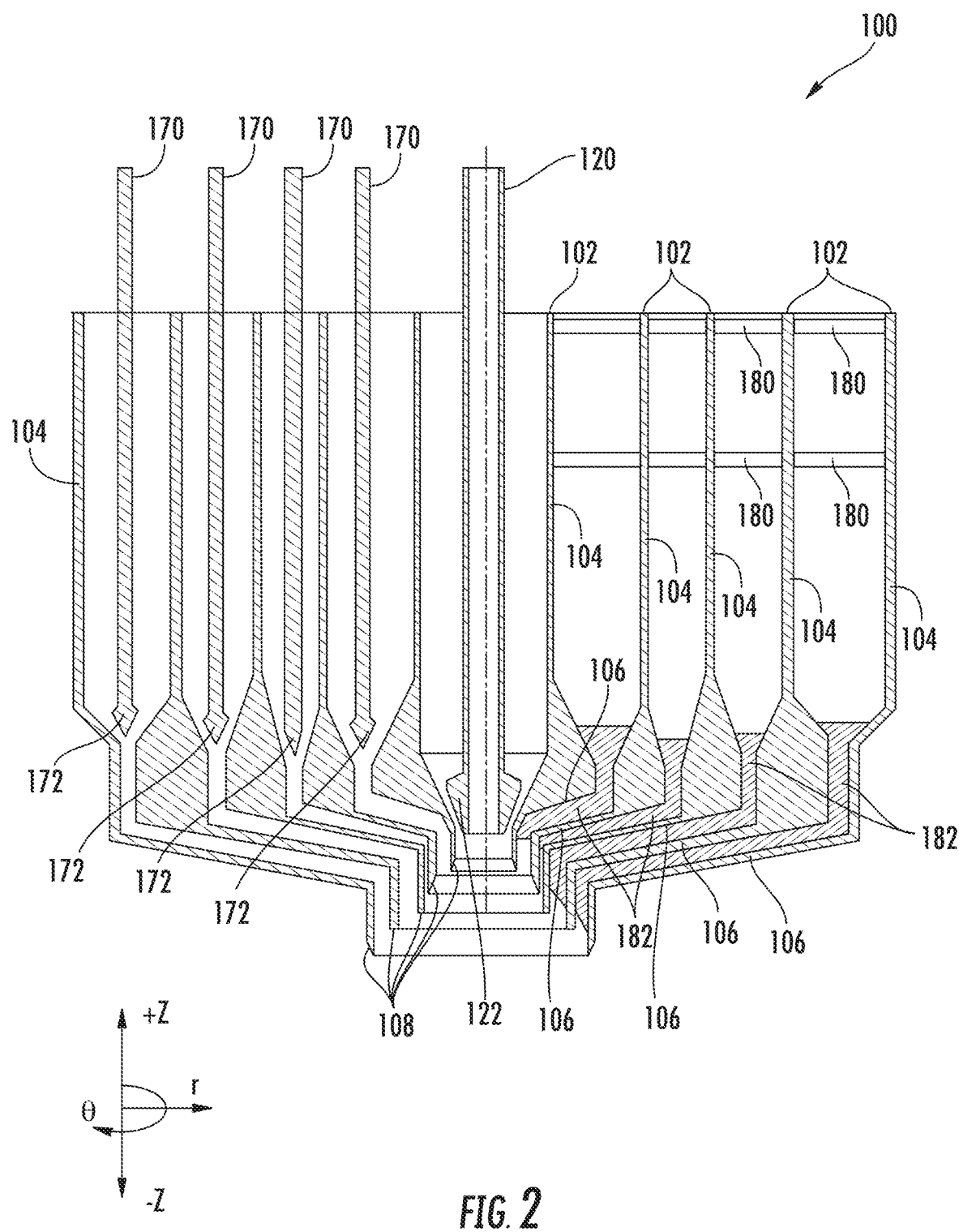
FIG. 2 schematically depicts a side view in cross-section of another embodiment of an apparatus for producing composite glass tube with a plurality of glass layers, according to one or more embodiments shown and described herein.
Figure 19:
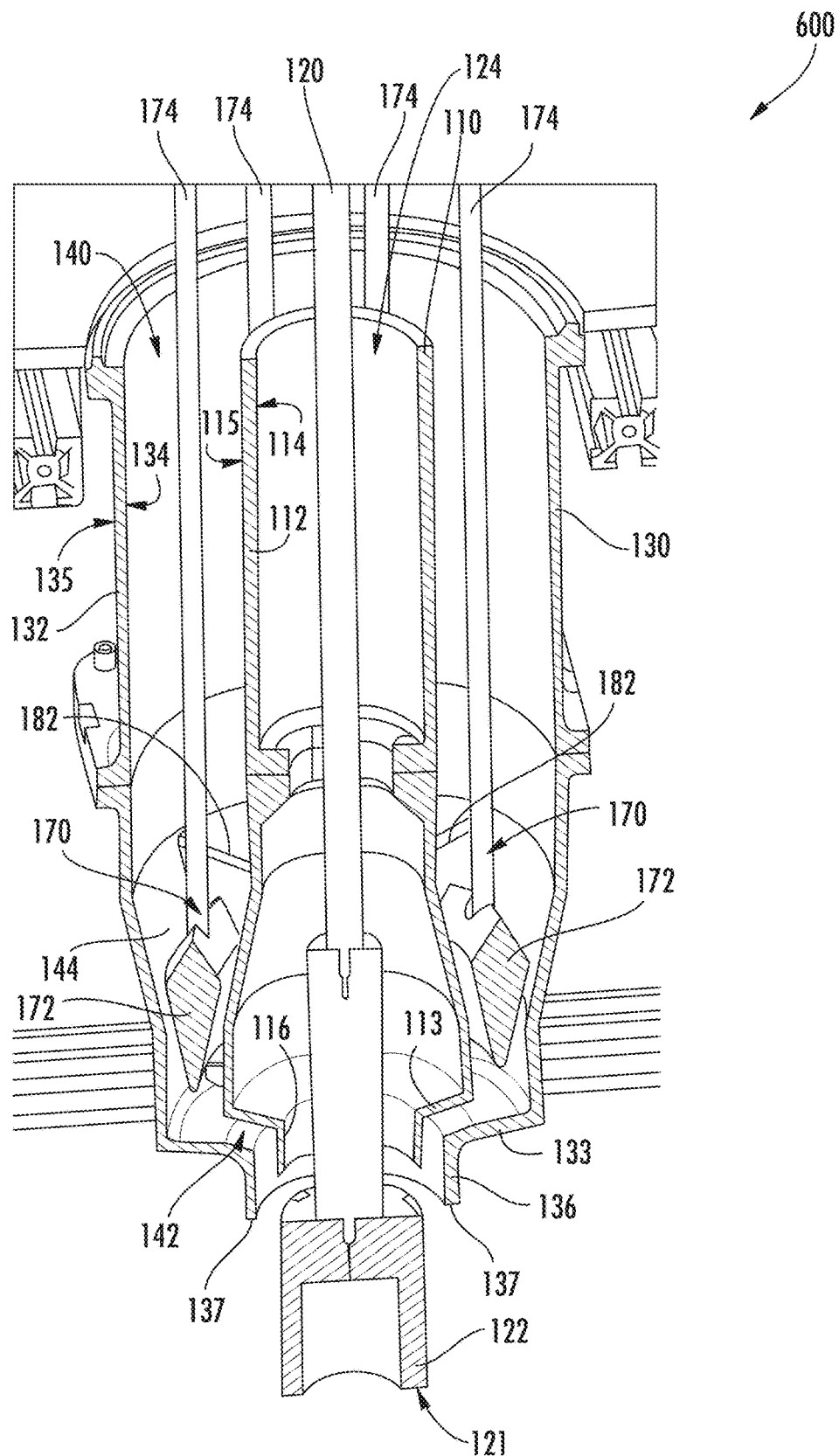
FIG. 19 schematically depicts a perspective view in cross section of an experimental apparatus for evaluating operation of the flow control valves, according to one or more embodiments shown and described herein.

Referring now to FIGS. 1A-1C, as previously discussed, the apparatus 100 for producing a composite glass tube with a plurality of layers includes a plurality of cylindrical containers 102 of increasing inner dimensions. Each of the cylindrical containers may be associated with one of the plurality of glass layers. The plurality of cylindrical containers 102 may be concentrically arranged and fixed relative to one another. For example, the apparatus 100 may include an innermost cylindrical container 110, a first outer cylindrical container 130, and a second outer cylindrical container 150. Although depicted in FIGS. 1A-1C as having three cylindrical containers 102, in some embodiments, the apparatus 100 may have more than three cylindrical containers 102, such as 4, 5, 6, 7, 8, or more than 8 cylindrical containers 102. For example, FIG. 2 depicts an embodiment of apparatus 100 having 5 cylindrical containers 102. In some embodiments, the apparatus 100 may include 2 cylindrical containers 102 or even a single cylindrical container 102. For example, an apparatus having two cylindrical containers is depicted in FIG. 19 and is subsequently described in this disclosure.

In some embodiments, the cylindrical containers 102, such as the innermost cylindrical container 110, the first outer cylindrical container 130, and the second outer cylindrical container 150 of FIGS. 1A-1C may be constructed of electrically conductive refractory metals. Electrically conductive refractory metals may include platinum or platinum-containing metals such as platinum-rhodium, platinum-iridium, dispersed hardened platinum materials, and combinations thereof. For example, in some embodiments, the cylindrical containers 102 may include platinum. In some embodiments, the cylindrical containers 102 may include dispersed hardened platinum. Other refractory metals may include molybdenum, palladium, rhenium, tantalum, titanium, tungsten, ruthenium, osmium, zirconium, and alloys thereof and/or zirconium dioxide. Alternatively, in other embodiments, the cylindrical containers 102 may include other refractory materials, such as, but not limited to zircon (e.g., zirconia), silicon carbide, xenotime, alumina-based refractory ceramics, aluminosilicate refractory ceramics, other refractory materials, or combinations of these. In some embodiments, the cylindrical containers 102 may include a refractory ceramic material cladded with a refractory metal.

Referring back to FIGS. 1A-1C, the innermost cylindrical container 110 has a side wall 112. The side wall 112 may be cylindrical in shape. As used in this disclosure, the term "cylindrical" refers to an elongate hollow shape and does not imply any specific cross sectional shape. For example, when viewed in top view, the side wall 112 may have a cross-sectional shape that is circular, oval, polygonal, or other shape. The side wall 112 may have an inner dimension D1, such as but not limited to an inner diameter or an inner width. In some embodiments, the inner dimension D1 of the side wall 112 may be generally constant in the vertical direction (i.e., +/−Z direction of the coordinate axis of FIGS. 1A-1C) from the top of the side wall 112 to a flow control region 128. Alternatively, in other embodiments, the inner dimension D1 of the side wall 112 may vary from the top of the innermost cylindrical container 110 to the flow control region 128. As used in this disclosure, the term "cylindrical" is intended to include embodiments in which the cylindrical body is generally cylindrical but the inner dimension of the cylindrical body may vary along in the axial direction, such that the side walls of the cylindrical container are sloped, curved or irregular-shaped. In some embodiments, the side wall 112 of the innermost cylindrical container 110 may be bell-shaped.

In the flow control region 128, the side wall 112, or the inner surface 114 of the side wall 112, may slope inward (i.e., in the decreasing r direction of the coordinate axis in FIGS. 1A-1C) towards an innermost delivery ring 116. The innermost delivery ring 116 may extend vertically downward (i.e, in the −Z direction of the coordinate axis of FIG. 1C) from the side wall 112 of the innermost cylindrical container 110 to a distal end 117 of the innermost delivery ring 116.

The innermost cylindrical container 110 may have a bottom wall 113 that extends radially inward (i.e., in the decreasing r direction of the coordinate axis of FIGS. 1A and 1C) from the side wall 112 to the innermost delivery ring 116 extending downward (i.e., in the −Z direction of the coordinate axis of FIGS. 1A and 1C) from the bottom wall 113. For example, in some embodiments, an outer surface 115 of the side wall 112 of the innermost cylindrical container 110 may slope outward (i.e., in the increasing r direction of the coordinate axis of FIGS. 1A-1C), and the bottom wall 113 may extend between the outer surface 115 and the inner surface 114 of the side wall 112. In some embodiments, the bottom wall 113 may slope inward and vertically downward from the outer surface 115 towards the inner surface 114 of the side wall 112. The innermost delivery ring 116 may define a central opening 129 in the bottom wall 113 of the innermost cylindrical container 110. The inner surface 114 of the side wall 112 may converge toward a center axis A of the innermost cylindrical container 110 to the innermost delivery ring 116. The innermost delivery ring 116 may be an annular ring that may provide an annular shape to molten glass flowing down the surfaces of the innermost delivery ring 116.

Figure 11:
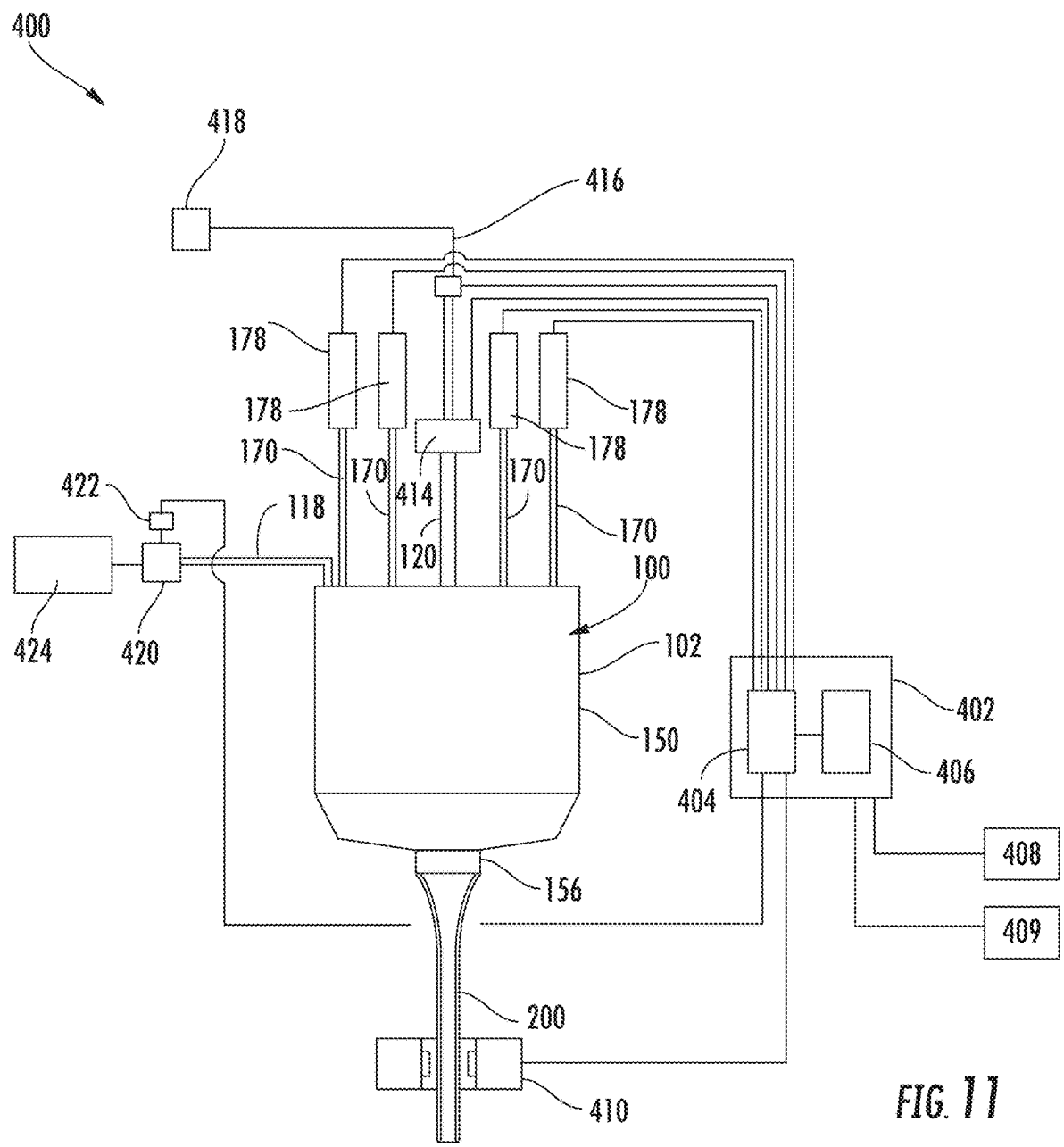
FIG. 11 schematically depicts a system for producing a composite glass tube with a plurality of glass layers, the system including the apparatus of FIG. 1A, according to one or more embodiments shown and described herein.

Referring to FIGS. 1A and 1C, the apparatus 100 may include a blow tube 120. The blow tube 120 may be a hollow tube that includes a head 122 positioned at a proximal end 121 of the blow tube 120. The distal end of the blow tube 120 may be fluidly coupled to a gas source 416 (FIG. 11). A gas control valve 418 (FIG. 11) may be positioned between the gas source 416 and the distal end of the blow tube 120 to control the flow of gas delivered at the proximal end 121 of the blow tube 120. The blow tube 120 may be operable to deliver a gas flow at the innermost delivery ring 116. The head 122 of the blow tube 120 may be tapered so that the head 122 of the blow tube 120 is bell-shaped. At least a portion of the blow tube 120 may be disposed in the innermost cylindrical container 110. The proximal end 121 of the blow tube 120 may be positioned in the innermost cylindrical container 110, and the blow tube 120 may be vertically oriented (i.e., in the +/−Z direction of the coordinate axis of FIGS. 1A and 1C) with the head 122 at the proximal end 121 positioned downward (i.e., in the −Z direction) towards the innermost delivery ring 116. In other words, the proximal end 121 of the blow tube 120 may be positioned proximate the innermost delivery ring 116.

As illustrated in FIG. 1A, the blow tube 120 and the innermost cylindrical container 110 may define an inner annular chamber 124 between the blow tube 120 and the inner surface 114 of the innermost cylindrical container 110. A molten glass composition may be introduced to the inner annular chamber 124 through at least one feed tube 118. In some embodiments, the molten glass composition may be introduced to the inner annular chamber 124 from a single feed tube 118.

The head 122 of the blow tube 120 and the inner surface 114 of the side wall 112 in the flow control region 128 of the innermost cylindrical container 110 may define an annular flow channel 126 between the head 122 and the inner surface 114 of the side wall 112 in the flow control region 128. The annular flow channel 126 may extend from the flow control region 128 of the innermost cylindrical container 110 to the innermost delivery ring 116. Molten glass introduced to the inner annular chamber 124 of the innermost cylindrical container 110 may flow from the flow control region 128, into the annular flow channel 126, and through the annular flow channel 126 to the innermost delivery ring 116.

The blow tube 120 may be translatable relative to the innermost cylindrical container 110. For example, in some embodiments, the blow tube 120 may be translatable in the vertical direction (i.e., in the +/−Z direction of the coordinate axis in FIGS. 1A and 1C) relative to the innermost cylindrical container 110. Alternatively, in some embodiments, the blow tube 120 may be fixed in the vertical direction but may be horizontally translatable (i.e., translatable in the +/−r or +/−θ directions of the coordinate axis of FIGS. 1A and 1C) relative to the innermost cylindrical container 110. In still other embodiments, the blow tube 120 may be translatable in the vertical and horizontal directions relative to the innermost cylindrical container 110.

Translation of the blow tube 120 relative to the innermost cylindrical container 110 may control the flow rate, circumferential distribution, or both of the molten glass from the inner annular chamber 124 of the innermost cylindrical container 110 to the innermost delivery ring 116. Translation of the blow tube 120 in the vertical direction (i.e., in the +/−Z direction of the coordinate axis of FIGS. 1A and 1C) changes the average width of the gap G1 between the head 122 of the blow tube 120 and the inner surface 114 of the innermost cylindrical container 110 in the flow control region 128. Vertical translation of the blow tube 120 is indicated in FIG. 1C by the vertical double-arrow 188 positioned above the blow tube 120. Changing the width of the gap G1 through translation of the blow tube 120 in the vertical direction may change the impedance to flow of the molten glass through the annular flow channel 126, thereby changing the flow rate of the molten glass through the annular flow channel 126 to the innermost delivery ring 116. Changing the flow rate of the molten glass through the annular flow channel 126 to the innermost delivery ring 116 may change the thickness of the glass layer associated with the innermost cylindrical container 110.

Additionally, translation of the blow tube 120 horizontally (i.e., in the +/−r or +/−θ directions of the cylindrical coordinate axis of FIGS. 1A and 1C) relative to the fixed position of the innermost cylindrical container 110 may change the width of the gap G1 around the circumference of the head 122 of the blow tube 120. Horizontal translation of the blow tube 120 is indicated in FIG. 1C by the horizontally oriented double-arrow 189 positioned above the blow tube 120. In other words, horizontal translation of the blow tube 120 relative to the innermost cylindrical container 110 may offset the blow tube 120 from the center axis A of the innermost cylindrical container 110 so that the blow tube 120 ceases to be concentric with respect to the 110. Thus, the width of the gap G1 varies around the circumference of the head 122 of the blow tube 120. Translating the blow tube 120 horizontally relative to the innermost cylindrical container 110 may control the circumferential distribution of the molten glass flowing through the annular flow channel 126. In other words, one circumferential region of the annular flow channel 126 may have a different flow rate of molten glass than another circumferential region of the annular flow channel 126.

Controlling the circumferential distribution of the molten glass flowing through the annular flow channel 126 to the innermost delivery ring 116 may enable control of the circumferential thickness of the glass layer produced by the innermost cylindrical container 110. Controlling the circumferential distribution of the molten glass flowing between the head 122 of the blow tube 120 and the inner surface 114 of the innermost cylindrical container 110 may also enable the apparatus 100 to compensate for differences in the level of molten glass in the innermost cylindrical container 110 caused by off-centered positioning of the single feed tube 118 relative to the innermost cylindrical container 110.

Referring to FIGS. 1A-1C, the first outer cylindrical container 130 may include a side wall 132 and a bottom wall 133. The side wall 132 of the first outer cylindrical container 130 may have an inner dimension D2, such as but not limited to an inner diameter or an inner width, that is greater that than the inner dimension D1 of the innermost cylindrical container 110. In some embodiments, the inner dimension D2 of the side wall 132 may be greater than an outer dimension of the innermost cylindrical container 110. The first outer cylindrical container 130 may be concentrically arranged around the innermost cylindrical container 110. In some embodiments, the first outer cylindrical container 130 may fully surround the innermost cylindrical container 110. The first outer cylindrical container 130 may be concentric about the center axis A of the innermost cylindrical container 110. The position of the first outer cylindrical container 130 may be fixed relative to the position of the innermost cylindrical container 110. The side wall 132 of the first outer cylindrical container 130 may be cylindrical in shape. When viewed in top view, the side wall 132 may have a cross-section that is circular, oval, polygonal, or other shape. In some embodiments, the inner dimension D2 of the side wall 132 may be generally constant in the vertical direction (i.e., +/−Z direction of the coordinate axis of FIGS. 1A-1C) from the top of the side wall 132 to a flow control region 144 of the first outer cylindrical container 130. Alternatively, in other embodiments, the inner dimension D2 of the side wall 132 may change slightly from the top of the side wall 132 of the first outer cylindrical container 130 to the flow control region 144 of the first outer cylindrical container 130.

The first outer cylindrical container 130 may have a bottom wall 133 that may extend from the side wall 132 to a first outer delivery ring 136. In some embodiments, the bottom wall 133 may extend radially inward (i.e., in the decreasing r direction of the coordinate axis of FIGS. 1A and 1C) from the side wall 132 to the first outer delivery ring 136. Alternatively, in some embodiments, the bottom wall 133 may extend radially inward and vertically downward (i.e., in the +/−Z direction of the coordinate axis of FIGS. 1A and 1C) from the side wall 132 to the first outer delivery ring 136.

Referring to FIGS. 1A and 1C, the first outer delivery ring 136 may extend vertically downward (i.e., in the −Z direction) from the bottom wall 133 of the first outer cylindrical container 130 to define a central opening in the bottom wall 133 of the first outer cylindrical container 130. The first outer delivery ring 136 may be an annular ring that provides an annular shape to molten glass flowing down the surfaces of the first outer delivery ring 136 and between the first outer delivery ring 136 and the innermost delivery ring 116. The first outer delivery ring 136 may terminate in a distal end of the first outer delivery ring 136. The first outer delivery ring 136 may be larger than the innermost delivery ring 116 so that the first outer delivery ring 136 may surround the innermost delivery ring 116. The first outer delivery ring 136 may be spaced apart from the innermost delivery ring 116 to allow molten glass to flow between the first outer delivery ring 136 and the innermost delivery ring 116.

In some embodiments, each successive outer delivery ring, such as the delivery ring 136 extending from the first outer cylindrical container 130 or a delivery ring 156 extending from a second outer cylindrical container 150, may extend further downward (i.e., −Z direction of the coordinate axis of FIG. 4A) relative to the innermost delivery ring 116. For example, referring to FIG. 1C, in some embodiments, the distal end 137 of the first outer delivery ring 136 may extend from the bottom wall 133 of the first outer cylindrical container 130 so that the distal end 137 of the first outer delivery ring 136 is vertically below the distal end 117 of the innermost delivery ring 116 extending from the innermost cylindrical container 110.

The side walls of adjacent cylindrical containers 102 of the apparatus 100, such as the side wall 112 of the innermost cylindrical container 110 and the side wall 132 of the first outer cylindrical container 130, may define an annular chamber between the side walls. Referring to FIG. 1C, the side wall 112 of the innermost cylindrical container 110 and the side wall 132 of the first outer cylindrical container 130 may define an annular chamber 140. The annular chamber 140 may be defined between the inner surface 134 of the side wall 132 and the outer surface 115 of the side wall 112. The annular chamber 140 may extend vertically downward (i.e, in the −Z direction of the coordinate axis of FIG. 1C) from the top ends of the innermost cylindrical container 110 and first outer cylindrical container 130 to a flow control region 144. The annular chamber 140 provides an annular volume to receive a quantity of molten glass for producing a glass layer of the composite glass tube. The side wall 132 of the first outer cylindrical container 130 may be spaced apart from the side wall 112 of the innermost cylindrical container 110 by a distance C1 measured between the inner surface 134 of the side wall 132 and the outer surface 115 of the side wall 112. In some embodiments, the distance C1 between the inner surface 134 of the side wall 132 and the outer surface 115 of the side wall 112 may be substantially constant along a vertical dimension of the annular chamber 140.

The side walls or the bottom walls of the adjacent cylindrical containers 102, such as the innermost cylindrical container 110 and the first outer cylindrical container 130, may define the flow control region 144 at the lower end of the annular chamber 140 (i.e., the end of the annular chamber in the −Z direction). For example, the side wall 112 of the innermost cylindrical container 110 and the side wall 132 of the first outer cylindrical container 130 may converge to form the flow control region 144, which comprises a narrowed section in which the distance between the side walls or bottom walls is less than the distance between the side walls in the annular chamber 140. In some embodiments, in the flow control region 144, the distance C1 between the side walls or the bottom walls may vary through the flow control region 144 as shown in FIG. 1C. Alternatively, in other embodiments, the distance C1 between the side walls or the bottom walls may be constant throughout the flow control region 144 as shown in FIGS. 5A-5C.

Referring to FIG. 1C, in some embodiments, the side wall 132 of the first outer cylindrical container 130 and the side wall 112 of the innermost cylindrical container 110 define the flow control region 144. The flow control region 144 may extend from the annular chamber 140 to an annular flow channel 142 defined between the bottom wall 133 of the first outer cylindrical container 130 and the bottom wall 113 of the innermost cylindrical container 110. In the flow control region 144, the distance C1 between the inner surface 134 of the side wall 132 and the outer surface 115 of the side wall 112 may decrease from a maximum distance C1 at the entrance to the flow control region 144 proximate to the annular chamber 140 to a minimum distance C2 at the exit of the flow control region 144 to the annular flow channel 142.

In some embodiments, in the flow control region 144, the inner surface 134 of the side wall 132 may slope inward (i.e., in the decreasing r direction of the coordinate axis of FIG. 1C) towards the outer surface 115 of the side wall 112. Alternatively, in other embodiments, in the flow control region 144, the outer surface 115 of the side wall 112 may slope outward (i.e., in the increasing r direction of the coordinate axis of FIG. 1C) towards the inner surface 134 of the side wall 132. In still other embodiments, the inner surface 134 of the side wall 132 slopes inward and the outer surface 115 of the side wall 112 slopes outward so that the inner surface 134 of the side wall 132 and the outer surface 115 of the side wall 112 converge toward each other as the side wall 112 and the side wall 132 extend vertically downward towards the annular flow channel 142. In some embodiments, the slope of the inner surface 134 of the side wall 132, the slope of the outer surface 115 of the side wall 112, or both may be constant through the flow control region 144. Alternatively, in other embodiments, the slope of the inner surface 134 of the side wall 132, the slope of the outer surface 115 of the side wall 112, or both may vary through the flow control region 144 from the annular chamber 140 to the annular flow channel 142. For example, the inner surface 134 of the side wall 132, the outer surface 115 of the side wall 112, or both may be curved or irregular-shaped in the flow control region 144. In some embodiments, the slope of the inner surface 134 of the side wall 132 may be a mirror image (e.g., equal slope but opposite sign) of the slope of the outer surface 115 of the side wall 112. Alternatively, the slope of the inner surface 134 of the side wall 132 and the slope of the outer surface 115 of the side wall 112 may have different shapes. In some embodiments, the inner surface 134 of the side wall 132 or the outer surface 115 of the side wall 112 may be substantially vertical (i.e., parallel to central axis A of the apparatus 100).

Referring to FIGS. 5A-5C, in some embodiments, in the flow control region 144, the inner surface 134 of the side wall 132 and the outer surface 115 of the side wall 112 may be parallel throughout the flow control region 144. In these embodiments, the distance C1 between the inner surface 134 of the side wall 132 and the outer surface 115 of the side wall 112 may be constant in the flow control region 144. In other alternative embodiments, the bottom wall 133 of the first outer cylindrical container 130 and the bottom wall 113 of the innermost cylindrical container 110 may define the flow control region 144. In these embodiments, the distance between the bottom wall 113 of the innermost cylindrical container 110 and the bottom wall 133 of the first outer cylindrical container 130 may decrease as the bottom wall 113 and the bottom wall 133 extend radially inward towards the center axis A of the apparatus 100. In still other embodiments, the distance between the bottom wall 113 of the innermost cylindrical container 110 and the bottom wall 133 of the first outer cylindrical container 130 may be constant throughout the flow control region 144 defined between the bottom wall 113 and the bottom wall 133.

The bottom walls of adjacent cylindrical containers 102 may define annular flow channels extending inward from the flow control region to the delivery rings of the adjacent cylindrical containers. Referring to FIG. 1C, the bottom wall 113 of the innermost cylindrical container 110 and the bottom wall 133 of the first outer cylindrical container 130 may define the annular flow channel 142. The annular flow channel 142 may be defined to extend inward (i.e., in the decreasing r direction of the coordinate axis of FIG. 1C) from the flow control region 144 to the first outer delivery ring 136 of the first outer cylindrical container 130. In some embodiments, at least a portion of the annular flow channel 142 may be defined between the side wall 112 of the innermost cylindrical container 110 and the side wall 132 of the first outer cylindrical container 130 so that molten glass flowing through the annular flow channel 142 may flow vertically downward (i.e., in the –Z direction) from the flow control region 144 and then may flow inward towards the center axis A of the apparatus 100 and the first outer delivery ring 136 of the first outer cylindrical container 130.

Referring to FIGS. 1A-1C, the apparatus may also have a second outer cylindrical container 150. The second outer cylindrical container 150 may include a side wall 152 and a bottom wall 153. The side wall 152 of the second outer cylindrical container 150 may have an inner dimension D3, such as but not limited to an inner diameter or an inner width, that is greater that than the inner dimension D2 of the first outer cylindrical container 130. In some embodiments, the inner dimension D3 of the side wall 152 may be greater than an outer dimension of the first outer cylindrical container 130. The second outer cylindrical container 150 may be concentrically arranged around the first outer cylindrical container 130. In some embodiments, the second outer cylindrical container 150 may fully surround the first outer cylindrical container 130. The second outer cylindrical container 150 may be concentric about the center axis A of the innermost cylindrical container 110 and the first outer cylindrical container 130. The position of the second outer cylindrical container 150 may be fixed relative to the position of the innermost cylindrical container 110 and the first outer cylindrical container 130. The side wall 152 of the second outer cylindrical container 150 may have a shape similar to the shapes previously described for the side wall 132.

The second outer cylindrical container 150 may have a bottom wall 153 that may extend from the side wall 152 to a second outer delivery ring 156. In some embodiments, the bottom wall 153 may extend radially inward (i.e., in the decreasing r direction of the coordinate axis of FIGS. 1A and 1C) from the side wall 152 to the second outer delivery ring 156. Alternatively, in some embodiments, the bottom wall 153 may extend radially inward and vertically downward (i.e., in the +/–Z direction of the coordinate axis of FIGS. 1A and 1C) from the side wall 152 to the second outer delivery ring 156.

Referring to FIGS. 1A and 1C, the second outer delivery ring 156 may extend vertically downward (i.e., in the –Z direction) from the bottom wall 153 of the second outer cylindrical container 150 to define a central opening in the bottom wall 153 of the second outer cylindrical container 150. The second outer delivery ring 156 may be an annular ring that provides an annular shape to molten glass flowing down the surfaces of the second outer delivery ring 156 and between the second outer delivery ring 156 and the first outer delivery ring 136. The second outer delivery ring 156 may terminate in a distal end 157 of the second outer delivery ring 156. The second outer delivery ring 156 may be larger than the first outer delivery ring 136 so that the second outer delivery ring 156 may surround the first outer delivery ring 136. The second outer delivery ring 156 may be spaced apart from the first outer delivery ring 136 to allow molten glass to flow between the second outer delivery ring 156 and the first outer delivery ring 136.

An inner surface 154 of the side wall 152 of the second outer cylindrical container 150 and an outer surface 135 of the side wall 132 of the first outer cylindrical container 130 may define an annular chamber 160 and flow control region 164 between the annular chamber 160 and an annular flow channel 162. The bottom wall 153 of the second outer cylindrical container 150 and the bottom wall 133 of the first outer cylindrical container 130 may define the annular flow channel 162. The annular chamber 160, annular flow channel 162, and the flow control region 164 may have any of the features or attributes previously described in relation to the annular chamber 140, annular flow channel 142, and the flow control region 144 defined between the first outer cylindrical container 130 and the innermost cylindrical container 110.

The apparatus 100 may have additional cylindrical containers 102 having increasing inner dimensions and arranged concentrically around the second outer cylindrical container 150. For example, in some embodiments, the apparatus 100 may have 1, 2, 3, 4, 5, 6, 7, or more than 7 cylindrical containers 102. Referring to FIG. 2, in one embodiment, the apparatus 100 may have five cylindrical containers 102, which may be utilized to produce a composite glass tube having up to 5 glass layers. Referring to FIG. 19, the apparatus 100 may have 2 cylindrical containers 102 to produce composite glass tubes having 2 glass layers. The side walls, bottom walls, delivery rings, annular chambers, annular flow channels, and flow control regions of each successive cylindrical container may include features and attributes as previously described in this disclosure in relation to the first outer cylindrical container 130.

The position of each cylindrical container 102, such as the innermost cylindrical container 110, the first outer cylindrical container 130, and the second outer cylindrical container 150, is fixed relative to the other cylindrical containers 102. For example, each of the cylindrical containers 102 may be fixed relative to the other cylindrical containers 102 by coupling the cylindrical containers 102 to each other using a plurality of struts 180. Referring again to FIGS. 1A-1C, fixing the positions of the innermost cylindrical container 110, first outer cylindrical container 130, and second outer cylindrical container 150 relative to each other may maintain the shape of each of the innermost cylindrical container 110, the first outer cylindrical container 130, and the second outer cylindrical container 150 during heat up and operation of the apparatus 100. Structurally fixing the various cylindrical containers 102 to each other helps guide thermal expansion to minimize deformation of original shapes of the cylindrical containers and of the volumes defined in-between the cylindrical containers 102. During normal operation of the apparatus 100, the cylindrical containers 102 are subjected to mechanic and thermal stresses, which could deform shapes. Deformation of the cylindrical containers 102 during normal operation is also reduced by providing structural rigidity to the cylindrical containers 102, such as by fixing them to each other. Fixing the positions of the innermost cylindrical container 110, the first outer cylindrical container 130, and the second outer cylindrical container 150 relative to each other may also enable independent control of the thickness of a glass layer associated with the first outer cylindrical container 130 or the second outer cylindrical container 150 without disrupting or changing the thickness of any of the other glass layers.

Referring to FIGS. 1A and 1C, the apparatus 100 may include a plurality of feed tubes 118 for delivering molten glass to each of the cylindrical containers 102. In some embodiments, the apparatus 100 may include a single feed tube 118 for each one of the plurality of cylindrical containers 102. For example, in FIGS. 1A and 1C, each of the innermost cylindrical container 110, the first outer cylindrical container 130, and the second outer cylindrical container 150 have a single feed tube 118. Each feed tube 118 may be fluidly coupled to a molten glass system 424 (FIG. 11). In some embodiments, the feed tube 118 may be a flow conduit fluidly coupling the molten glass system 424 to one of the cylindrical containers 102. The feed tubes 118 may enable continuous introduction of molten glass compositions to each of the cylindrical containers 102, thereby enabling continuous operation of the apparatus 100. In some embodiments, one or a plurality of the feed tubes 118 may be fluidly coupled to separate molten glass systems so that different glass compositions may be introduced to one or more than one of the cylindrical containers 102.

Separate feed tubes 118 for each cylindrical container 102 may enable the level of molten glass in each cylindrical container 102 to be independent of the level of molten glass in each of the other cylindrical containers 102. Positioning a single feed tube 118 in each cylindrical container 102 may produce a circumferential distribution of the level of molten glass in each cylindrical container 102. The variation in the level of molten glass around the circumference of the cylindrical container 102 may be compensated for by changing the positions of each of the flow control valves 170 relative to each of the other flow control valves 170 associated with the cylindrical container 102. Operation of the control valves 170 will be further described herein.

Referring to FIG. 1A, the apparatus 100 may include a plurality of struts 180 coupled between one or a plurality of the cylindrical containers 102. The struts 180 may maintain the fixed position of each of the cylindrical containers 102 and may provide structural support to the cylindrical containers 102 to reduce the strain on the cylindrical containers 102 during operation. As shown in FIG. 1A, the struts 180 may extend horizontally (i.e., radially or in the +/−r direction of the coordinate axis of FIGS. 1A and 1B) between the innermost cylindrical container 110 and the first outer cylindrical container 130 and between the first outer cylindrical container 130 and the second outer cylindrical container 150. In some embodiments, the struts 180 may be distributed vertically so that multiple struts 180 at different vertical positions (i.e., positions in the +/−Z direction of the coordinate axis of FIGS. 1A and 1C) extend horizontally between the innermost cylindrical container 110 and the first outer cylindrical container 130 and between the first outer cylindrical container 130 and the second outer cylindrical container 150. Additionally, the struts 180 may be circumferentially distributed around the apparatus 100. The struts 180 may be distributed about the cylindrical containers 102 in positions that do not obstruct movement of the flow control valves 170 relative to the cylindrical containers 102, as will be further described herein.

Referring to FIGS. 1A-1C, the apparatus 100 may include a plurality of flow gussets 182 disposed in one or a plurality of the annular flow channels (e.g., annular flow channel 142 and annular flow channel 162). For example, the flow gussets 182 may be disposed in the annular flow channel 142. Each of the flow gussets 182 may be coupled to the innermost cylindrical container 110 and the first outer cylindrical container 130 so that each of the flow gussets 182 bisects the annular flow channel 142 defined between the innermost cylindrical container 110 and the first outer cylindrical container 130. The flow gussets 182 may extend from the flow control region 144, through the annular flow channel 142, to the delivery ring 136 of the first outer cylindrical container 130. In some embodiments, each flow gusset 182 may extend to the distal end 137 of the delivery ring 136. In some embodiments, the flow gussets 182 may extend up into at least a portion of the flow control region 144. In still other embodiments, the flow gussets 182 may extend through the entire flow control region 144. The flow gussets 182 may have any cross-sectional shape. In some embodiments, the flow gussets 182 may be generally flat. Alternatively, in other embodiments, the flow gussets 182 may have a cross-sectional profile that varies from the flow control region 144 to the delivery ring 136. For example, in some embodiments, the thickness of the flow gussets 182 may vary along the annular flow channel 142 from the flow control region 144 to the delivery ring 136. Other shapes for the flow gussets 182 are contemplated.

The flow gussets 182 may separate the annular flow channel 142, and optionally the flow control region 144, into a plurality of angular sectors 184. In some embodiments, the flow gussets 182 may be evenly and circumferentially distributed throughout the annular flow channel 142. Alternatively, in other embodiments, the flow gussets 182 may be irregularly spaced throughout the annular flow channel 142 to produce the angular sectors 184 having different angular dimensions.

The flow gussets 182 may physically separate the molten glass flowing through each angular sector 184 to maintain the impedance to flow created by each of the flow control valves 170 until the molten glasses from each of the angular sectors 184 converges at the delivery ring 136, where the flow gussets 182 terminate. The flow gussets 182 may maintain the circumferential flow distribution of molten glass produced by the flow control valves 170. The molten glass streams merge into a single annular flow of molten glass at the terminal end 183 of the flow gussets 182. The terminal end 183 of the flow gussets 182 may be proximate to the distal end 137 of the delivery ring 136.

Flow gussets 182 may also be disposed in the annular flow channel 162 and, optionally, the flow control region 164 defined between the first outer cylindrical container 130 and second outer cylindrical container 150. Likewise, flow gussets 182 may be disposed in the annular channel and, optionally, the flow control region defined between any two adjacent cylindrical containers 102.

Referring to FIGS. 1A and 1C, the apparatus 100 may include at least one flow control valve 170 to control the flow rate of molten glass from the annular chamber 140, through the flow control region 144, and through the annular flow channel 142. The flow control valves 170 will be described in this disclosure in the context of the first outer cylindrical container 130 and the annular chamber 140, annular flow channel 142, and flow control region 144 defined between the first outer cylindrical container 130 and the innermost cylindrical container 110. However, it is understood that the flow control valves 170 positioned in other of the cylindrical containers 102, such as second outer cylindrical container 150, may include the same features and operation as those described herein in association with the first outer cylindrical container 130.

Figure 3A:
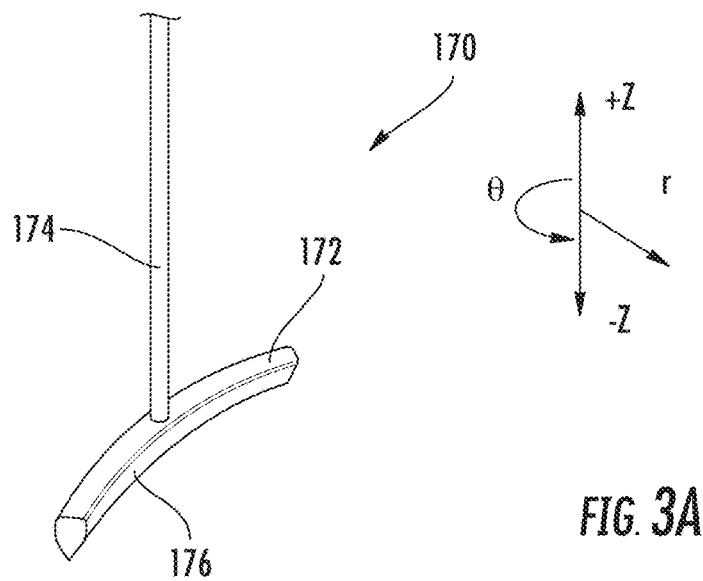
FIG. 3A schematically depicts a perspective view of a flow control valve of the apparatus of FIG. 1A, according to one or more embodiments shown and described herein.
Figure 3B:
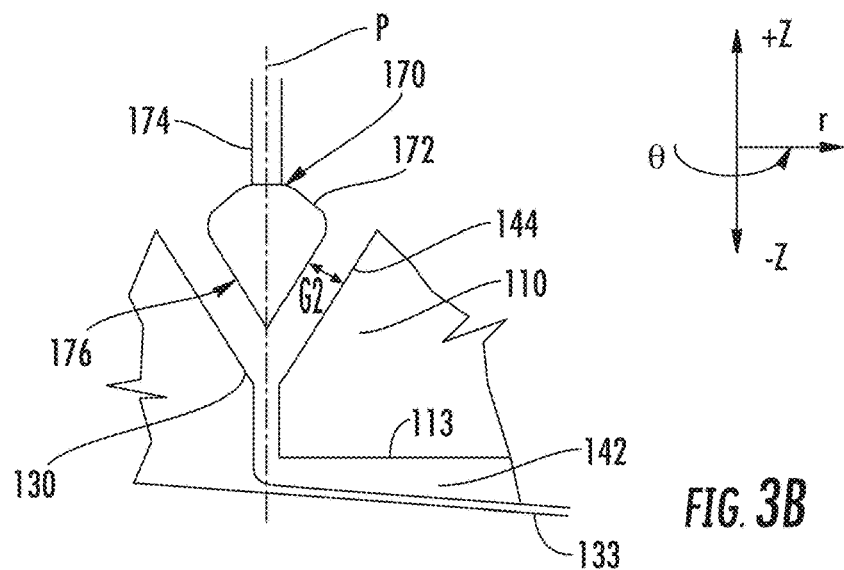
FIG. 3B schematically depicts a side view in cross-section of the flow control valve of FIG. 3A, according to one or more embodiments shown and described herein.
Figure 3C:
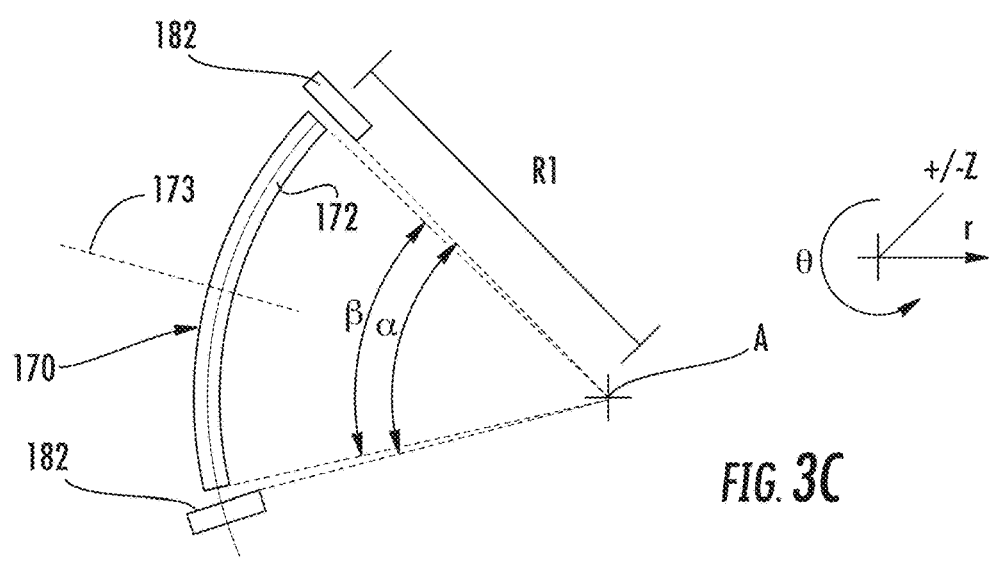
FIG. 3C schematically depicts a top view of the flow control valve of FIG. 3A, according to one or more embodiments shown and described herein.

Referring to FIGS. 3A-3C, each of the flow control valves 170 may include a control element 172 coupled to a shaft 174. The control element 172 may have a shape complimentary to the contours of the inner surface 134 of the first outer cylindrical container 130 or the outer surface 115 of the innermost cylindrical container 110. In some embodiments, the control element 172 may be a plug elongated in the angular direction (i.e., in the +/−θ direction of the coordinate axis of FIGS. 3A-3C) and having at least one control surface 176 shaped to conform to the inner surface 134 of the first outer cylindrical container 130, the outer surface 115 of the innermost cylindrical container 110, or both in the flow control region 144 defined between the first outer cylindrical container 130 and the innermost cylindrical container 110. Referring to FIG. 3B, a cross-sectional view of one embodiment of the control element 172 disposed within the flow control region 144 between the first outer cylindrical container 130 and the innermost cylindrical container 110 is schematically depicted. In some embodiments, the control element 172 may include two control surfaces 176 extending downward (i.e., in the −Z direction of the coordinate axis of FIG. 3B) and converging at a point. The control surfaces 176 may be sloped and the slopes of the control surfaces 176 may be complimentary to the inner surface 134 of the first outer cylindrical container 130 and the outer surface 115 of the innermost cylindrical container 110 in the flow control region 144. Alternatively, in other embodiments, the control element 172 may include a wedge, flap, gate, or other structure that may be engageable with the flow control region 144 defined between the first outer cylindrical container 130 and the innermost cylindrical container 110.

Referring to FIGS. 5A-5C, in other embodiments, the control element 172 may have a width measured in the radial direction (i.e., it the +/−r direction of the coordinate axis in FIG. 5A) that is constant with respect to the vertical direction (i.e., in the +/Z direction). For example, in some embodiments, the control surfaces of the control element 172 of the flow control valve 170 may be parallel to the outer surface 115 of the innermost cylindrical container 110 and the inner surface 134 of the first outer cylindrical container 110 in the flow control region 144. Other shapes for the control element 172 may also be suitable for changing the impedance to flow of molten glass through the flow control region 144.

Referring back to FIGS. 3A and 3C, in some embodiments, the cross-sectional shape of the first outer cylindrical container 130 may be generally circular, and the control element 172 may be arcuate in shape (i.e., having a constant radial dimension relative to the center axis A of the apparatus 100) and may include a radial dimension and an angular dimension corresponding to the flow control region 144. Referring to FIG. 3C, for example, the control element 172 of the flow control valve 170 may have a radius R1 measured from the center axis A of the apparatus 100 and an angular dimension β relative to the center axis A of the apparatus. The radius R1 of the control element 172 may be sufficient to ensure that a midsagittal plane P of the control element 172 is vertically aligned (i.e., in the +/−Z direction of the coordinate axis of FIGS. 3A-3C) with the center of the flow control region 144 throughout the angular dimension β of the control element. The angular dimension β of the control element 172 may be less than the angular dimension α of the angular sector 184 so that the control element 172 can be positioned between the flow gussets 182 defining the angular sector 184. The difference between the angular dimension α of the angular sector 184 and the angular dimension β of the control element 172 may be sufficient to allow the control element 172 to move freely between the flow gussets 182 but not so great that a substantial quantity of molten glass is permitted to flow between the ends of the control element 172 and the flow gussets 182 without flowing between the control element 172 and the inner surface 134 of the first outer cylindrical container 130 or the outer surface 115 of the innermost cylindrical container 110.

The shaft 174 may be coupled to the control element 172 and may extend vertically upward (i.e., in the +Z direction of the coordinate axis of FIGS. 3A-3B). In some embodiments, the shaft 174 may be coupled to the control element 172 at a midpoint 173 of the control element 172. Although depicted and described as having a single shaft 174, it is understood that each of the flow control valves 170 may include a plurality of shafts 174 coupled to the control element 172 and extending upward therefrom.

In some embodiments, the flow control valves 170, including the control element 172 and/or the shaft 174 may be constructed of electrically conductive refractory metals. Electrically conductive refractory metals may include platinum or platinum-containing metals such as platinum-rhodium, platinum-iridium, dispersed hardened platinum materials, and combinations thereof. For example, in some embodiments, the flow control valves 170 may include platinum. In some embodiments, the flow control valves 170 may include dispersed hardened platinum. Other refractory metals may include molybdenum, palladium, rhenium, tantalum, titanium, tungsten, ruthenium, osmium, zirconium, and alloys thereof and/or zirconium dioxide. Alternatively, in other embodiments, the flow control valves 170 may include other refractory materials, such as, but not limited to zircon (e.g., zirconia), silicon carbide, xenotime, alumina-based refractory ceramics, aluminosilicate refractory ceramics, other refractory materials, or combinations of these. In some embodiments, the flow control valves 170 may include a refractory ceramic material cladded with a refractory metal.

Figures 4A, 4B, 4C:
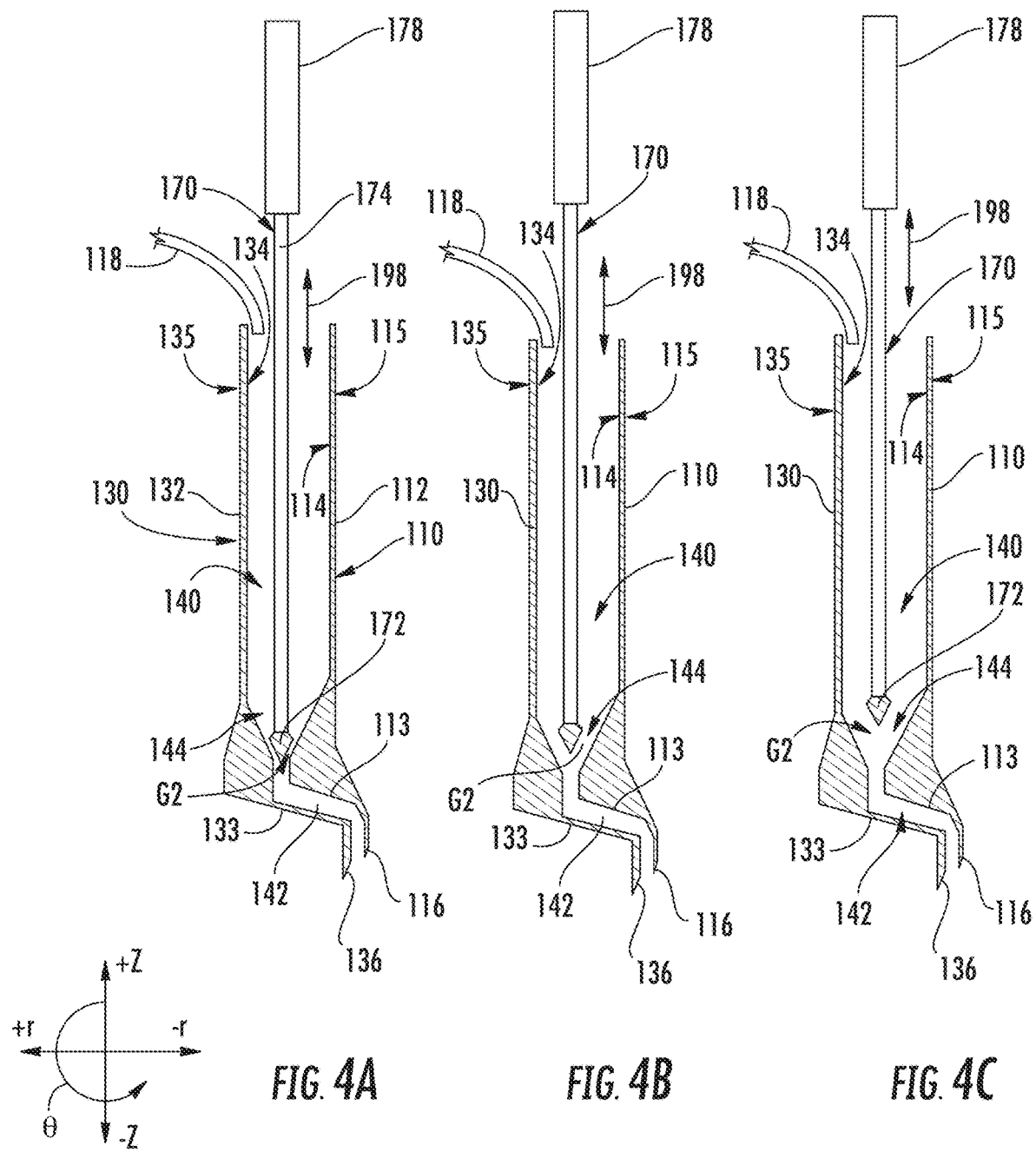
FIG. 4A schematically depicts a side view in cross section of the flow control valve of FIG. 3A positioned at a distance from two cylindrical containers of the apparatus of FIG. 1A resulting in a low glass flow rate, according to one or more embodiments shown and described herein.
FIG. 4B schematically depicts a side view in cross section of the flow control valve of FIG. 3A positioned at a medium distance from the two cylindrical containers of the apparatus of FIG. 1A resulting in a medium glass flow rate, according to one or more embodiments shown and described herein.
FIG. 4C schematically depicts a side view in cross section of the flow control valve of FIG. 3A positioned at a distance from the two cylindrical containers of the apparatus of FIG. 1A resulting in an increased glass flow rate relative to FIG. 4B, according to one or more embodiments shown and described herein.

Referring to FIGS. 4A-4C, each flow control valve 170 may be disposed in the first outer cylindrical container 130 with the control element 172 positioned proximate to the flow control region 144 defined between the first outer cylindrical container 130 and the innermost cylindrical container 110. The shaft 174 may extend vertically upward (i.e., in the +Z direction of the coordinate axis of FIGS. 4A-4C) through the annular chamber 140 and above the tops of the first outer cylindrical container 130 and innermost cylindrical container 110. With the control element 172 positioned proximate to the flow control region 144, the control surface 176 of the control element 172 and the inner surface 134 of the first outer cylindrical container 130, the outer surface 115 of the innermost cylindrical container 110, or both may define a gap G2 between the control surface 176 of the control element 172 and the inner surface 134 of the first outer cylindrical container 130 and/or the outer surface 115 of the innermost cylindrical container 110.

Figure 6A:
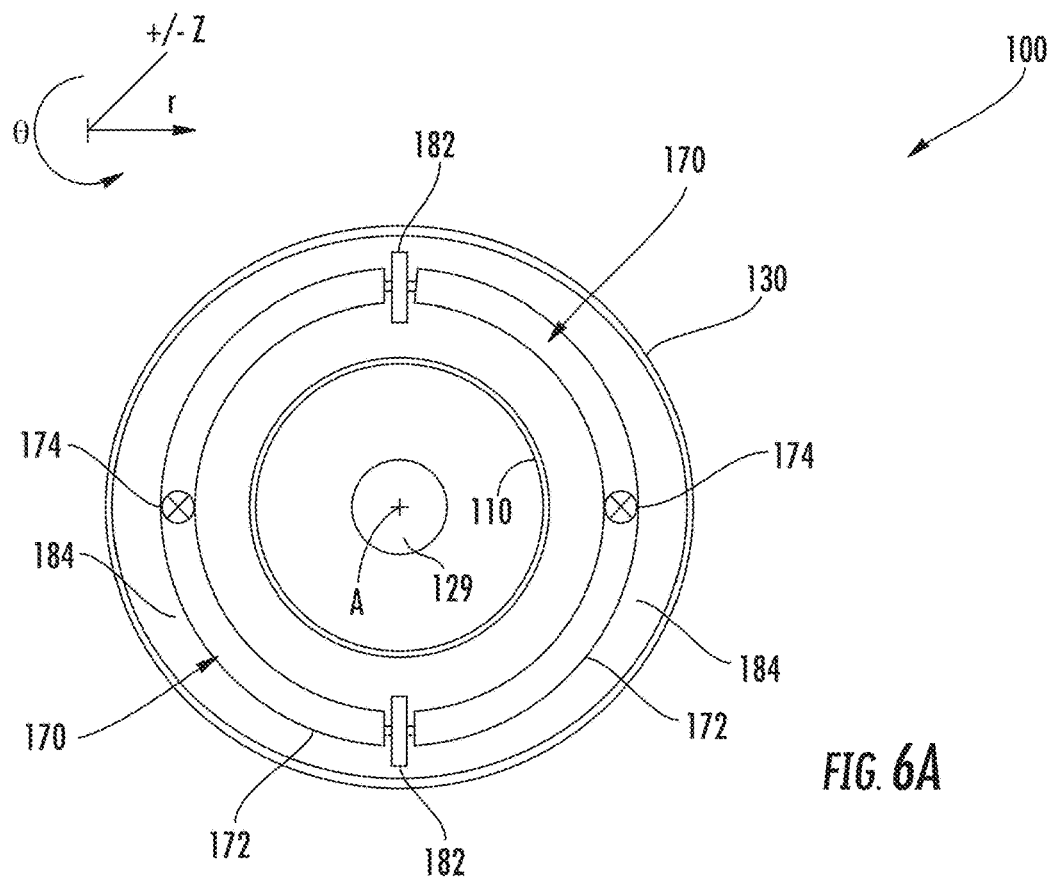
FIG. 6A schematically depicts a top view of another embodiment of an apparatus for producing a composite glass tube, the apparatus including two flow control valves, according to one or more embodiments shown and described herein.
Figure 6B:
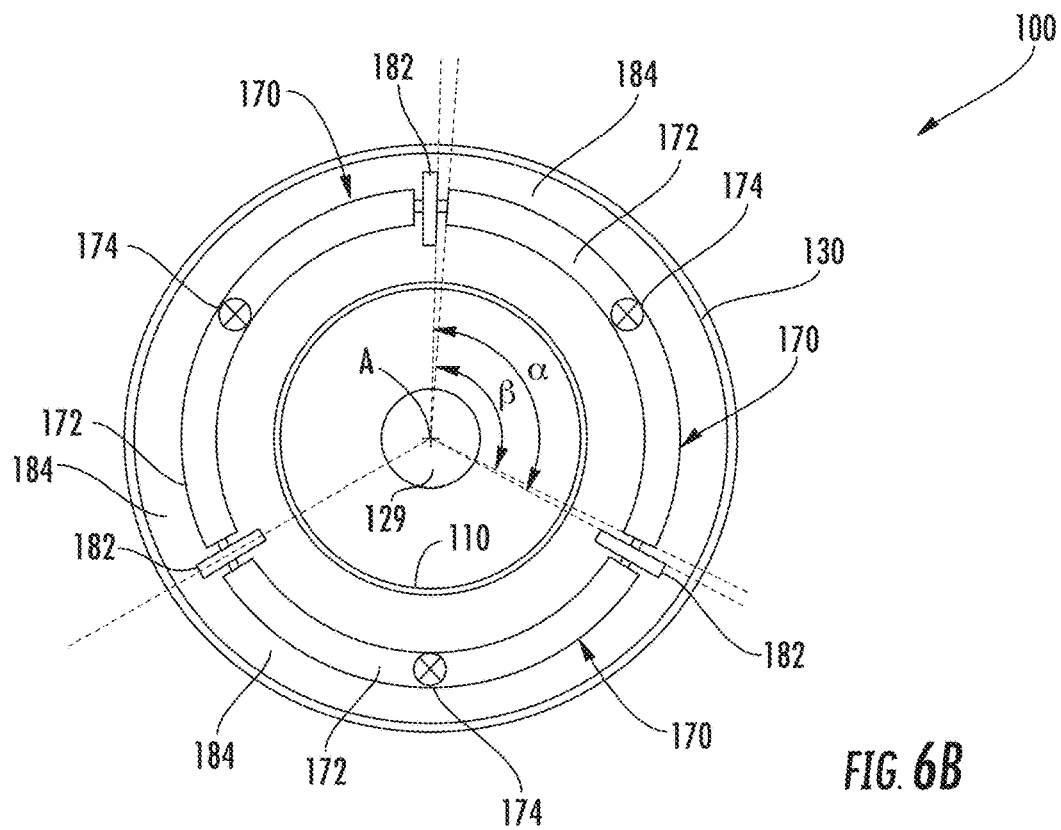
FIG. 6B schematically depicts a top view of another embodiment of an apparatus for producing a composite glass tube, the apparatus including three flow control valves, according to one or more embodiments shown and described herein.
Figure 6C:
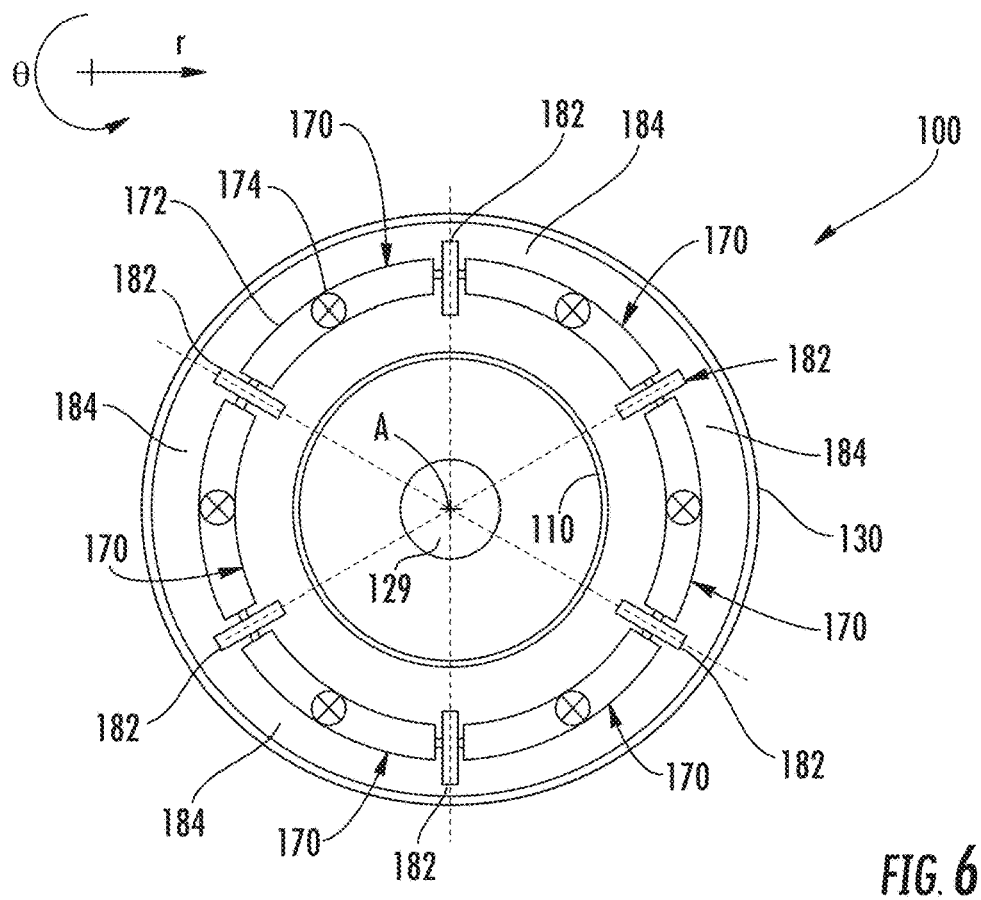
FIG. 6C schematically depicts a top view of another embodiment of an apparatus for producing a composite glass tube, the apparatus including six flow control valves, according to one or more embodiments shown and described herein.
Figure 6D:
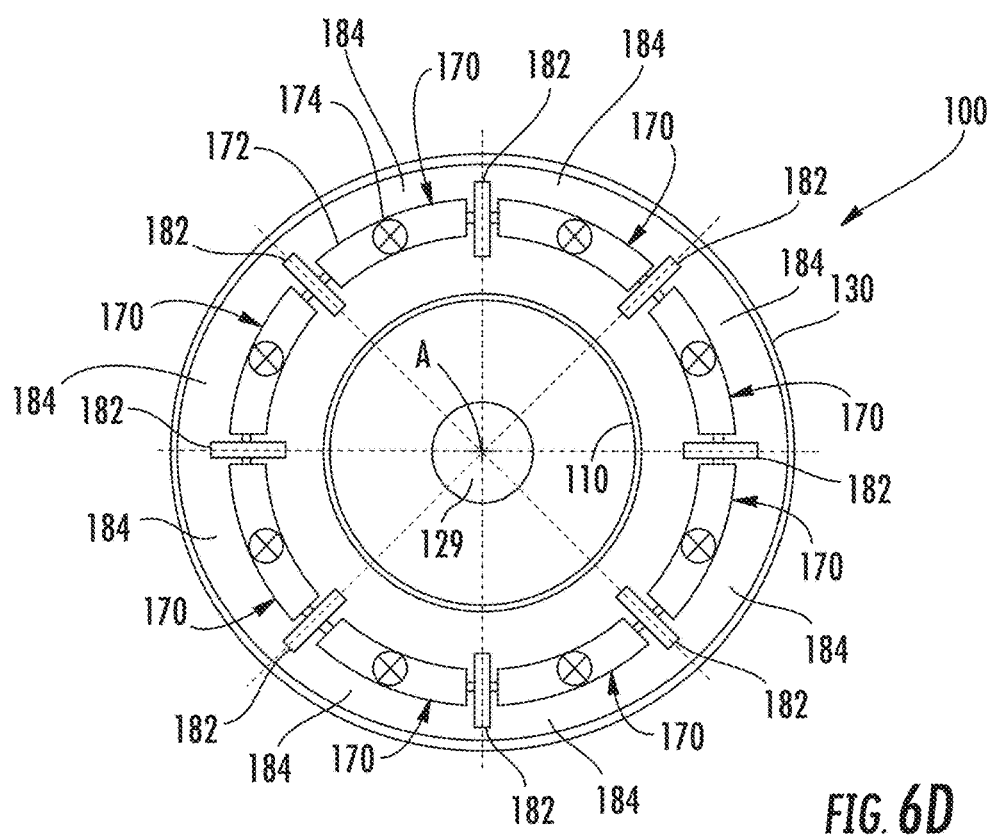
FIG. 6D schematically depicts a top view of another embodiment of an apparatus for producing a composite glass tube, the apparatus having eight flow control valves, according to one or more embodiments shown and described herein.

In some embodiments, the apparatus 100 may include a plurality of flow control valves 170. In some embodiments, the number of flow control valves 170 associated with each cylindrical container, such as the first outer cylindrical container 130, may be equal to the number of flow gussets 182 disposed in the annular flow channel defined by that cylindrical container 102. In some embodiments, the number of flow control valves 170 associated with the first outer cylindrical container 130 may be equal to the number of flow gussets 182 positioned in the annular flow channel 142 defined between the first outer cylindrical container 130 and the innermost cylindrical container 110. The apparatus 100 may have 1, 2, 3, 4, 5, 6, 7, 8, 9, 10, 11, 12, or more than 12 flow control valves 170 disposed between two adjacent cylindrical containers, such as between the innermost cylindrical container 110 and the first outer cylindrical container 130. For example, referring to FIG. 6A, in some embodiments, the first outer cylindrical container 130 may include two flow gussets 182 and two flow control valves 170, each of the two flow control valves 170 associated with one of the two angular sectors 184 defined by the flow gussets 182. Referring to FIG. 6B, in other embodiments, the first outer cylindrical container 130 may have 3 flow control valves 170 with each of the flow control valves 170 positioned in one of the angular sectors 184 defined by the flow gussets 182. Referring to FIG. 1B, the first outer cylindrical container 130 may have 4 flow control valves 170. Referring to FIGS. 6C and 6D, in other embodiments, the first outer cylindrical container 130 may have 6 flow control valves 170 or 8 flow control valves 170, respectively. In still other embodiments, the first outer cylindrical container 130 may have more than 8 flow control valves 170. The flow control valves 170 may be evenly and circumferentially distributed around the first outer cylindrical container 130. As the number of flow gussets 182 and flow control valves 170 for the first outer cylindrical container 130 increases, the ability to adjust the circumferential glass flow distribution of the glass layer associated with the first outer cylindrical container 130 may also increase. Similarly, increasing the number of flow gussets 182 and flow control valves 170 for any of the cylindrical containers 102 may improve the ability to adjust the circumferential glass flow distribution of the glass layer associated with the cylindrical container 102.

Referring to FIGS. 4A-4C, as previously described, each of the plurality of flow control valves 170 may be translatable relative to the innermost cylindrical container 110 and the first outer cylindrical container 130 to change impedance to flow of the molten glass through the flow control region 144. The plurality of flow control valves 170 may be translated in the vertical direction (i.e., in the +/−Z direction), the radial direction (i.e., in the +/−r direction of the coordinate axis in FIGS. 4A-4C), the angular direction (i.e., in the +/−θ direction of the coordinate axis of FIGS. 4A-4C, such as by rotating the flow control valve 170 about the axis A (FIG. 1C) of the apparatus 100), or combinations of these. Translation of the flow control valves 170 relative to the first outer cylindrical container 130 may change the shape of the gap G2 defined between the control element 172 and the inner surface 134 of the side wall 132 and the outer surface 115 of the side wall 112. For example, translation of the flow control valve 170 in the vertical, radial, and/or angular dimensions relative to the first outer cylindrical container 130 may change the radial width, vertical length, and/or angular length of the gap G2, thereby changing the impedance to flow of the molten glass through the flow control region 144.

For example, referring to FIGS. 4A-4C, in some embodiments, the flow control valve 170 may be vertically translatable (i.e., in the +/−Z direction) relative to the innermost cylindrical container 110 and first outer cylindrical container 130. Vertical translation of the flow control valves 170 relative to the first outer cylindrical container 130 is indicated in FIGS. 4A-4C by the vertically oriented double arrows 198 next to the flow control valve 170. Translation of the flow control valve 170 relative to the innermost cylindrical container 110 and first outer cylindrical container 130 may cause the control element 172 to move in the flow control region 144 relative to the innermost cylindrical container 110 and first outer cylindrical container 130 to decrease or increase a width of the gap G2 defined between the control surface 176 of the control element 172 and the inner surface 134 of the first outer cylindrical container 130 and/or the outer surface 115 of the innermost cylindrical container 110. Each of the flow control valves 170 may also be independently translatable relative to each of the other flow control valves 170 associated with the first outer cylindrical container 130, thereby enabling the gap G2 to vary from between the flow control valves 170 of the first outer cylindrical container 130.

Referring now to FIGS. 5A-5C, in other embodiments, the distance C1 may be constant through the flow control region 144 and the control element 172 of the flow control valve 170 may have control surfaces that are generally parallel to the inner surface 134 of the side wall 132 and the outer surface 115 of the side wall 112 in the flow control region 144. In these embodiments, vertical translation of the flow control valve 170 relative to the first outer cylindrical container 130 may increase the length L of the gap G2 between the control element 172 and the inner surface 134 of the side wall 132 and the outer surface 115 of the side wall 112. The radial width of gap G2 may remain constant with translation of the flow control valve 170 relative to the first outer cylindrical container 130.

FIG. 4B schematically depicts operation of the first outer cylindrical container 130 and the flow control valves 170 of the apparatus 100 to produce a glass layer of the composite glass tube from a molten glass composition. Referring to FIG. 4B, the molten glass composition may be introduced to the first outer cylindrical container 130 through the feed tube 118. The molten glass composition may flow downward (i.e., in the −Z direction of the coordinate axis in FIG. 4B) by the force of gravity through the annular chamber 140 defined between the first outer cylindrical container 130 and the innermost cylindrical container 110. Additionally, the molten glass composition may flow circumferentially (i.e., in the +/−θ direction of the coordinate axis of FIG. 4B) around the annular chamber 140 to distribute the molten glass composition throughout the annular chamber 140. In the flow control region 144, the molten glass composition may flow around the control element 172 of each of the flow control valves 170 and through the gap G2 defined between the control surface 176 of the control element 172 and the inner surface 134 of the first outer cylindrical container 130 and/or the outer surface 115 of the innermost cylindrical container 110.

Once it passes through the gap G2, the molten glass composition may flow into and through the annular flow channel 142 from the flow control region 144 to the first outer delivery ring 136. As previously described, the molten glass composition in each angular sector 184 of the annular flow channel 142 defined by the flow gussets 182 may be physically separated from the molten glass composition in each of the other angular sectors 184 of the annular flow channel 142 as the molten glass composition flows through the annular flow channel 142. Thus, flow of the molten glass composition through the annular flow channel 142 may be generally radially inward towards the first outer delivery ring 136. Circumferential flow of the molten glass in the annular flow channel 142 may be substantially prevented by the flow gussets 182.

Referring to FIG. 7A, at the terminal end 183 of the flow gussets 182, the streams of the molten glass composition from each angular sector 184 may recombine at the first outer delivery ring 136. The molten glass composition then flows generally downward (i.e., in the −Z direction of the coordinate axis of FIG. 7A) along the inner surface of the first outer delivery ring 136 in an annular shaped flow. At the distal end 137 of the first outer delivery ring 136, the molten glass composition may separate from the first outer delivery ring 136 to form a glass layer 214 of the molten glass composition 204, which may converge with other glass layers to form the composite glass tube 200.

Referring again to FIGS. 4A-4B, translating the flow control valve 170 relative to the first outer cylindrical container 130 and innermost cylindrical container 110 to increase or decrease the width of the gap G2 may increase or decrease the impedance to flow of the molten glass through the flow control region 144 and into the annular flow channel 142 defined between the first outer cylindrical container 130 and the innermost cylindrical container 110. For example, in FIG. 4A, the control element 172 is positioned close to the flow control region 144 so that the gap G2 is smaller and the impedance to flow of the molten glass between the control element 172 and the first outer cylindrical container 130 and/or innermost cylindrical container 110 is greater compared to the position of the flow control valve 170 in FIG. 4B. In FIG. 4B, the control element 172 is positioned further away from the flow control region 144, thereby increasing the width of the gap G2 and decreasing the impedance to the flow of molten glass. In FIG. 4C, the flow control valve 170 is positioned at a maximum distance from the flow control region 144, thereby increasing the width of the gap G2 to a maximum width, at which the impedance to flow of molten glass between the control element 172 and the first outer cylindrical container 130 and/or the innermost cylindrical container 110 is at a minimum. Increasing or decreasing the impedance to flow of the molten glass through the flow control region 144 by translating the flow control valve 170 relative to the first outer cylindrical container 130 and/or innermost cylindrical container 110 may increase or decrease, respectively, the flow rate of molten glass through the flow control region 144 and into the annular flow channel 142.

Figure 10:
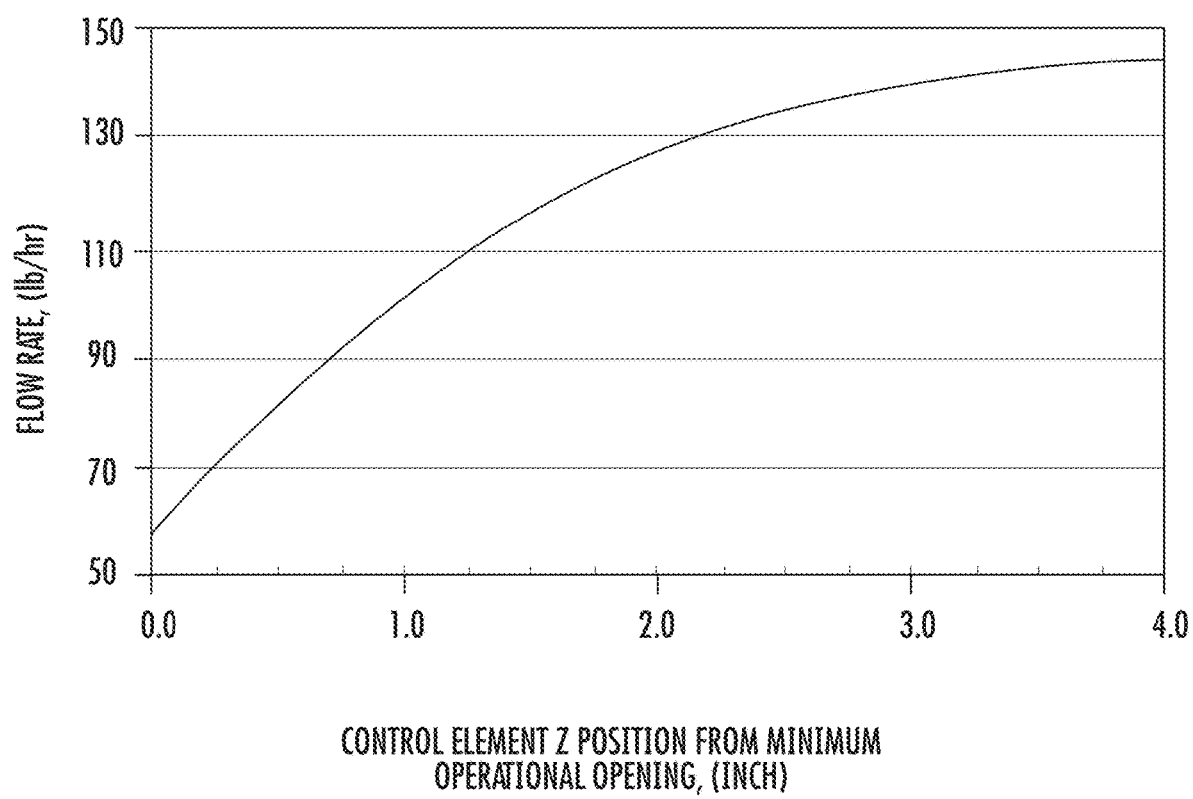
FIG. 10 graphically depicts a flow rate of molten glass (y-axis) as a function of a control element z-position from a minimum operational opening (x-axis) for the flow model of FIGS. 9A and 9B, according to one or more embodiments shown and described herein.

For a given glass level, the maximum flow rate of molten glass through the flow control region 144 is attained when the flow control valve 170 is positioned at its highest position such that the gap G2 is at its maximum width. The minimum position of the flow control valve 170 may be a position below which the flow of molten glass through the flow control region 144 is insufficient to sustain the flow rate of molten glass downstream of the flow control region 144, such as through the annular flow channel 142 and down the first outer delivery ring 136. Referring to FIGS. 9A and 9B, the results of a 2D axis symmetric flow model of molten glass through the flow control region 144 and the annular flow channel 142 defined by the first outer cylindrical container 130 is provided. The 2D axis symmetric flow model was built using commercially available fluid dynamics modeling software available from COMSOL. FIG. 9A graphically depicts the velocity profile of the molten glass through the flow control region 144 and annular flow channel 142 of the first outer cylindrical container 130. In FIG. 9A, the velocity of the molten glass increases from dark gray to light gray. As indicated by FIG. 9A, the velocity of the molten glass remains generally constant through the flow control region 144 and annular flow channel 142 until the molten glass reaches the delivery ring 136. FIG. 9B graphically depicts the pressure profile of the molten glass in the flow control region 144 and the annular flow channel 142 of the first outer cylindrical container 130. In FIG. 9B, the pressure increases from dark gray to light gray so that darker gray represents regions of lower pressure and lighter gray represents regions of higher pressure. As shown in FIG. 9B, the pressure is greatest at the beginning of the flow control region 144 where the molten glass enters the gap G2 defined between the flow control valve 170 and the first outer cylindrical container 130 and/or innermost cylindrical container 110. FIG. 10 graphically depicts the mass flow rate of the molten glass through the flow control region 144 as a function of the position of the flow control valve 170. In FIG. 10, the zero position on the x-axis corresponds to the minimum position of the flow control valve 170. For the geometric design of the apparatus 100 in the model depicted in FIGS. 9A and 9B, the mass flow rate of molten glass through the flow control region 144 varies non-linearly relative to the position of the flow control valve 170, as shown in FIG. 10, and attains a maximum mass flow rate at the maximum open position of the flow control valve 170.

Referring to FIGS. 3A-3C, changing the position of each of the independently movable flow control valves 170 relative to the first outer cylindrical container 130 may change the flow rate of molten glass through the annular flow channel 142, thereby changing the thickness of the glass layer associated with the cylindrical container. For example, all of the independently translatable flow control valves 170 may be translated in concert to increase or decrease the overall thickness of the glass layer associated with the first outer cylindrical container 130.

Without the flow control valves 170, the thickness of the glass layer produced from each of the cylindrical containers 102 may be adjusted by controlling the level of molten glass in each of the cylindrical containers 102 or by controlling the viscosity of the molten glass in each of the cylindrical containers 102. However, these methods of controlling the circumferential thickness distribution of the glass layers by controlling the level of glass in the cylindrical container 102 or controlling the viscosity of the glass may be limiting and impractical. For example, to accommodate a broad range of glass layer thicknesses, the cylindrical containers 102 must have a large range of operating glass levels to achieve the desirable range of net flow rates for each glass layer. With an undefined glass line (i.e., variable level of glass), the design and operation of the apparatus may be impractical in that it may be difficult to define heating zones for the gaseous atmosphere above the molten glass and for the glass below. It is also a significant challenge to independently control the viscosity for each of the glass layers, especially towards the bottom of the cylindrical containers 102, where the glass streams are so close to each other and the tendency would be for the glass layers to have similar temperatures.

By including flow control valves 170 to control the flow rate of molten glass, the apparatus 100 provides for adjusting the thickness of each glass layer while maintaining the same glass level in the cylindrical container 102, such as the first outer cylindrical container 130. Thus, the apparatus 100 that includes the flow control valves 170 allows for simpler design of heating systems for heating the gaseous space above the molten glass as well as the outer surfaces of the cylindrical containers 102 compared to controlling the thickness by changing the level or viscosity of the molten glass. Additionally, the flow control valves 170 may provide a faster control response time compared to changing the level or viscosity of the molten glass in the cylindrical containers 102 due to the control response of the flow control valves 170 being mechanical rather than thermal.

Additionally, each of the flow control valves 170 may be independently translatable relative to each of the other flow control valves 170 associated with the first outer cylindrical container 130 to modify the circumferential flow distribution of the molten glass through the flow control region 144 and the annular flow channel 142, thereby modifying the circumferential thickness distribution for the glass layer associated with the first outer cylindrical container 130. For example, in some embodiments, the relative positions of the flow control valves 170 within the first outer cylindrical container 130 may be adjusted to compensate for the differences in glass level in the first outer cylindrical container 130 due to the single feed tube 118 and the circumferential flow of the molten glass from the angular sector 184 associated with the feed tube 118 to each of the other angular sectors of the first outer cylindrical container 130. Additionally, in other embodiments, one or a plurality of flow control valves 170 of the first outer cylindrical container 130 may be independently translatable relative to the other flow control valves 170 to modify the siding of the glass layer 214 and/or the composite glass tube 200.

The shape of the flow control region 144 may influence the sensitivity of the apparatus 100 to changes in the position of the flow control valves relative to the cylindrical containers. In particular, changes in the shape of the flow control region 144 may influence the sensitivity of the response in the change of the flow rate of molten glass through the flow control region 144 to changes in the position of the flow control valve 170 relative to the flow control region 144. For example, referring to FIGS. 4A-4C, the inner surface 134 of the side wall 132 and the outer surface 115 of the side wall 112 may slope gradually towards each other in the flow control region 144. The slope of each of the inner surface 134 of the side wall 132 and the outer surface 115 of the side wall 112 may influence the sensitivity of the apparatus to changes in the position of the flow control valves 170 relative to the flow control region 144. For example, a flow control region 144 with a greater slope may result in decreased sensitivity, because a unit change in the vertical position of the flow control valve 170 results in less of a change in the cross-sectional area of the channel formed between the flow control valve 170 and the side wall 132 and side wall 112 compared to a flow control region 144 having a lesser slope. The shape of the flow control region 144 may also be limited by other considerations, such as desired throughput for example.

The apparatus 100 may be less sensitive to deviations in the +/−r and +/−θ positions of shafts 174 of the flow control valves 170 compared to the blow tube 120 disposed within the innermost cylindrical container 110 or compared to translation of the first outer cylindrical container 130 relative to the innermost cylindrical container 110. For the blow tube 120, deviations in the +/−r or +/−θ position of the blow tube 120 may directly impact the circumferential flow distribution of the molten glass as well as producing a second order change on the flow rate of molten glass between the head 122 and the side wall 112 of the innermost cylindrical container 110. Likewise, translation of the first outer cylindrical container 130 relative to the innermost cylindrical container 110 may also directly impact the circumferential flow distribution of the molten glass and may produce the second order change on the overall flow rate of the molten glass. In contrast, the flow control valves 170 associated with the first outer cylindrical container 130 may be translated in the +/−Z direction to change both the net flow rate and the circumferential flow distribution. Thus, deviations in the +/−r or +/−θ position of the shaft 174 of an individual one of the flow control valves 170 does not have a direct impact on the circumferential flow distribution, but only the smaller, second-order influence on the new flow rate of the molten glass. Therefore, the flow control valves 170 are less sensitive to changes in the +/−r or +/−θ position of the shafts 174 of the flow control valves 170 compared to changes in the +/−r or +/−θ positions of the blow tube 120.

Although described in the context of the first outer cylindrical container 130, it is understood that operation of additional cylindrical containers 102, such as second outer cylindrical container 150, to produce additional glass layers may be similar to that described above for operation of the first outer cylindrical container 130.

Referring to FIG. 7A, a molten glass composition 202 may be introduced to the innermost cylindrical container 110, and inner glass layer 212 comprising the molten glass composition 202 may be produced at the distal end 117 of the innermost delivery ring 116. Operation of the innermost cylindrical container 110 and blow tube 120 to produce the inner glass layer 212 was previously described in relation to the innermost cylindrical container 110. Another molten glass composition 204 may be introduced to the annular chamber 140 of the first outer cylindrical container 130, and the middle glass layer 214 comprising the molten glass composition 204 may be produced at the distal end 137 of the first outer delivery ring 136, as previously described. Additionally, still another molten glass composition 206 may be introduced to the annular chamber 160 of the second outer cylindrical container 150, and an outer glass layer 216 comprising the molten glass composition 206 may be produced at the distal end 157 of the second outer delivery ring 156. The molten glass composition 202, the molten glass composition 204, and the molten glass composition 206 may be the same or different glass compositions.

The inner glass layer 212, the middle glass layer 214, and the outer glass layer 216 may converge downstream of the distal ends 117, 137, 157 of the delivery rings 116, 136, 156 to form the composite glass tube 200. In particular, when the molten glass composition 202 reaches the bottom of the head 122 of the blow tube 120, the inner surface of the inner glass layer 212 transitions from being bound by a solid wall into a free surface. The inner glass layer 212 may continue to flow downwards (i.e., in the −Z direction of the coordinate axis of FIG. 7A) while maintaining contact with the innermost delivery ring 116. At the distal end 117 of the innermost delivery ring 116, the inner glass layer 212 may separate from the innermost delivery ring 116 and merge with the middle glass layer 214 to form a first composite stream. The first composite stream that includes the inner glass layer 212 and the middle glass layer 214 may continue to flow downward along the first outer delivery ring 136 with the middle glass layer 214 in contact with the first outer delivery ring 136. At the distal end 137 of the first outer delivery ring 136, the middle glass layer 214 may separate from the first outer delivery ring 136, and the first composite stream may merge with the outer glass layer 216 to form a second composite glass stream that includes the inner glass layer 212, the middle glass layer 214, and the outer glass layer 216. The second composite glass stream, still in a molten or partially molten state, may continue to flow vertically downward along the second outer delivery ring 156 with the outer glass layer 216 in contact with the second outer delivery ring 156. At the distal end 157 of the second outer delivery ring 156, the outer glass layer 216 may separate from the second outer delivery ring 156 to form the glass catenary or vertical draw that eventually becomes the composite glass tube 200 that includes the plurality of glass layers. Gas flow delivered by the blow tube 120 may determine an inner diameter of the inner glass layer 212 as the glass layers 212, 214, 216 sequentially separate from their respective delivery rings 116, 136, 156. After separation from the second outer delivery ring 156, the composite glass tube 200 may continue to travel downward from the apparatus 100, where the composite glass tube 200 may cool to form a solid composite glass tube that includes a plurality of glass layers.

Operation of the apparatus 100 to form a composite glass tube 200 has been described in the context of producing a composite glass tube 200 having three glass layers: the inner glass layer 212, the middle glass layer 214, and the outer glass layer 216. However, it is understood that the apparatus 100 may be configured to produce composite glass tubes 200 with more or less glass layers. For example, in some embodiments, the composite glass tube 200 may include only a single layer. In other embodiments, the composite glass tube 200 may have two glass layers: an inner glass layer 212 and an outer glass layer 216. In still other embodiments, the composite glass tube 200 may have more than three glass layers, which may include a plurality of inner layers 212, a plurality of middle glass layers 214, and/or a plurality of outer glass layers 216. The glass compositions of each glass layer may be the same or different.

Figure 8:
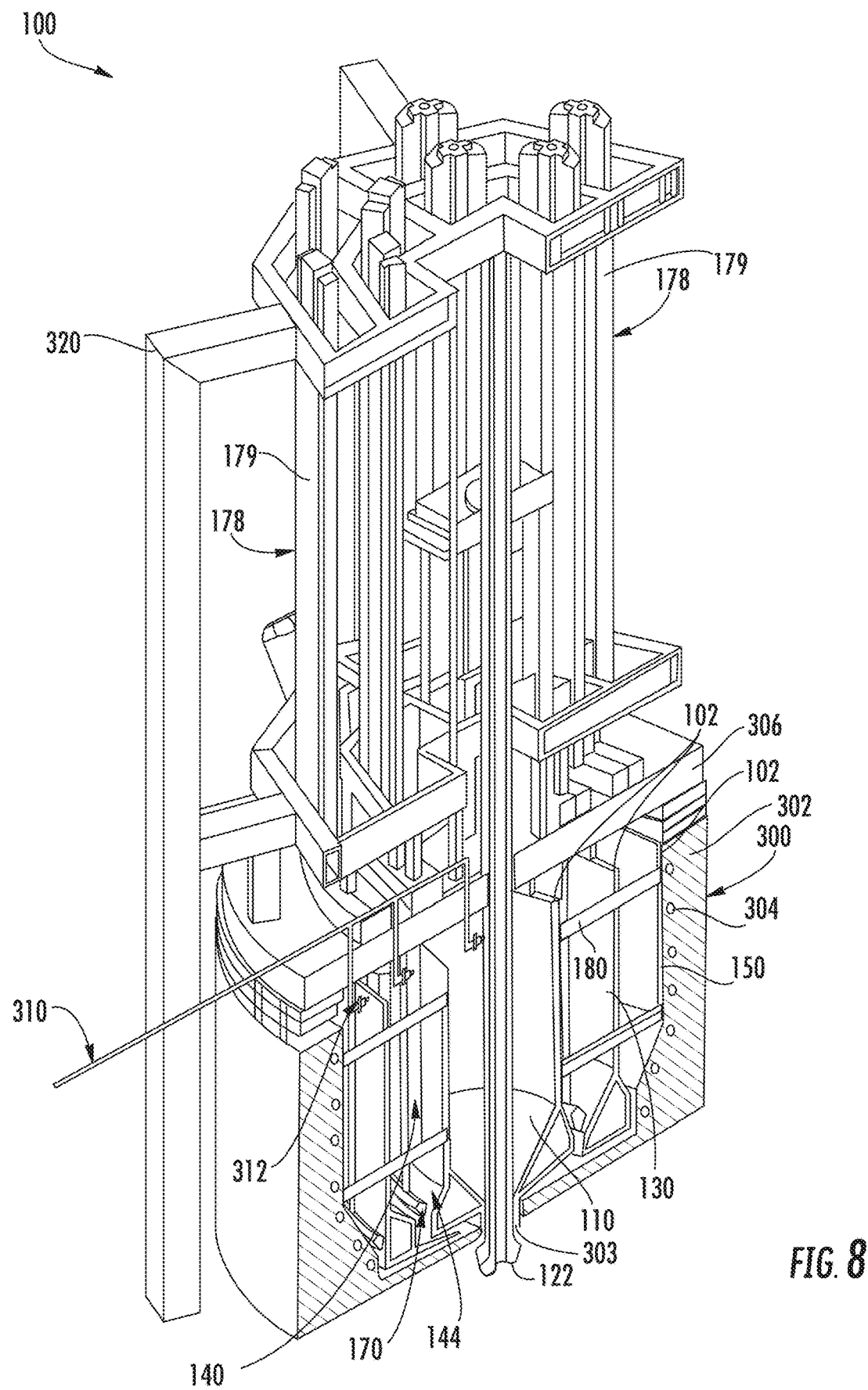
FIG. 8 schematically depicts a perspective view in cross-section of yet another embodiment of an apparatus for producing composite glass tube with a plurality of glass layers, according to one or more embodiments shown and described herein.

Referring to FIGS. 4A-4C, each of the flow control valves 170 may include a positioner 178 operable to independently position each of the flow control vavles 170 relative to the first outer cylindrical container 130 or other cylindrical container 102. In some embodiments, the positioner 178 for each of the flow control valves 170 may have a single degree of freedom. For example, as shown in FIG. 4A, the positioner 178 may translate the flow control valve 170 in the +/−Z direction of the coordinate axis in FIG. 4A. Referring to FIG. 8, the positioner 178 may include a plurality of linear positioning stages 179. In some embodiments, the positioner may be a manual positioner. Alternatively, in other embodiments, the positioner 178 may include an automatic positioner. In some embodiments, the automatic positioners may include motorized linear stages, for example. The simple mechanisms of the flow control valve 170 and positioner 178 may enable replacement or repair of the main components of the flow control valve 170 or positioner 178 without substantial delays in tubing production.

Figure 7C:
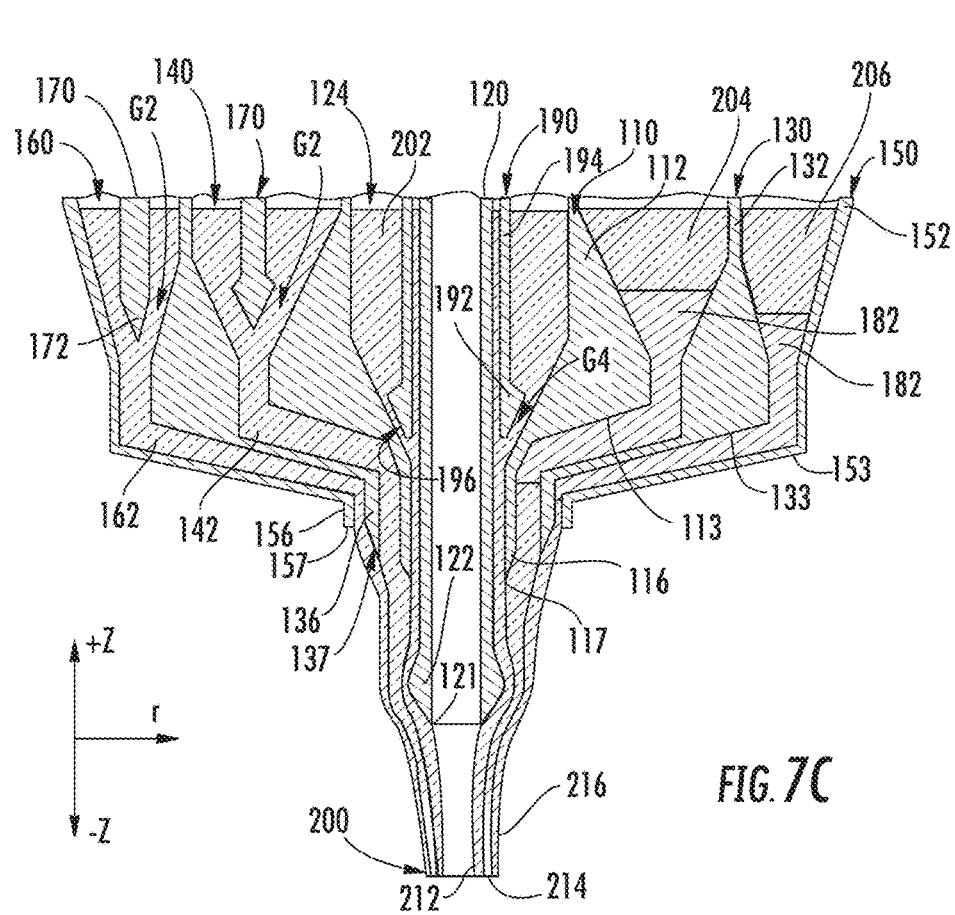
FIG. 7C schematically depicts a side view in cross-section of another embodiment of an apparatus for producing composite glass tube with a plurality of layers, according to one or more embodiments shown and described herein.

Referring to FIGS. 7A through 7D, various embodiments of the innermost cylindrical container 110 will now be described. As shown in FIG. 7A and described previously, the innermost cylindrical container 110 may have the blow tube 120 with the bell-shaped head 122 at the proximal end 121 of the blow tube 120. As previously described, the circumferential distribution and thickness of the inner glass layer 212 produced from the innermost cylindrical container 110 may be controlled by modifying the position of the blow tube 120 relative to the central opening 129 of the innermost cylindrical container 110. The blow tube 120 may be translated vertically (i.e., in the +/−Z direction of the coordinate axis of FIG. 7A) to change the gap G1 between the bell shaped head 122 of the blow tube 120 and the inner surface 114 of the innermost cylindrical container 110. Modifying the gap G1 by translation of the blow tube 120 in the vertical direction may change the flow rate of the molten glass composition 202 through the gap G1, thereby changing the thickness of the inner glass layer 212 produced from the innermost cylindrical container 110. Additionally, the blow tube 120 may be translated horizontally (i.e., in the +/−r or +/−θ directions of the cylindrical coordinate axis of FIG. 7A) relative to the innermost cylindrical container 110 to change the circumferential distribution of the molten glass composition 202 flowing between the bell-shaped head 122 of the blow tube 120 and the innermost cylindrical container 110, thereby modifying the circumferential thickness distribution of the inner glass layer 212 produced by the innermost cylindrical container 110.

Referring to FIG. 7A, the delivery rings 116, 136, 156 may be arranged so that the distal end 137 of the first outer delivery ring 136 is positioned vertically below the distal end 117 of the innermost delivery ring 116 and the distal end 157 of the second outer delivery ring 156 is positioned vertically below the distal end 137 of the first outer delivery ring 136. In this configuration depicted in FIG. 7A, the inner glass layer 212 may separate from the distal end 117 of the innermost delivery ring 116 and merge with the middle glass layer 214 to form the first composite stream. The first composite stream that includes the inner glass layer 212 and the middle glass layer 214 may then separate from the distal end 137 of the first outer delivery ring 136 and merge with the outer glass layer 216 to form the second composite glass stream. The second composite glass stream, which may still be in a molten or partially molten state, may then be separated from the distal end 157 of the second outer delivery ring 156 to form the glass catenary or vertical draw, which eventually becomes the composite glass tube 200 that includes the plurality of glass layers. Although the apparatus of FIG. 7A is described in the context of producing a composite glass tube 200 having three glass layers, additional glass layers may be added to the composite glass tube 200 by including additional cylindrical containers 102 without substantially changing the principles of operation of the apparatus 100 in FIG. 7A.

Referring now to FIG. 7B, in some embodiments, the blow tube 120 may extend through the central opening 129 in the bottom wall 113 of the innermost cylindrical container 110 and through the inner delivery ring 116. In this embodiment, the bell-shaped head 122 on the proximal end 121 of the blow tube 120 may be positioned vertically below (i.e., in the −Z direction of the coordinate axis of FIG. 7B) the distal end 117 of the inner delivery ring 116. Gap G3 may be defined between the head 122 of the blow tube 120 and the distal end 117 of the inner delivery ring 116. Translation of the blow tube 120 in the vertical direction (i.e., in the +/−Z direction of the coordinate axis of FIG. 7B) may change the width of the gap G3, thereby changing the impedance to flow of molten glass composition 202 through the gap G3, which may increase or decrease the flow rate of the molten glass composition 202. For example, in the embodiment depicted in FIG. 7B, translating the blow tube 120 vertically downward may increase the width of the gap G3, thereby increasing the flow rate of the molten glass composition 202 through the gap G3. Conversely, translating the blow tube of FIG. 7B in the vertically upward direction (i.e., the +Z direction of the coordinate axis of FIG. 7B) may decrease the width of the gap G3, thereby decreasing the flow rate of the molten glass composition 202 through the gap G3. In other embodiments, the head 122 of the blow tube 120 or the distal end 117 of the inner delivery ring 116 may be shaped so that translation of the blow tube 120 in the +Z direction of the coordinate axis of FIG. 7B may increase the width of the gap G3 and thereby increase the flow rate of the molten glass composition 202 therethrough.

As also shown in FIG. 7B, in some embodiments, the inner delivery ring 116 may extend vertically downward farther than the other delivery rings 136, 156, with each successively outwardly positioned delivery ring 136, 156 becoming shorter in the vertical dimension (i.e., the +/−Z direction of the coordinate axis of FIG. 7B). In this configuration, the distal end 137 of the first outer delivery ring 136 may be positioned vertically below (i.e., in the −Z direction) the distal end 157 of the second outer delivery ring 156, and the distal end 117 of the innermost delivery ring 116 may be positioned vertically below the distal end 137 of the first outer delivery ring 136. In the embodiments represented by FIG. 7B, the outer glass layer 216 may be the glass layer that detaches first from the second outer delivery ring 156. The outer glass layer 216 may separate from the distal end 157 of the second outer delivery ring 156. After separation from the second outer delivery ring 156, the outer glass layer 216 may be bounded on one side by the outer surface of the first outer delivery ring 136. At the distal end 137 of the first outer delivery ring 136, the outer glass layer 216 and the middle glass layer 214 may separate from the first outer delivery ring 136 and merge together to produce a first composite stream that includes the middle glass layer 214 and the outer glass layer 216. The first composite stream that includes the middle glass layer 214 and the outer glass layer 216 may remain bounded by the outer surface of the innermost delivery ring 116. At the distal end 117 of the innermost delivery ring 116, the middle glass layer 216 of the first composite stream and the inner glass layer 212 may separate or detach from the innermost delivery ring 116 and merge together to produce the second composite glass stream. The second composite glass stream that includes the inner glass layer 212, the middle glass layer 214, and the outer glass layer 216, which may still be in a molten or partially molten state, may continue to flow downward along the head 122 of the blow tube 120 until the second composite glass stream separates from the proximal end 121 of the blow tube 120, where the second composite glass stream forms the glass catenary or vertical draw that becomes the composite glass tube 200. Gas flow delivered from the proximal end 121 of the blow tube 120 may determine an inner dimension (e.g., diameter) of the inner glass layer 212 as the second composite glass stream separates from the proximal end 121 of the blow tube 120. After separation from the proximal end 121 of the blow tube 120, the composite glass tube 200 may continue to travel downward from the apparatus 100, where the composite glass tube 200 may cool to form a solid composite glass tube that includes the plurality of glass layers. Although the apparatus 100 in FIG. 7B is described in the context of producing a composite glass tube 200 having three glass layers, additional glass layers may be added to the composite glass tube 200 by including additional cylindrical containers 102 without substantially changing the principles of operation of the apparatus 100 in FIG. 7B.

Referring to FIG. 7C, in some embodiments, the innermost cylindrical container 110 may include at least one inner flow control valve 190. The inner flow control valve 190 may include a control element 192 that may be coupled to a shaft 194. The control element 192 may be shaped to form a gap G4 between a control surface 196 of the control element 192 and the inner surface 114 of the innermost cylindrical container 110. The control element 192 of the inner flow control valve 190 may have any of the features previously described for the control element 172 of the flow control valve 170. In some embodiments, the innermost cylindrical container 110 may include a single inner flow control valve 190. The control element 192 of the inner flow control valve 190 may be annular in shape so that the control element 192 circumscribes a portion of the blow tube 120. The control surface 196 of the control element 192 may be shaped to conform to the shape of the inner surface 114 of the innermost cylindrical container 110. For example, the control surface 196 of the control element 192 may mirror the shape of the inner surface 114 of the innermost cylindrical container 110. In some embodiments, the control surface 196 may slope downward and inward (i.e., in the −Z and decreasing r directions of the coordinate axis of FIG. 7C) from an upper portion of the control element 192 to the lower portion of the control element 192.

The shaft 194 of the inner flow control valve 190 may have any of the previously described features of the shaft 174 of the flow control valve 170. As shown in FIG. 7C, the blow tube 120 may extend downward through the innermost delivery ring 116 so that the head 122 of the blow tube 120 is positioned vertically below the distal end 117 of the innermost delivery ring 116. In some embodiments, the shaft 194 of the inner flow control valve 190 may be a hollow cylindrical tube that circumscribes at least a portion of the blow tube 120. The inner flow control valve 190 may be translatable in the vertical direction (i.e., the +/−Z direction of the coordinate axis of FIG. 7C) relative to the innermost cylindrical container 110. In some embodiments, the inner flow control valve 190 may be vertically translatable relative to the blow tube 120. For example, in some embodiments, the blow tube 120 may be fixed in the vertical direction (i.e., in the +/−Z direction of the coordinate axis of FIG. 7C) and the inner flow control valve 190 may be translatable in the vertical direction relative to the blow tube 120. Vertical translation of the inner flow control valve 190 may change width of the gap G4, which may change the net flow rate of the molten glass composition 202 from the innermost cylindrical container 110 to the inner delivery ring 116, thereby changing the average thickness of the inner glass layer 212 associated with the innermost cylindrical container 110.

In some embodiments, the blow tube 120 may also be translatable in the vertical direction (i.e., the +/−Z direction). Vertical translation of the blow tube 120 may be independent of vertical translation of the inner flow control valve 190. Translation of the blow tube 120 in the vertical direction may enable adjustment of the glass delivery viscosity at the head 122 of the blow tube 120 without changing the net flow rate of the molten glass composition 202 from the innermost cylindrical container 110. Adjusting the glass delivery viscosity may enable modification of the catenary shape, landing temperature, and/or the pressure of the blow air required.

In some embodiments, the inner flow control valve 190 may be translatable with the blow tube 120 in the radial and/or angular directions (i.e., in the +/−r and/or the +/−θ directions of the coordinate axis of FIG. 7C). Translation of the blow tube 120 and the inner flow control valve 190 together in the radial and/or angular directions may determine the circumferential flow rate distribution of the molten glass composition 202 from the innermost cylindrical container 110. Translating the blow tube 120 and inner flow control valve 190 of FIG. 7C in the radial and angular direction to change the circumferential flow rate distribution of the molten glass composition 202 may enable modification of the circumferential thickness profile of the inner glass layer 212 associated with the innermost cylindrical container 110. Additionally, modifying the circumferential flow rate distribution of the molten glass composition 202 by translating the blow tube 120 and inner flow control valve 190 in the radial and angular directions may compensate for single point continuous feed of the molten glass composition 202 from the feed tube 118 (FIG. 1A) to the innermost cylindrical container 110. Alternatively, the inner flow control valve 190 may be translatable in the radial and/or angular directions (i.e., in the +/−r and/or the +/−θ directions of the coordinate axis of FIG. 7C) independent of the blow tube 120.

Alternatively, in other embodiments, the innermost cylindrical container 110 may have a plurality of inner flow control valves 190. In these embodiments, the blow tube 120 may be fixed in the vertical, radial, and angular directions and the circumferential flow rate distribution of the molten glass composition 202 may be controlled by translation of each of the inner flow control valves 190 relative to the innermost cylindrical container 110 and each of the other of the plurality of the inner flow control valves 190.

In the embodiments represented by FIG. 7C, the delivery rings have the same configuration as shown in FIG. 7B. Thus, the separation of each glass layer 212, 214, 216 from the associated delivery ring 116, 136, 156 and confluence of the glass layers 212, 216, 216 to form the composite glass tube 200 is the same as previously described in relation to FIG. 7B.

Figure 7D:
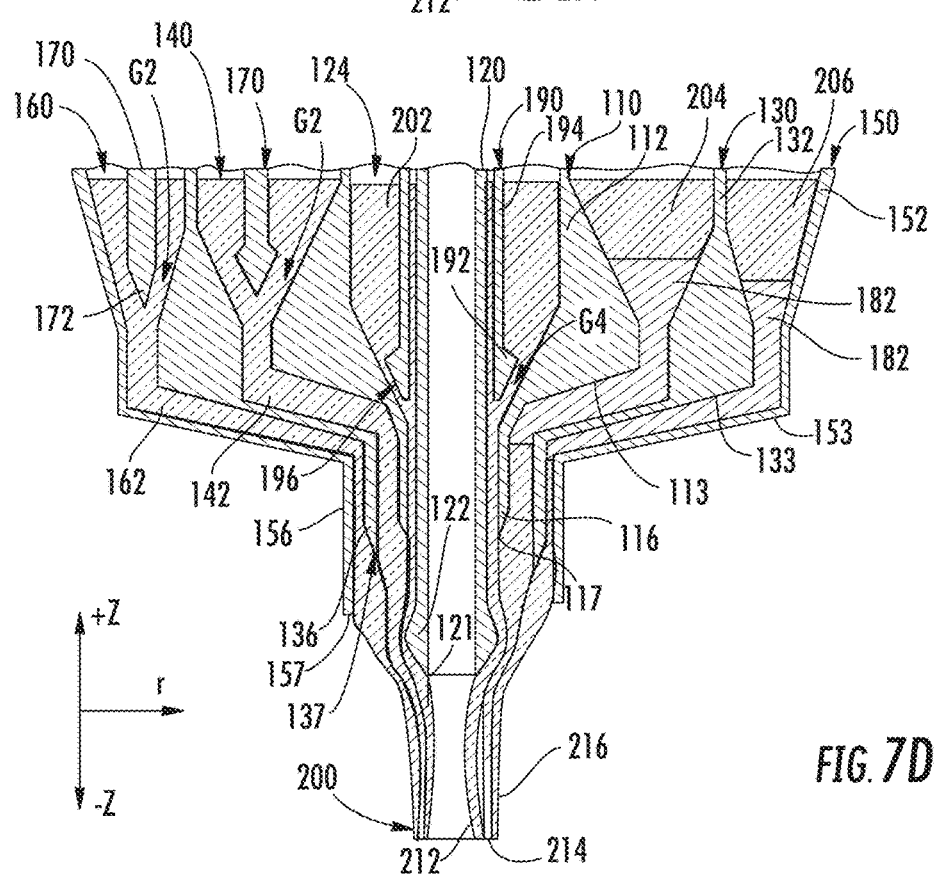
FIG. 7D schematically depicts a side view in cross-section of another embodiment of an apparatus for producing composite glass tube with a plurality of layers, according to one or more embodiments shown and described herein.

Referring to FIG. 7D, in still other embodiments, the innermost cylindrical container 110 may include at least one of the inner flow control valves 190 illustrated in FIG. 7C and described with reference thereto. However, the embodiment in FIG. 7D differs from the embodiment of FIG. 7C in the configuration of the delivery rings 116, 136, 156 and the confluence of the different glass layers to form the composite glass tube 200. In the embodiments represented in FIG. 7D, the proximal end 121 of the blow tube 120 may extend through the innermost delivery ring 116 so that the head 122 of the blow tube 120 is positioned vertically below (i.e., in the −Z direction of the coordinate axis in FIG. 7D) the distal end 117 of the innermost delivery ring 116. In FIG. 7D, the first outer delivery ring 136 extends vertically downward so that the distal end 137 of the first outer delivery ring 136 is positioned vertically below the distal end 117 of the first outer delivery ring 136, and the second outer delivery ring 156 extends vertically downward so that the distal end 157 of the second outer delivery ring 156 is positioned vertically below the distal end 137 of the first outer delivery ring 136. The configuration of the delivery rings 116, 136, 156 in FIG. 7D are similar to the configuration of the delivery rings 116, 136, 156 illustrated in FIG. 7A and described in relation thereto.

Referring to FIG. 7D, in operation, the inner glass layer 212 may separate from the innermost delivery ring 116 and merge with the middle glass layer 214 to form a first composite stream that includes the inner glass layer 212 and the middle glass layer 214. At the point where the inner glass layer 212 merges with the middle glass layer 214, the inner glass layer 212 may be solid wall bounded by the blow tube 120 on the side opposite the middle glass layer 214, and the middle glass layer 214 may be solid wall bounded by the first outer delivery ring 136 on the side of the middle glass layer 214 opposite the inner glass layer 212. The first composite stream that includes the inner glass layer 212 and the middle glass layer 214 may continue to flow vertically downward (i.e., in the −Z direction) while attached to the first outer delivery ring 136 and the blow tube 120. At the distal end 137 of the first outer delivery ring 136, the middle glass layer 214 of the first composite stream may separate from the first outer delivery ring 136 and may then merge with the outer glass layer 216 to form a second composite glass stream. At the point where the first composite stream merges with the outer glass layer 216, the inner glass layer 212 of the first composite stream may continue to be solid wall bound by the blow tube 120, and the outer glass layer 216 may be solid wall bound by the second outer delivery ring 156. The second composite glass stream that includes the inner glass layer 212, the middle glass layer 214, and the outer glass layer 216, may continue to flow vertically downward while attached to the second outer delivery ring 156 and the blow tube 120. At the distal end 157 of the second outer delivery ring 156, the outer glass layer 216 of the second composite glass stream may detach or separate from the second outer delivery ring 156 to form a free surface at the outer surface of the outer glass layer 216. The second composite glass stream that includes the inner glass layer 212, the middle glass layer 214, and the outer glass layer 216, which may still be in a molten or partially molten state, may continue to flow vertically downward along the head 122 of the blow tube 120. The second composite glass stream may separate from the proximal end 121 of the blow tube 120, where the second composite glass stream forms the glass catenary or vertical draw that eventually becomes the composite glass tube 200. Gas flow delivered from the proximal end 121 of the blow tube 120 may determine an inner dimension (e.g., diameter) of the inner glass layer 212 as the second composite glass stream separates from the proximal end 121 of the blow tube 120. After separation from the proximal end 121 of the blow tube 120, the composite glass tube 200 may continue to travel downward from the apparatus 100, where the composite glass tube 200 may cool to form a solid composite glass tube 200 that includes the plurality of glass layers.

Although the apparatus 100 in FIG. 7D is described in the context of producing a composite glass tube having three glass layers, additional glass layers may be added to the composite glass tube by including additional cylindrical containers without substantially changing the principles of operation of the apparatus 100 in FIG. 7B.

Referring to FIG. 8, another embodiment of the apparatus 100 for producing composite glass tube that includes a plurality of glass layers is depicted. The apparatus 100 depicted in FIG. 8 includes three cylindrical containers 102 arranged concentrically and fixed with respect to each other. The three cylindrical containers 102 include the innermost cylindrical container 110, the first outer cylindrical container 130, and the second outer cylindrical container 150. Although depicted as including 3 cylindrical containers 102, it is understood that the apparatus 100 could have more than 3 or less than 3 cylindrical containers 102. A total of 8 flow gussets 182 are positioned between the innermost cylindrical container 110 and the first outer cylindrical container 130, separating the annular flow channel 142 into 8 angular sectors 184 (see FIG. 6D). A total of 8 flow gussets 182 are positioned between the first outer cylindrical container 130 and the second outer cylindrical container 150, separating the annular flow channel 162 into 8 angular sectors 184. Eight flow control valves 170 are disposed between the innermost cylindrical container 110 and the first outer cylindrical container 130 and positioned with the control element 172 of each flow control valve 170 positioned proximate to the flow control region 144 in one of the angular sectors 184. Another 8 flow control valves 170 may be disposed between the first outer cylindrical container 130 and the second outer cylindrical container 150 and positioned relative to each of the angular sectors 184.

Referring to FIG. 8, the apparatus 100 may additionally include a refractory assembly 300. The refractory assembly 300 may surround the plurality of cylindrical containers 102. The refractory assembly 300 may also support the plurality of cylindrical containers 102. The refractory assembly 300 may include one or more insulating layers 302 comprising a refractory material. The refractory material may be refractory ceramic materials that are chemically compatible with the molten glass and capable of withstanding the high temperatures associated with the glass tube forming process. Typical ceramic refractory materials from which the insulating layers 302 can be formed include, without limitation, zircon (e.g., zirconia), silicon carbide, xenotime, alumina based refractory ceramics, and/or aluminosilicate refractory ceramics. The insulating layers 302 may completely surround the plurality of cylindrical containers 102. In some embodiments, the refractory assembly 300, in particular the insulating layers 302 of the refractory assembly 300, may define an orifice 303 positioned vertically below (i.e., in the −Z direction of the coordinate axis of FIG. 8) the delivery rings of the plurality of cylindrical containers 102. The insulating layers 302 may be operable to reduce heat transfer away from the cylindrical containers 102.

In some embodiments, the refractory assembly 300 may include one or a plurality of heating elements 304 embedded in the refractory material of the insulating layers 302. The heating element 304 may include electrical heating elements, such as platinum windings circumscribing the plurality of cylindrical containers 102, as shown in FIG. 8. In some embodiments, heating may be provided to the cylindrical containers 102 by an induction heating system. Other heating elements 304 are contemplated for heating the cylindrical containers 102. The combination of the heating elements 304 and insulating layers 302 may enable control the temperatures around and outside the plurality of cylindrical containers 102, such as at an outer surface of the second outer cylindrical container 150. The refractory assembly 300 may additionally include a cover block 306 positioned on top of the plurality of cylindrical containers 102 and/or the insulating layers 302 of the refractory assembly 300.

The apparatus 100 may also include an internal heating system 310 for heating the gaseous space above the molten glass disposed in the cylindrical containers 102. In some embodiments, the internal heating system 310 may include internal heating elements 312 positioned inside of the refractory assembly 300, such as between the cover block 306 and the plurality of cylindrical containers 102. The internal heating elements 312 may be positioned to heat the gaseous space above the molten glass in each of the cylindrical containers 102. The internal heating elements 312 may include, but are not limited to, burners, radiant heaters such as platinum windings, or other type of heating elements or systems. In some embodiments, the internal heating system 310 may include an inductive heating system. The internal heating system 310 may provide heat to the annular chambers to maintain the glass compositions in the molten state.

Referring to FIG. 8, in some embodiments, the apparatus 100 may include a support structure 320 positioned above the refractory assembly 300, such as above the cover block 306. The support structure 320 may provide support for the positioners 178 for the plurality of flow control valves 170. As shown in FIG. 8 and previously described, the positioners 178 may include a plurality of vertical positioning stages 179 that enable translation of each of the flow control valves 170 relative to the stationary cylindrical containers 102.

Referring to FIG. 11, a system 400 for producing a composite glass tube 200 that includes a plurality of glass layers is illustrated. The system 400 may include the apparatus 100, a control system 402, and a sensor 410. The apparatus 100 may have any of the features previously described herein. In particular, the apparatus 100 may include a plurality of the flow control valves 170 and a plurality of the positioners 178, each of the positioners 178 operatively coupled to one of the flow control valves 170 to translate the flow control valves 170 relative to the cylindrical containers 102 of the apparatus 100. The positioners 178 may be automated. For example, the positioners 178 may include one or more positioning motors. Other automatic mechanical, electro-mechanical, pneumatic, hydraulic, or magnetic positioning devices may also be included in the positioners 178. Each of the positioners 178 may be communicatively coupled to the control system 402.

As used herein, the term "communicatively coupled to" includes all practical forms of communication between components of a control system, such as system 400. These forms of communication may include wired communications, such as communication through electrical or fiber optic cables for example. Wired communications may also include communication through a slip ring for communication between components that rotate relative to each other. Communication may also include wireless communications, such as communication through radio waves, light, radiation, other wireless communication methods, or combinations of these. The control system 402 may be communicatively coupled to any of the motors, actuators, control valves, sensors, burners, heating elements, or other components of the system 400 disclosed herein.

The sensor 410 may be positioned downstream of the apparatus 100. The sensor 410 may be operable to measure or determine one or more dimensions or properties of the composite glass tube 200 produced by the apparatus. For example, the sensor 410 may be operable to measure the overall thickness of the composite glass tube 200, the average thickness of one or more than one glass layer of the composite glass tube 200, the circumferential thickness profile (i.e., sidings) of the composite glass tube 200, the circumferential thickness profile of one or more than one of the glass layers of the composite glass tube 200, an inner diameter of the composite glass tube 200 or a specific glass layer, an outer diameter of the composite glass tube 200 or a specific glass layer, or other dimensions of the composite glass tube. The sensor 410 may include an optical imaging system, laser reflectometer, laser gauge, optical micrometer, or other sensor suitable for measuring one or more dimensions of the glass tube. The sensor 410 may be communicatively coupled to the control system 402.

Referring to FIG. 11, the control system 402 may include a processor 404, at least one memory module 406 communicatively coupled to the processor 404, and machine readable instructions stored on the at least one memory module. The control system 402 may also include a display 408 and/or an input device 409 communicatively coupled to the processor 404 for inputting and outputting information from an operator of the system 400. The machine readable instructions may cause the system 400 to perform at least the following when executed by the processor 404: measure a dimension of the composite glass tube 200; compare the dimension of the composite glass tube 200 to a target dimension of the composite glass tube 200; and position one or more than one of the plurality of flow control valves 170 to change the dimension of the composite glass tube 200 based on the comparison. In some embodiments, the memory module 406 may include a database and/or stored data that includes information on the target dimensions and/or target properties of the composite glass tube 200. In some embodiments, the machine readable instructions, when executed by the processor 404, may cause the control system 402 to receive or retrieve a measured dimension and/or a measured property of the composite glass tube 200 from the sensor 410, compare the measured dimension and/or measured property received or retrieved from the sensor 410 to the target dimension or target property stored on the memory module 406, calculate one or a plurality of control responses based on the comparison of the measured dimension or measured property with the target dimension or target property, and send the control responses to the plurality of positioners 178.

Referring to FIG. 11, in some embodiments, the apparatus 100 may include a blow tube positioner 414 operatively coupled to the blow tube 120 disposed in the innermost cylindrical container 110 of the apparatus 100. The blow tube positioner 414 may be operable to translate the blow tube relative to the innermost cylindrical container 110 to control the thickness of the innermost glass layer (i.e., inner glass layer 212 of FIG. 7A) or the circumferential thickness profile of the innermost glass layer. The control system 402 may be communicatively coupled to the blow tube positioner 414. The system 400 may include machine readable instructions stored in the memory modules 406 that, when executed by the processor 404, may cause the system 400 to measure a dimension of the innermost glass layer of the composite glass tube 200, compare the measured dimension of the innermost glass layer of the composite glass tube 200 to a target dimension of the innermost glass layer, and position the blow tube 120 relative to the innermost cylindrical container 110 (FIG. 1A) to change the dimension of the innermost glass layer of the composite glass tube 200 based on the comparison. The target dimension may be stored in the memory module 406.

In some embodiments, the measured dimension may be an average thickness of the innermost layer and the machine readable instructions stored in the one or more memory modules 406, when executed by the processor 404, may cause the system 400 to vertically position the blow tube 120 relative to the innermost cylindrical container 110. To vertically position the blow tube 120, the system 400 may send a control signal to the blow tube positioner 414 operatively coupled to the blow tube 120. The control signal may cause the blow tube positioner 414 to translate the blow tube 120 in the vertical, radial, or angular dimensions relative to the innermost cylindrical container 110.

Referring to FIG. 11, in some embodiments, the blow tube 120 may be fluidly coupled to a gas system comprising a gas source 416 and a gas control valve 418. The gas control valve 418 may be operable to change the flow rate of a gas through the blow tube 120. The gas control valve 418 may be communicatively coupled to the control system 402. Machine readable instructions stored on the memory modules 406, when executed by the processor 404, may cause the system 400 to receive a measured dimension of the composite glass tube 200, such as an inner diameter; compare the measured dimension of the composite glass tube 200 against a target dimension; and change the flow rate of gas through the blow tube 120 by sending a control signal to the gas control valve 418 to cause the gas control valve 418 to open or close.

Referring to FIG. 11, the system 400 may also include one or a plurality of molten glass feed valves 420. Each molten glass feed valve 420 may be disposed in one of the feed tubes 118 extending from a molten glass system 424 to one of the cylindrical containers 102. The molten glass system 424 may be any system known in the art for producing a molten glass composition from raw material components. Although the system 400 is shown in FIG. 11 as including a single molten glass feed valve 420 and a single molten glass system 424, it is understood that a system 400 comprising an apparatus 100 with multiple cylindrical containers 102 may have a plurality of molten glass systems 424, each with a feed tube 118 and a molten glass feed valve 420. In some embodiments, the molten glass feed valve 420 may be operatively coupled to an actuator 422 which may be operable to position the molten glass feed valve 420. The actuator 422 may be communicatively coupled to the control system 402. Machine readable instructions stored on the memory modules 406, when executed by the processor 404, may cause the system 400 to change the flow rate of molten glass into one or more of the cylindrical containers 102 by sending a control signal to the actuator 422 to change the position of the molten glass feed valve 420.

Referring to FIGS. 1A-1C and 7A, a method of producing a composite glass tube 200 comprising a plurality of glass layers may include introducing a first molten glass composition to the apparatus 100. The apparatus 100 may have any of the previously described features of apparatus 100. The first molten glass composition may be introduced to a first annular chamber (i.e., annular chamber 140) defined between the innermost cylindrical container 110 and the first outer cylindrical container 130. The method may further include introducing a second molten glass composition to a second annular chamber (i.e., annular chamber 160) defined between the first outer cylindrical container 130 and the second outer cylindrical container 150 or to the inner annular chamber 124 defined by the innermost cylindrical container 110. The method includes passing the first molten glass composition through a first annular flow channel to a first outer delivery ring 136 to produce a first annular glass layer, passing the second glass composition through a second annular flow channel to the second outer delivery ring 156 or to the innermost delivery ring 116 to produce a second annular glass layer, and contacting and/or merging the first annular glass layer and the second annular glass layer to produce the composite glass tube 200. The method may further include adjusting an average thickness or a circumferential thickness profile of at least one of the composite glass tube 200, the first annular glass layer, or the second annular glass layer by translating at least one of the plurality of flow control valves relative to the plurality of cylindrical containers.

In some embodiments, the method may include determining an inner diameter of the composite glass tube 200 by introducing a flow of a gas to an internal volume of the composite glass tube 200 from the proximal end 121 of the blow tube 120. In some embodiments, the first molten glass composition has a coefficient of thermal expansion (CTE) different than the second molten glass composition. In some embodiments, the first molten glass composition may have a Young's modulus that is different than the Young's modulus of the second molten glass composition.

In some embodiments, the method may include introducing a third molten glass composition to one of the second annular chamber 160, a third annular chamber defined between the second outer cylindrical container 150 and a third outer cylindrical container (see FIG. 2), or the innermost cylindrical container 110. The method may further include passing the third glass composition through the second annular flow channel to the second outer delivery ring 156, through a third annular flow channel to a third outer delivery ring, or to the innermost delivery ring 116 to produce a third annular glass layer and contacting or merging the third annular glass layer with the first annular glass layer or the second annular glass layer to produce the composite glass tube 200. The method may further include adjusting an average thickness or a circumferential thickness profile of the third annular glass layer by translating at least one of the plurality of flow control valves 170 relative to the plurality of cylindrical containers 102, such as the first outer cylindrical container 130, second outer cylindrical container 150, or other cylindrical container.

In some embodiments, the second molten glass composition may be introduced to the innermost cylindrical container 110 and the method may further include introducing a third molten glass composition to the second annular chamber 160, passing the third glass composition through the second annular flow channel 162 to the second outer delivery ring 156 to produce a third annular glass layer, and contacting or merging the third annular glass layer with the first annular glass layer to produce the composite glass tube 200, wherein the first annular glass layer may be disposed between the second annular glass layer and the third annular glass layer. The first annular glass layer may include a CTE different than the CTE of the second annular glass layer and the CTE of the third annular glass layer. In some embodiments, the method may include adjusting a circumferential distribution of the second molten glass composition by translating the blow tube 120 in the radial direction, angular direction, or both relative to the innermost cylindrical container 110. The method may further include adjusting a thickness of the second molten glass composition by vertically translating the blow tube 120 relative to the innermost cylindrical container 110. In some embodiments, the innermost cylindrical container 110 may include the inner flow control valve 190 translatable relative to the innermost cylindrical container 110 and the method may include adjusting a thickness of the second annular glass layer by translating the inner flow control valve 190 relative to the innermost cylindrical container 110.

The apparatus 100 and/or system 400 (FIG. 11) may be used to produce a strengthened composite glass tube 200 by selecting different glass compositions for each of the glass layers. In some embodiments, the composite glass tube 200 may include at least one middle glass layer (e.g., middle glass layer 214 of FIG. 7A), an inner glass layer (e.g., inner glass layer 212 of FIG. 7A), and an outer glass layer (e.g., outer glass layer 216 of FIG. 7A). The inner glass layer and the outer glass layer may be made from glass compositions having properties different than the middle glass layers, such as coefficient of thermal expansion (CTE), Young's modulus, or other property. For example, the inner glass layer and the outer glass layer may be made from glass compositions having CTEs that are different than the CTE of the middle glass layer. As the molten glass compositions cool to solidify into the composite glass tube 200, the difference in the CTE between the glass of the middle glass layer and the glass of the inner and outer glass layers may produce compressive stress in the inner and outer glass layers and tension or tensile stress in the middle glass layer. The composite glass tube 200 is strengthened by the introduction of the compressive stress to the inner and outer glass layers. These compressive stresses must first be overcome before encapsulated flaws in the glass will experience enough tension to propagate. The apparatus 100 may enable control of the thickness of one or more of the inner glass layer, the outer glass layer, or the middle glass layer to control the magnitude of the compressive stress produced in the inner glass layer and outer glass layer. The apparatus 100 therefore enables strengthening of the glass tube without the need for a secondary tempering process, such as ion exchange or thermal tempering, for example.

In some embodiments, the apparatus 100 and/or system 400 may enable better control of cross-sectional shape and thickness of single glass or composite glass tubes made from colored glass, such as amber-colored glass. Colored glasses, in particular amber glass, possess optical properties that may be desirable in certain applications, such as pharmaceutical packaging for pharmaceutical compositions that are sensitive to ultraviolet light or other wavelengths of light. It is often difficult to transfer energy into and through these colored glass compositions in the molten state. Therefore, the heating systems and heating elements disposed within the apparatus 100 may be insufficient to maintain a uniform temperature of the colored glass compositions in the cylindrical containers 102. Thus, the molten colored glass composition may experience temperature variation in the cylindrical containers 102, which may result in oval or oblong cross-sections in the glass tube made from these colored glass compositions.

In conventional glass tube processes, this temperature gradient effect may be compensated for by using oval or oblong delivery rings or oval or oblong cylindrical containers. However, installing oval or oblong cylindrical containers and delivery rings may render the apparatus unusable for other glass compositions. The apparatus 100 that includes the plurality of flow control valves 170 for controlling the circumferential distribution of molten glass during the production process may allow the apparatus 100 and/or system 400 to compensate for the temperature differences within the cylindrical containers 102 without resorting to installing oval or oblong cylindrical containers 102 or delivery rings. Thus, the apparatus 100 may enable changing production from clear glass tubes to colored-glass tubes and back without exchanging any of the components of the apparatus 100.

The composite glass tube 200 produced by the apparatus 100, system 400, and methods described herein may be shaped into glass articles such as bottles, glass containers, etc. The apparatus 100, systems 400, and methods may be used to produce a physically strengthened composite glass tube 200 by incorporating glass layers with different properties, as previously described. The apparatus 100, systems 400, and methods may also enable improvements in the chemical durability of the composite glass tube 200 by using different glass compositions for each of the glass layers. Thus, the composite glass tube 200 made using the apparatus 100, system 400, or methods disclosed herein may be particularly well suited for use in the formation of pharmaceutical packages for containing a pharmaceutical composition, such as liquids, powders and the like, due to the increased strength and chemical durability. For example, the composite glass tube 200 made by the apparatus 100, system 400, and/or methods described herein may be used to form vials, ampoules, cartridges, syringe bodies and/or any other glass container for storing pharmaceutical compositions.

The present disclosure may be embodied in hardware and/or in software (including firmware, resident software, micro-code, etc.). The system 400 (FIG. 11) or the control system 402 may include at least one processor 404 and the computer-readable medium (i.e., memory module 406) as previously described in this specification. A computer-usable or the computer-readable medium or memory module may be any medium that can contain, store, communicate, propagate, or transport the program for use by or in connection with the instruction execution system, apparatus, or device.

The computer-usable or computer-readable medium or memory module may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present disclosure may be written in a high-level programming language, such as C or C++, for development convenience. In addition, computer program code for carrying out operations of the present disclosure may also be written in other programming languages, such as, but not limited to, interpreted languages. Some modules or routines may be written in assembly language or even micro-code to enhance performance and/or memory usage. However, software embodiments of the present disclosure do not depend on implementation with a particular programming language. It will be further appreciated that the functionality of any or all of the program modules may also be implemented using discrete hardware components, one or more application specific integrated circuits (ASICs), or a programmed digital signal processor or microcontroller.

EXAMPLES

The following examples illustrate the design and operation of the disclosed apparatuses 100 for continuously producing composite glass tube that includes a plurality of glass layers. The following prophetic examples were developed in and modeled using commercially available fluid dynamics model software available from COMSOL.

Example 1

Figure 12:
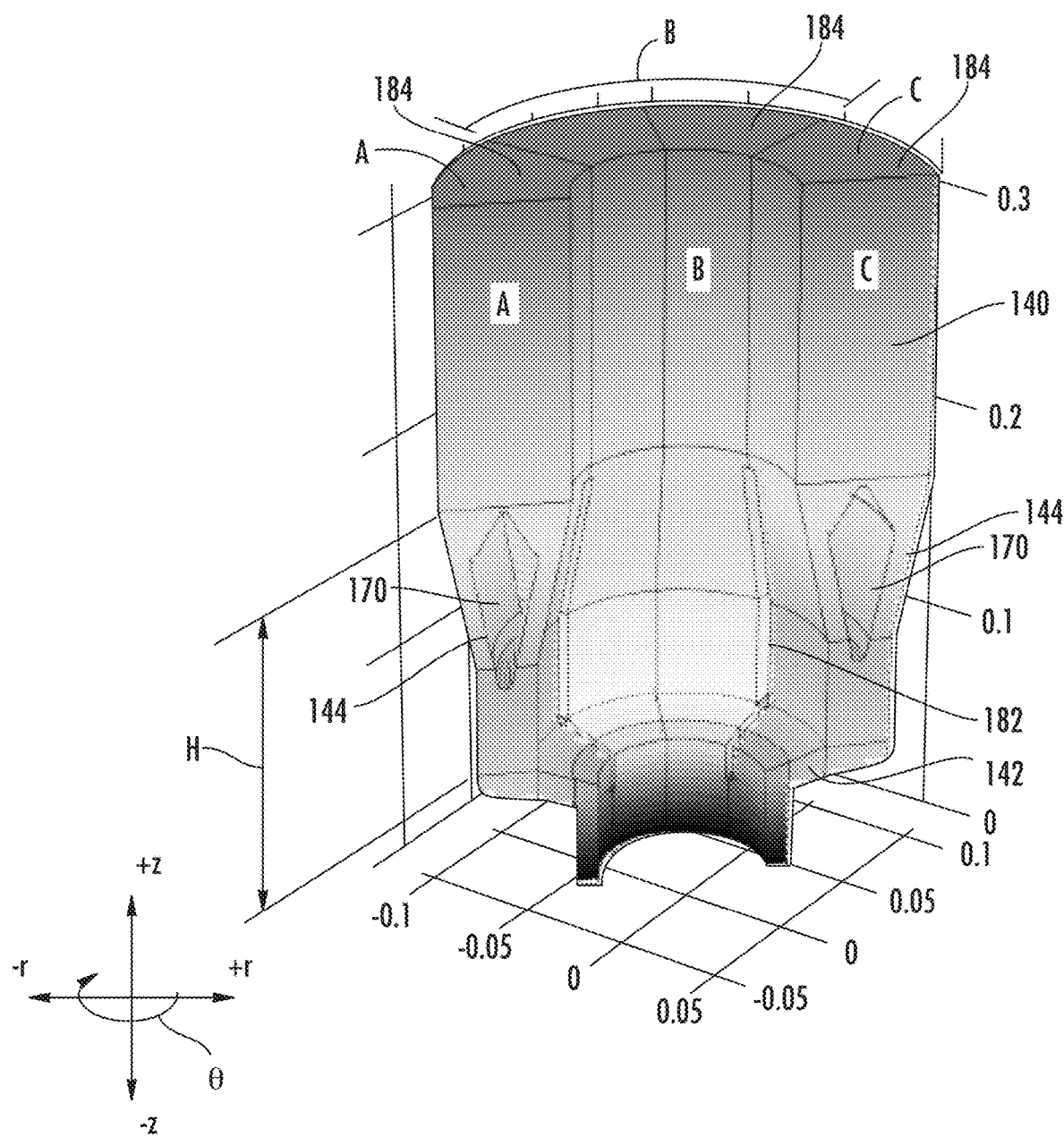
FIG. 12 graphically depicts a 3-dimensional pressure profile for a flow model developed for flow of molten glass through a portion of the apparatus of FIG. 1A, according to one or more embodiments shown and described herein.

In Example 1, a 3 dimensional (3D) flow model of molten glass through the annular space defined between an innermost cylindrical container and a first outer cylindrical container is presented. Referring to FIGS. 1A and 12, the flow model of Example 1 is based on an apparatus 100 that includes the innermost cylindrical container 110 (FIG. 1A) and the first outer cylindrical container 130 (FIG. 1A). The innermost cylindrical container 110 and the first outer cylindrical container 130 are circular in cross-section and define the annular chamber 140, flow control region 144, and the annular flow channel 142 therebetween. The flow control region 144 and the annular flow channel 142 are divided into four equally-sized angular sectors 184 by four flow gussets 182, which are indicated in FIG. 12. The flow gussets 182 cover a vertical distance H (i.e., a distance measured in the +/−Z direction of the coordinate axis of FIG. 12) and separate the angular sectors 184 corresponding to each of the flow control valves 170. The flow gussets 182 extend downstream from the flow control region 144, through the annular flow channel 142, towards the distal end of the delivery rings 116, 136 (FIG. 1A), and help maintain the circumferential flow distribution attained by the flow control valves 170. The model includes the flow control valve 170, in particular the control element of the flow control valve 170, positioned in the flow control region 144. The model represents one half of the total circumference of the innermost cylindrical container 110 and the first outer cylindrical container 130 and encompasses portions of three angular sectors 184 (designated in FIG. 12 as sectors A, B, and C) out of the four equally-sized angular sectors 184 defined by the flow gussets 182. This simplified model assumes symmetry at the 0° and 90° planes, and is sufficient to illustrate some of the important three dimensional flow effects associated with the operation of the apparatus 100.

Figure 13:
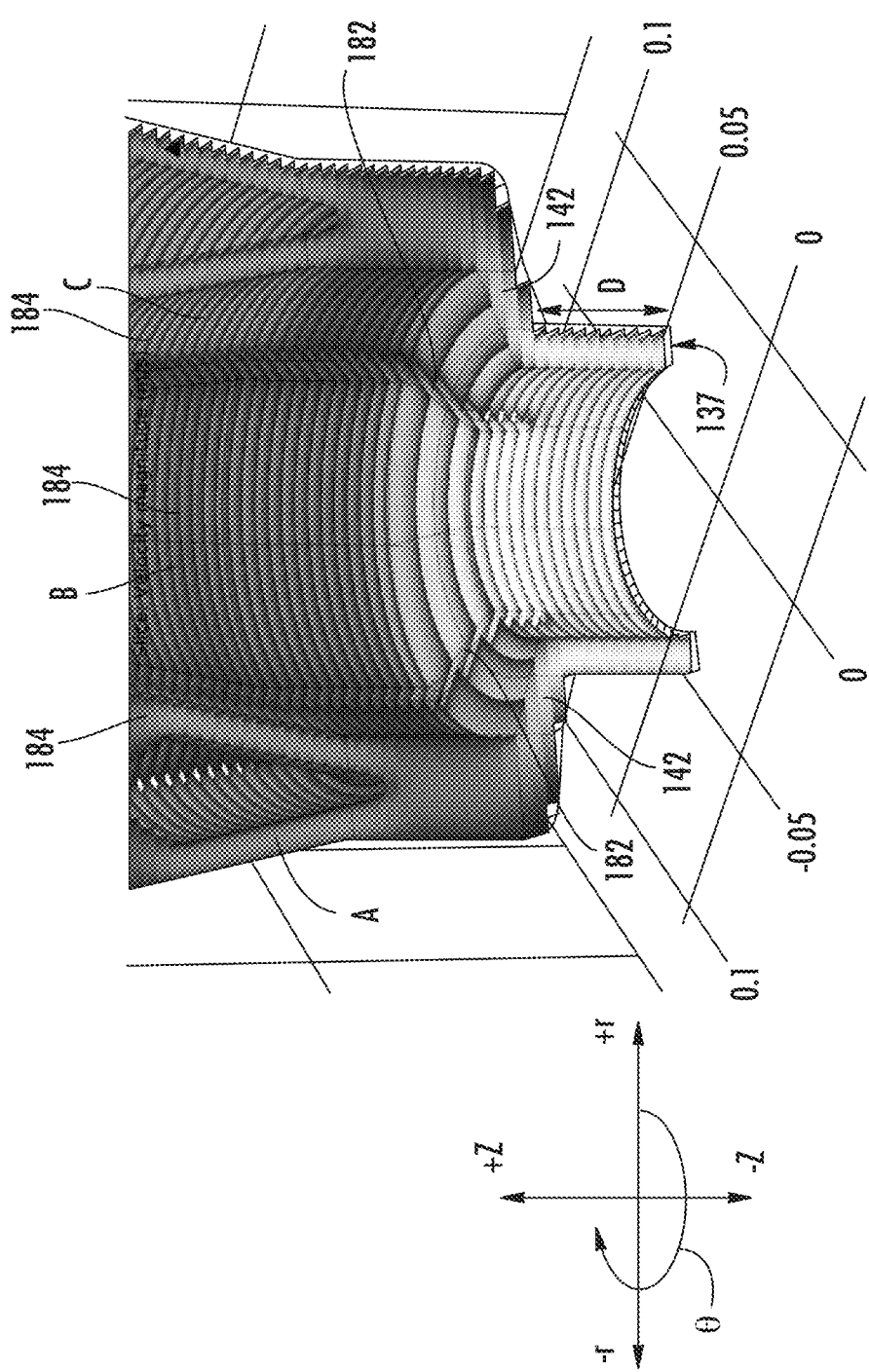
FIG. 13 graphically depicts a 3-dimensional velocity profile for a flow model developed for flow of molten glass through a portion of the apparatus of FIG. 1A, according to one or more embodiments shown and described herein.
Figure 14:
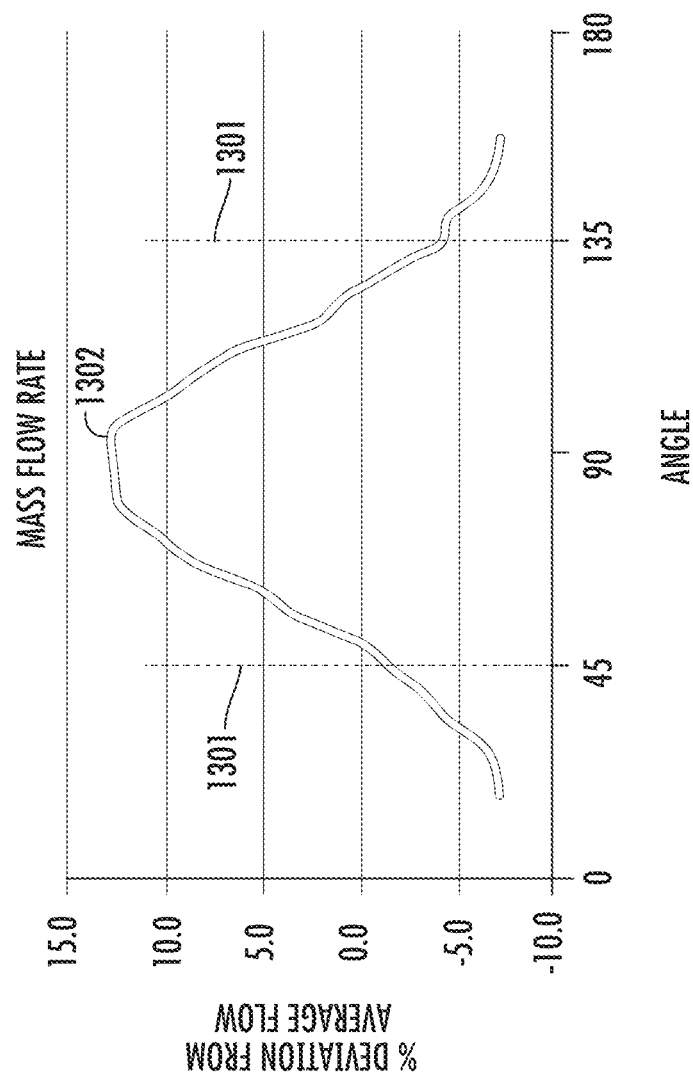
FIG. 14 graphically depicts a relative mass flow rate of the molten glass (y-axis) as a function of a angular position of the glass flow, according to one or more embodiments shown and described herein.

FIGS. 12-14 show the results from the 3D flow model of Example 1 with the flow control valves 170 for net flow rate and circumferential flow distribution adjustments. In Example 1, the z-axis position of the flow control valves 170 in angular sectors A and C are lowered down with respect to the flow control valve 170 in angular sector B. Thus, the flow control valve 170 in angular sector B is in a position corresponding to a greater mass flow rate of glass through angular sector B compared to the positions of the flow control valves 170 in angular sectors A and C. FIG. 12 illustrates the distribution of fluid pressure of the molten glass in the annular chamber 140, flow control region 144, and annular flow channel 142. For the gray scale for FIG. 12, darker gray shades indicate lesser pressure regions, the lighter gray shades indicate greater pressure regions, and the pressure increases from dark gray to light gray. FIG. 13 illustrates the fluid velocity distribution of the molten glass in the annular chamber 140, flow control region 144, and the annular flow channel 142. In FIG. 13, darker gray shades indicate regions of lesser velocity of the molten glass, the lighter shades indicate regions of greater velocity of the molten glass, and the velocity of the molten glass increases from darker shades to lighter shades. FIG. 14 illustrates the percent deviation of the flow rate of molten glass from the average flow rate of molten glass as a function of angle. As shown in FIGS. 12-14, as the impedance to glass flow is increased, and glass flow through sector B is favored.

Referring to FIG. 12, the fluid pressure in sector B differs from that of sectors A and C in the region downstream of the flow control valves 170. The pressure in angular sector B is greater than the pressure in sectors A and C, which indicates a greater flow rate of the molten glass through angular sector B. The pressure differential between angular sector B and angular sectors A and C is sustained along the length of the flow gussets 182. The flow gussets 182 end at a distance D from the distal end of the delivery rings. At the end of the flow gussets 182, the glass from each angular sector merges into a single stream, as shown by the normalization of the pressure between angular sector B and angular sectors A and C downstream of the flow gussets 182.

FIG. 13 illustrates the average velocity of the molten glass through angular sectors A, B, and C in the flow control region 144 and annular flow channel 142. FIG. 13 shows a greater velocity of the molten glass in angular sector B at the end of the flow gussets 182 compared to the velocity of the molten glass in sectors A and C. This is consistent with the greater pressure of the molten glass in angular sector B compared to sectors A and C. FIG. 14 illustrates the relative mass flow rate of molten glass as a function of the angle through the modeled region. Reference number 1301 indicates the angular positions of the flow gussets in the modeled region. As shown in FIG. 14, the relative flow rate of molten glass attains a maximum 1302 in the angular middle of angular sector B and decreases as the position moves towards each of angular sectors A and C. This indicates that positioning the flow control valves 170 for angular sectors A and C vertically down (i.e., −Z direction) closer to the side wall of the cylindrical containers in the flow control region 144 relative to the position of the flow control valve 170 in angular sector B produces preferential flow of molten glass through angular sector B over sectors A and C.

Figure 16:
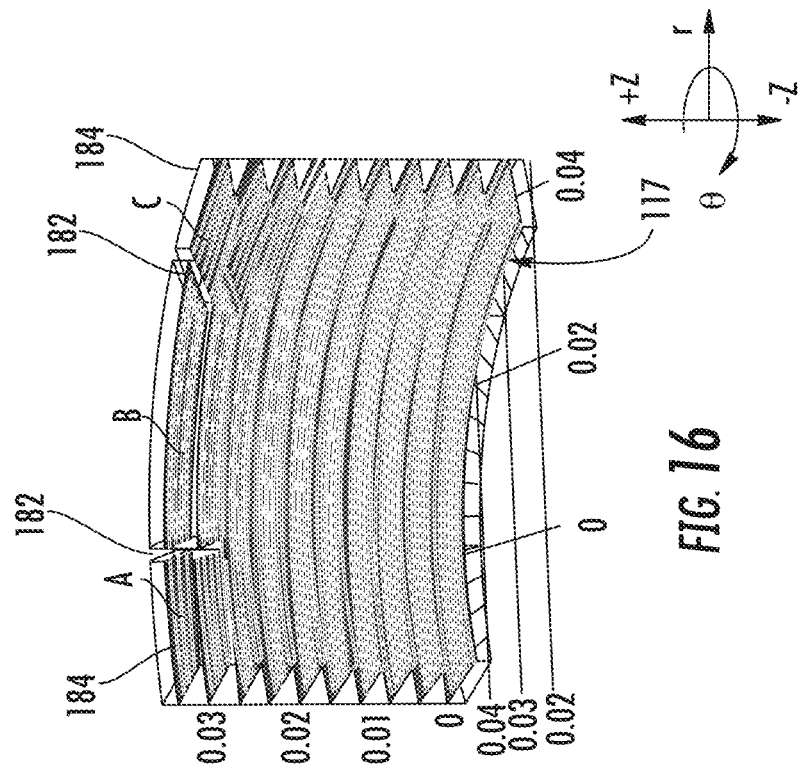
FIG. 16 graphically depicts the 3-dimensional velocity profile for a flow delivery region of the flow model of FIG. 13, according to one or more embodiments shown and described herein.
Figure 15:
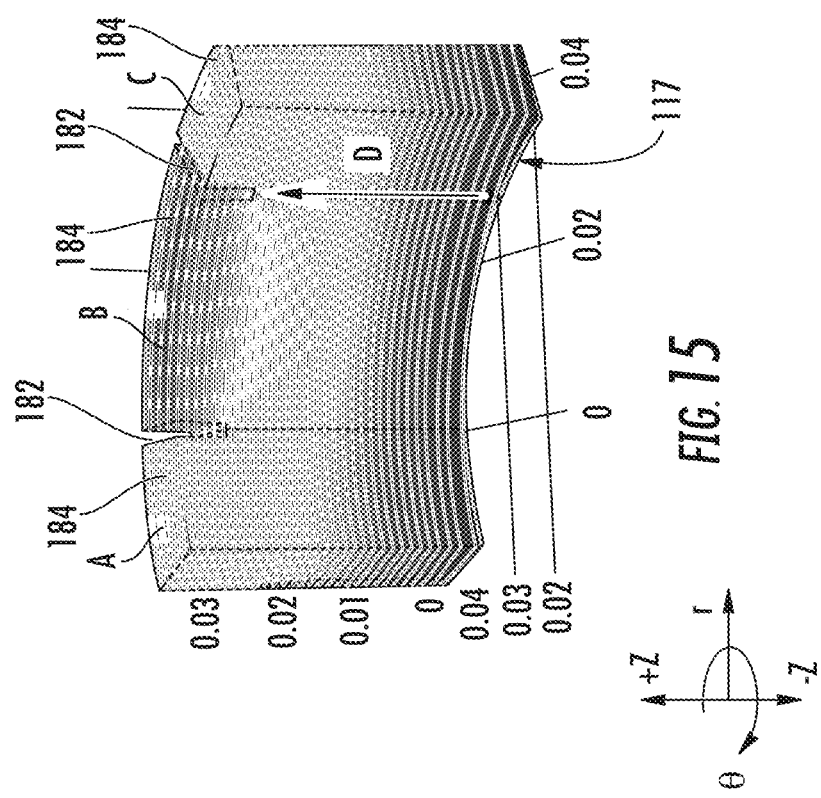
FIG. 15 graphically depicts the 3-dimensional pressure profile for a flow delivery region of the flow model of FIG. 12, according to one or more embodiments shown and described herein.

FIGS. 15 and 16 illustrate the pressure and flow velocity of the molten glass in the delivery region of the flow model of Example 1. The delivery region in FIGS. 15 and 16 represents the region between the innermost delivery ring 116 and the first outer delivery ring 136 and from the end of the annular flow channel 142 to the distal end of the innermost delivery ring 116. For the gray scale in FIG. 15, darker gray shades indicate lesser pressure regions, the lighter gray shades indicate greater pressure regions, and the pressure increases from dark gray to light gray. For the gray scale for FIG. 16, darker gray shades indicate regions of lesser flow velocity of molten glass, the lighter gray shades indicate regions of greater flow velocity of molten glass, and the flow velocity of molten glass increases from dark gray shades to light gray shades. As shown in FIGS. 15 and 16, the flows of molten glass from angular sectors A, B, and C confluence at the end of the flow gussets 182 to from a single glass stream. The pressure difference between angular sector B and sectors A and C dissipates downstream of the end of the flow gussets 182 (i.e., in the −Z direction of the coordinate axis of FIGS. 15 and 16), and some flow redistribution among sectors A, B, and C may ensue. The distance D from the end of the flow gussets 182 to the distal end 117 of the innermost delivery ring 116, as well as the gusset thickness and end profile, may be controlled to control the redistribution of molten glass between sectors and influence the localized impact of the flow gusset 182 on flow distribution. For a given geometry of the apparatus, the location of the flow gussets and the influence on flow distribution may be independent of flow rate and viscosity of the molten glass.

Example 2

In Example 2, a 3 dimensional (3D) flow model of molten glass through the annular space defined between an innermost cylindrical container and a first outer cylindrical container is presented. For Example 2, the same parameters for the apparatus 100 described in Example 1 is used except that the upper portions 1701 of the innermost cylindrical container 110 and the first outer cylindrical container 130 are both polygonal in cross-section. Specifically, the innermost cylindrical container 110 and the first outer cylindrical container 130 are octagonal in cross-section. The flow gussets 182 are positioned proximate to each of the 8 vertices 1702 of the octagonal upper portions 1701. The flow control valves 170 extend between each pair of flow gussets 182 and are straight rather than arcuate. The model represents a quarter of the total circumference of the innermost cylindrical container 110 and the first outer cylindrical container 130 and encompasses three angular sectors 184 (designated in FIG. 12 as sectors A, B, and C) out of the 8 equally-sized angular sectors 184 defined by the flow gussets 182. This simplified model assumes symmetry at the 0° and 90° planes, and is sufficient to illustrate some of the important three dimensional flow effects associated with the operation of the apparatus 100. Example 2 demonstrates that that flow control valves 170 do not have to be arcuate in shape to be effective at controlling the flow rate of molten glass through an angular sector.

Figure 17:
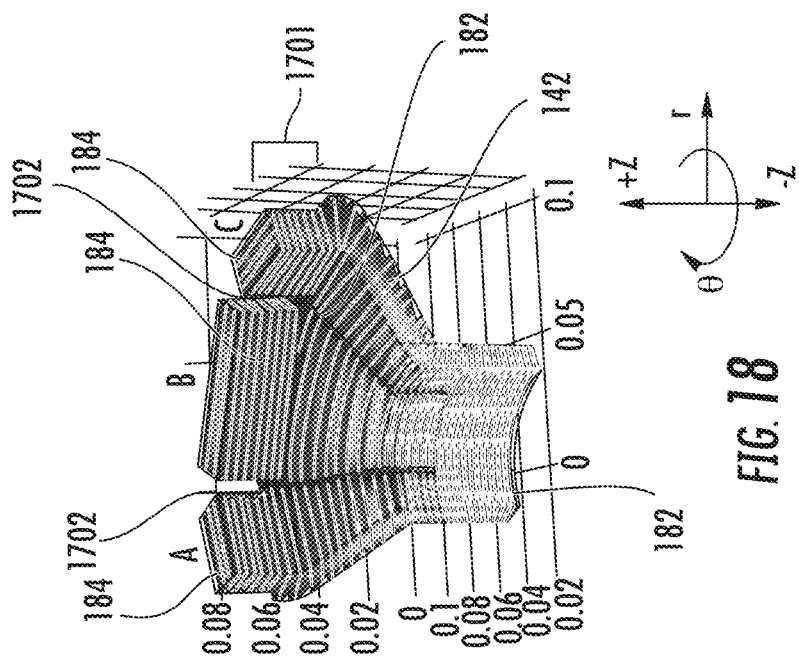
FIG. 17 graphically depicts a 3-dimensional pressure profile for a flow model based on flow of molten glass through an apparatus that includes cylindrical containers that are polygonal in cross-sectional shape, according to one or more embodiments shown and described herein.
Figure 18:
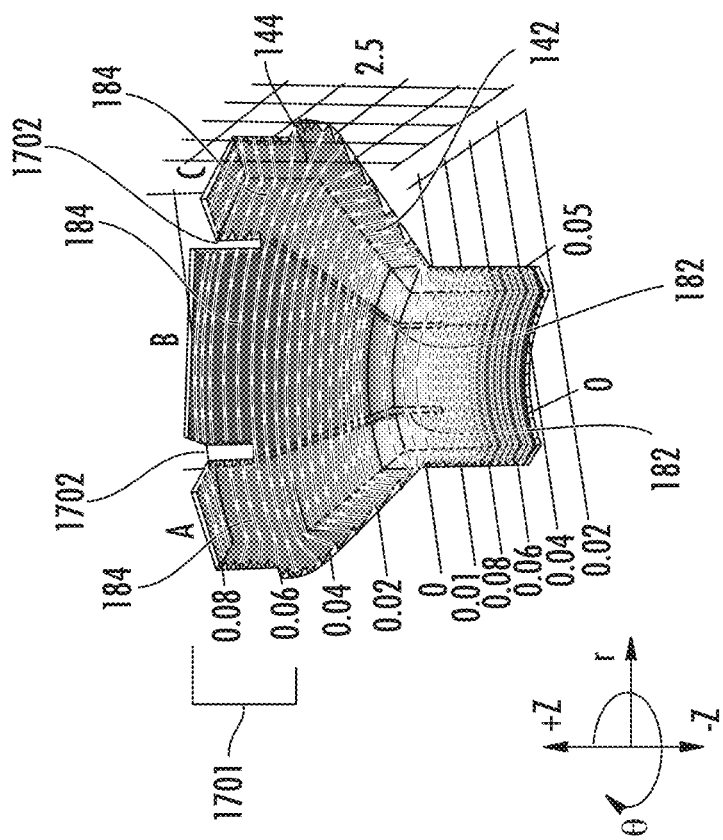
FIG. 18 graphically depicts a 3-dimensional velocity profile for a flow model based on flow of molten glass through an apparatus that includes cylindrical containers that are polygonal in cross-sectional shape, according to one or more embodiments shown and described herein.

FIGS. 17 and 18 illustrate the results of the 3D flow model of Example 2. As with Example 1, the z-axis position of the flow control valves 170 in angular sectors A and C are lowered down with respect to the flow control valve 170 in angular sector B. FIG. 17 illustrates the distribution of fluid pressure of the molten glass in the annular chamber 140, flow control region 144, and annular flow channel 142. FIG. 18 illustrates the fluid velocity distribution of the molten glass in the annular chamber 140, flow control region 144, and the annular flow channel 142. For the gray scale in FIG. 17, darker gray shades indicate lesser pressure regions, the lighter gray shades indicate greater pressure regions, and the pressure increases from dark gray to light gray. For the gray scale for FIG. 18, darker gray shades indicate regions of lesser flow velocity of molten glass, the lighter gray shades indicate regions of greater flow velocity of molten glass, and the flow velocity of molten glass increases from dark gray shades to light gray shades. As shown in FIGS. 17-18, as the impedance to glass flow is increased in sectors A and C as shown by increasing pressure in the flow control regions 144 in sectors A and C of FIG. 17, the glass flow through sector B is favored, as indicated by the increased flow velocity of molten glass through the annular flow channel 142 of sector B compared to the flow velocity of molten glass through the annular flow channels of sectors A and C.

Example 3

In Example 3, the performance and operation of the apparatus including a plurality of cylindrical containers and the flow control valves was evaluated using an oil model apparatus for controlling the overall flow rate of material through the flow control region 144. FIG. 19 illustrates the experimental apparatus 600 used to model operation of the flow control valves. The experimental apparatus 600 included two cylindrical containers: the innermost cylindrical container 110 and the first outer cylindrical container 130. The innermost cylindrical container 110 and the first outer cylindrical container 130 are circular in cross-section and define the annular chamber 140, flow control region 144, and the annular flow channel 142 therebetween. The flow control region 144 and the annular flow channel 142 are divided into 4 equally-sized angular sectors 184 by 4 flow gussets 182 and each of the angular sectors 184 included a flow control valve 170. The experimental apparatus 600 can be operated with either one or two oil streams. The innermost cylindrical container 110 included a configuration similar to the configuration depicted in FIG. 7B and previously described in conjunction therewith.

The experimental apparatus 600 was used to validate the multi-cylindrical container apparatus with flow control valves 170 for modifying the net flow rate using the flow control valves. In a first run, the four flow control valves 170 were positioned at a first Z position of 0.5 inches above the minimum operating position. An oil material was introduced to the annular chamber 140 defined between the innermost cylindrical container 110 and the first outer cylindrical container 130, and the velocity of the free surface of the flowing oil discharged from the outer delivery ring 136 was measured. No oil material was introduced to the innermost cylindrical container 110. In a second run, the four flow control valves 170 were positioned at a second Z position of 2 inches above the minimum operating position. The oil material was again introduced to the annular chamber 140 and the velocity of the free surface of the flowing oil discharged from the outer delivery ring 136 was measured.

Figure 20:
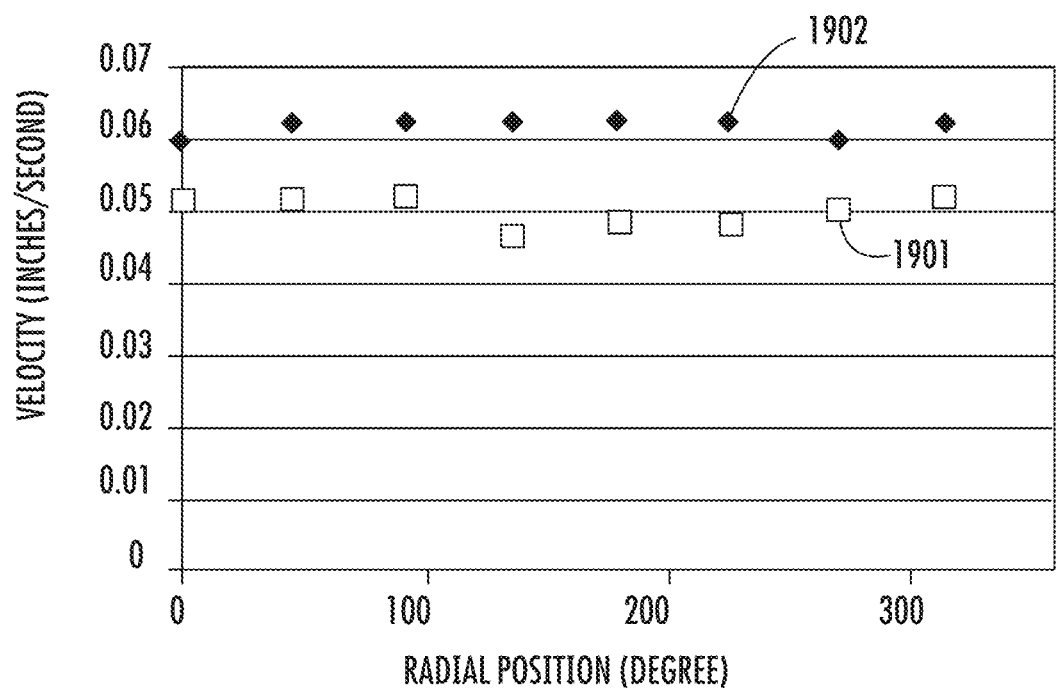
FIG. 20 graphically depicts fluid velocity (y-axis) as a function of angular position of the fluid flow (x-axis) for two different positions of the flow control valves of the apparatus of FIG. 19, where at each position, all of the flow control valves are positioned at the same distance, according to one or more embodiments shown and described herein.

Referring to FIG. 20, the velocity of the oil flow (y-axis) at the outer delivery ring is depicted as a function of the angular position of the outer delivery ring (x-axis) given in degrees. At the Z-position of 0.5 inches 1901, the velocity of oil flow at the outer delivery ring 136 was relatively constant around the circumference of the outer delivery ring. When the Z-position of the flow control valves increased to 2 inches 1902, the average velocity of free surface of the flowing oil at the outer delivery ring 136 increased by about 0.01 inches per second. Thus, changing the Z-position of the flow control valves changes the average flow velocity, and thereby the average flow rate, of material through the apparatus.

Example 4

In Example 4, the performance and operation of the apparatus including the plurality of cylindrical containers and flow control valves was evaluated using the oil model apparatus of FIG. 19 to control the circumferential distribution of flow of the material from the apparatus. The experimental apparatus 600 used to model operation of the flow control valves is illustrated in FIG. 19 and previously described in Example 3. In a first run of Example 4, a first flow control valve was positioned at 0.5 inches from the minimum operating position of the flow control valves, and the second, third, and fourth control valves were positioned at 2 inches from the minimum operating position of the flow control valves. An oil material was introduced to the annular chamber 140 and the velocity of the free surface of the flowing oil discharged from the outer delivery ring 136 was measured. In a second run of Example 4, the first flow control valve was positioned at 1.2 inches from the minimum operating position, and second, third, and fourth flow control valves were again positioned at 2 inches from the minimum operating position. The oil material was again introduced to the annular chamber 140 and the velocity of the free surface of the flowing oil discharged from the outer delivery ring 136 was measured.

Figure 21:
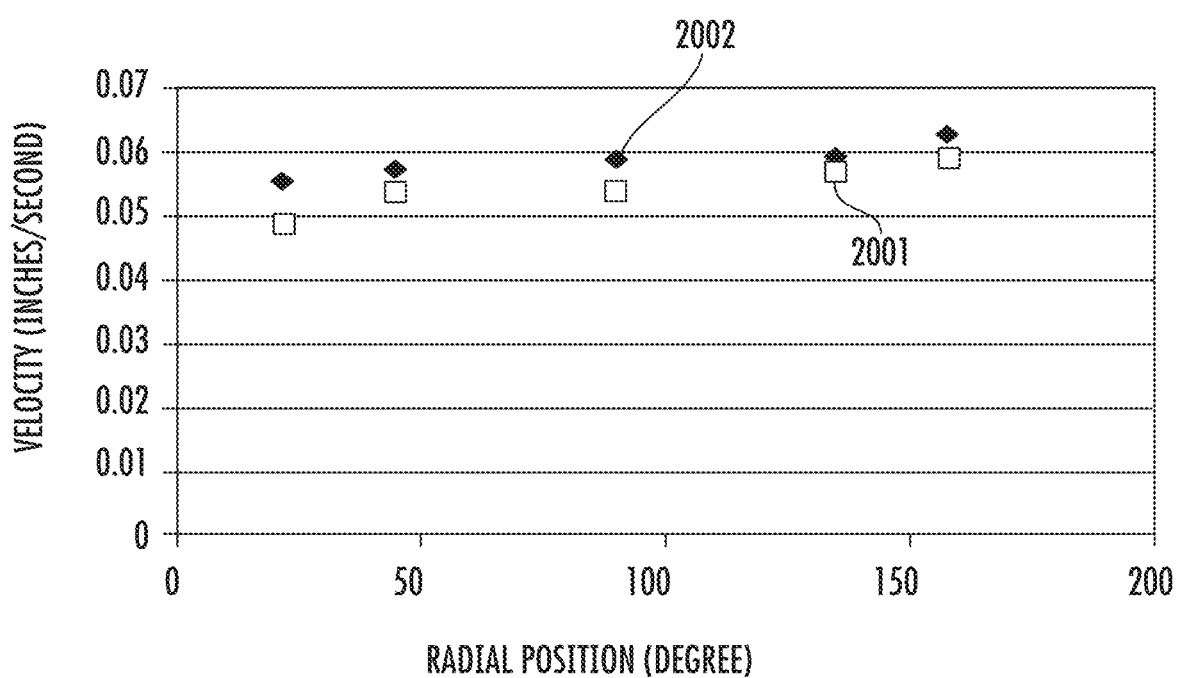
FIG. 21 graphically depicts fluid velocity (y-axis) as a function of angular position of the fluid flow (x-axis) for a configuration of the apparatus of FIG. 19 in which one of the flow control valves is positioned at a different vertical position compared to the other flow control valves to create siding, according to one or more embodiments shown and described herein.
Figures 22A, 22B, 22C:
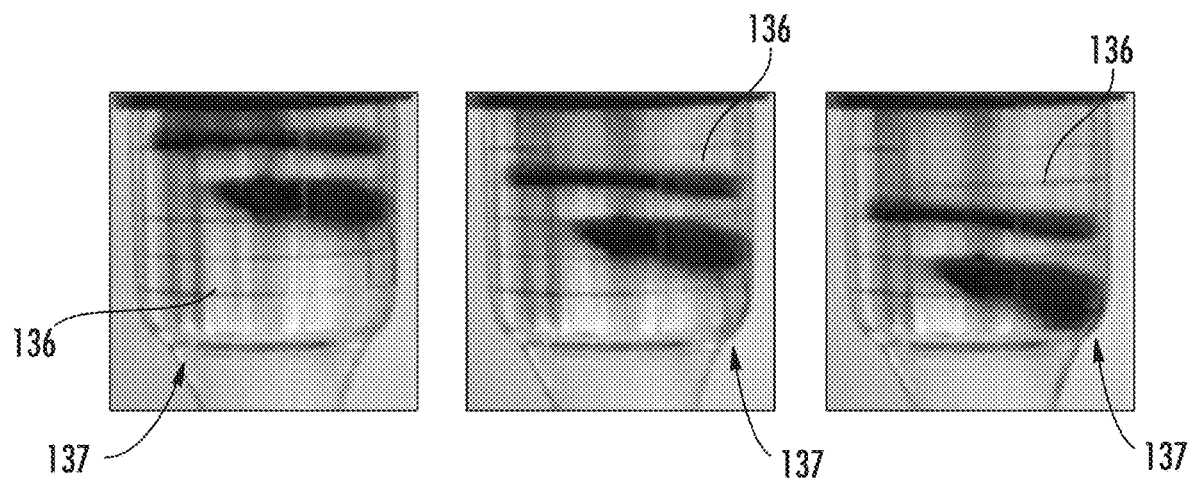
FIG. 22A is a photographic image of the flow of oil from a delivery ring of the apparatus of FIG. 19 at time equal to zero seconds upon a change of position of one of the four flow control valves to create siding, according to one or more embodiments shown and described herein.
FIG. 22B is a photographic image of the flow of oil from a delivery ring of the apparatus of FIG. 19 at time equal to 11 seconds after a change of position of one of the four flow control valves to create siding, according to one or more embodiments shown and described herein.
FIG. 22C is a photographic image of the flow of oil from a delivery ring of the apparatus of FIG. 19 at time equal to 20 seconds after a change of position of one of the four flow control valves to create siding, according to one or more embodiments shown and described herein.
Figures 22D, 22E:
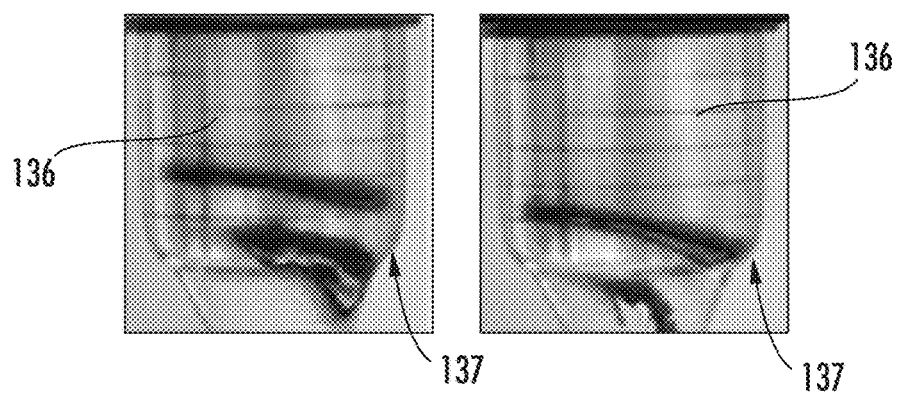
FIG. 22D is a photographic image of the flow of oil from a delivery ring of the apparatus of FIG. 19 at time equal to 30 seconds after a change of position of one of the four flow control valves to create siding, according to one or more embodiments shown and described herein.
FIG. 22E is a photographic image of the flow of oil from a delivery ring of the apparatus of FIG. 19 at time equal to 39 seconds after a change of position of one of the four flow control valves to create siding, according to one or more embodiments shown and described herein.

Referring to FIG. 21, the velocity of the free surface of the flowing oil (y-axis) at the outer delivery ring is depicted as a function of the angular position of the outer delivery ring (x-axis) given in degrees. In FIG. 21, the center of first flow control valve corresponds to zero degrees on the x-axis. The centerlines of the second, third, and fourth flow control valves occur at an x position equal to 90 degrees, 180 degrees and 240 degrees, respectively. For the first run 2001, the velocity of oil flow at the outer delivery ring 136 increased from the position of the first flow control valve at x=0 degrees to a maximum flow velocity at x=150 degrees corresponding to the region of the third flow control valve. This illustrates a circumferential distribution of flow of the material caused by positioning the first flow control valve offset from the other flow control valves. When the Z-position of the first flow control valve is increased to 1.2 inches in the second run 2002, the flow velocity at the outer delivery ring 136 again increases from x=0 to x=150. However, since the difference between the position of the first flow control valve and the other flow control valves in the second run 2002 is less than the first run 2001, the minimum flow velocity at x equal to about 25 degrees in the second run 2002 is greater than the minimum flow velocity for the first run 2001. Referring to FIGS. 22A-22E, a series of photographs of the oil material flowing from the distal end 137 of the outer delivery ring 136 further illustrate the difference in the flow rates resulting from positioning the first flow control valve closer to the minimum position than the second through fourth flow control valves. As shown in FIGS. 22A-22E, the shape of the meniscus of the oil material (dark region) indicates that the flow of the oil material on the left-hand side of FIGS. 22A-22E corresponding to the first flow control valve is less than the flow of the oil material on the right-hand side of FIGS. 22A-22E, which correspond to the greater flow region created by the second through fourth flow control valves. This demonstrates that the flow control valves may enable control over the circumferential distribution of the flow rate (siding) of material from the cylindrical containers 102 of the apparatus 100.

While various embodiments of the apparatus 100 and methods of continuously producing composite glass tubes 200 that include a plurality of glass layers using apparatus 100 have been described herein, it should be understood that it is contemplated that each of these embodiments and techniques may be used separately or in conjunction with one or more embodiments and techniques.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of producing a glass tube comprising:
introducing a first molten glass composition to an annular chamber defined between an inner cylindrical container and an outer cylindrical container, wherein a bottom wall of the outer cylindrical container is spaced apart from the inner cylindrical container to define an annular flow channel;
passing the first molten glass composition through the annular flow channel to an outer delivery ring coupled to the bottom wall of the outer cylindrical container and defining a central opening in the bottom wall of the outer cylindrical container;
translating at least one flow control valve disposed in the annular chamber, wherein translation of the at least one flow control valve relative to the outer cylindrical container changes an impedance to flow of the molten glass into the annular flow channel, thereby changing a thickness of the glass tube; and separating the first molten glass composition from a distal end of the outer delivery ring to form a first molten glass layer of the glass tube.

2. The method of claim 1, further comprising producing a gas flow proximate to the outer delivery ring.

3. The method of claim 1, wherein a plurality of flow control valves are disposed in the annular chamber defined between the inner cylindrical container and the outer cylindrical container, each of the plurality of flow control valves being independently translatable relative to the outer cylindrical container.

4. The method of claim 3, further comprising adjusting a siding of the first molten glass layer by translating one or more of the plurality of flow control valves relative to the other of the plurality of flow control valves to change the circumferential distribution of the first molten glass composition flowing through the annular flow channel.

5. The method of claim 1 further comprising:
introducing a second molten glass composition to the inner cylindrical container, the inner cylindrical container comprising a blow tube disposed within the inner cylindrical container;
passing the second molten glass composition through an inner annular flow channel defined between the blow tube and the inner cylindrical container to an inner delivery ring coupled to the inner cylindrical container and defining a central opening of the inner cylindrical container; and
separating the second molten glass composition from the inner delivery ring to produce a second molten glass layer of the glass tube.

6. The method of claim 5, further comprising contacting the first molten glass layer separated from the outer delivery ring with the second molten glass layer separated from the inner delivery ring.

7. The method of claim 5, further comprising adjusting a thickness or a siding of the second molten glass layer by translating the blow tube vertically or horizontally relative to the inner cylindrical container to change an impedance to flow of the second molten glass composition between the blow tube and the inner cylindrical container.

8. The method of claim 5, wherein the inner cylindrical container comprises an inner flow control valve disposed within the inner cylindrical container and translatable relative to the inner cylindrical container, where the method further comprises adjusting a thickness or a siding of the second molten glass layer by translating the inner flow control valve vertically or horizontally relative to the inner cylindrical container to change an impedance to flow of the second molten glass composition from the inner cylindrical container to the inner delivery ring.

9. The method of claim 5, wherein the first molten glass composition has a coefficient of thermal expansion (CTE) different than the second molten glass composition.

10. The method of claim 5, further comprising:
introducing a third molten glass composition to a second annular chamber defined between the outer cylindrical container and a second outer cylindrical container;
passing the third molten glass composition from the second annular chamber, through a second annular flow channel defined between a bottom wall of the second outer cylindrical container and the outer cylindrical container, to a second outer delivery ring; and
separating the third molten glass composition from the second outer delivery ring to produce a third molten glass layer of the glass tube.

11. The method of claim 10, further comprising adjusting an average thickness or a circumferential thickness profile of the third molten glass layer by translating at least one of a plurality of flow control valves disposed in the second annular chamber relative to the second outer cylindrical container.

12. A system for producing glass tubing, the system comprising:
an apparatus comprising:
an inner cylindrical container including an inner delivery ring extending from a bottom of the inner cylindrical container, the inner delivery ring defining a central opening in the bottom of the inner cylindrical container;
an outer cylindrical container concentrically arranged to surround the inner cylindrical container and spaced apart from the inner cylindrical container to define an annular chamber therebetween, the outer cylindrical container comprising a side wall and a bottom wall extending radially inward from the side wall to an outer delivery ring extending downward from the bottom wall, the outer delivery ring defining a central opening in the bottom wall of the outer cylindrical container, wherein the bottom wall, the side wall, or both of the outer cylindrical container are spaced apart from the inner cylindrical container to define a flow control region and an annular flow channel extending between the outer cylindrical container and the inner cylindrical container and from the flow control region to the outer delivery ring;
at least one flow control valve disposed in the annular chamber;
at least one positioner operatively coupled to the at least one flow control valve and operable to translate the at least one flow control valve relative to the outer cylindrical container, the inner cylindrical container, or both, wherein translation of the at least one flow control valve by the positioner is operable to change an impedance to flow of a molten glass composition through the flow control region; and
a blow tube disposed within the inner cylindrical container and operable to deliver a gas flow proximate the inner delivery ring;
a sensor disposed downstream of the apparatus, the sensor operable to measure at least one dimension of the glass tube produced by the apparatus; and
a control system communicatively coupled to the at least one positioner and to the sensor, the control system comprising a processor and one or more memory modules communicatively coupled to the processor.

13. The system of claim 12, further comprising machine readable instructions stored in the one or more memory modules that cause the system to perform at least the following when executed by the processor:
measure a dimension of the glass tube;
compare the dimension of the glass tube to a target dimension of the glass tube; and
send a control signal to the at least one positioner to change a position the at least one flow control valve based on the comparison of the dimension of the glass tube to the target dimension, wherein changing the position of the at least one flow control valve produces a change in the dimension of the glass tube.

14. The system of claim 12, wherein the sensor is operable to measure at least one of the overall average thickness of the glass tube, an average thickness of one or more than one glass layer of the glass tube, a circumferential thickness profile of the glass tube, a circumferential thickness profile of one or more than one glass layer of the glass tube, an outer diameter of the glass tube, an inner diameter of the glass tube, and combinations thereof.

15. The system of claim 12, wherein the apparatus comprises:
 a plurality of flow control valves disposed in the annular chamber; and
 a plurality of positioners, each of the plurality of positioners operatively coupled to one of the plurality of flow control valves and operable to independently translate the one of the plurality of flow control valves relative to the outer cylindrical container.

16. The system of claim 15, further comprising machine readable instructions stored in the one or more memory modules that cause the system to perform at least the following when executed by the processor:
 measure a siding of the glass tube;
 compare the siding of the glass tube to a target siding of the glass tube; and
 position at least one of the plurality of flow control valves relative to the other of the plurality of flow control valves to change the siding of the glass tube based on the comparison.

17. The system of claim 12, further comprising a blow tube positioner operable to position the blow tube relative to the inner cylindrical container, wherein the control system is communicatively coupled to the blow tube positioner.

18. The system of claim 17, further comprising machine readable instructions stored in the one or more memory modules that cause the system to perform at least the following when executed by the processor:
 measure a dimension of the innermost glass layer of the glass tube;
 compare the dimension of the innermost glass layer of the glass tube to a target dimension of the innermost glass layer; and
 position the blow tube relative to the innermost cylindrical container to change the dimension of the innermost glass layer of the glass tube based on the comparison.

19. The system of claim 18, wherein the dimension is the average thickness of the innermost glass layer and the machine readable instructions stored in the one or more memory modules, when executed by the processor, cause the system to vertically position the blow tube relative to the inner cylindrical container.

* * * * *